(12) United States Patent
Hill

(10) Patent No.: US 10,932,476 B2
(45) Date of Patent: Mar. 2, 2021

(54) COMBINED VESSEL LID AND TEA BAG RECEPTACLE AND METHOD OF USING

(71) Applicant: CONTRA VISION LIMITED, Bramhall (GB)

(72) Inventor: George Roland Hill, Bramhall (GB)

(73) Assignee: CONTRA VISION LIMITED, Stockport (GB)

(*) Notice: Subject to any disclaimer, the term of this patent is extended or adjusted under 35 U.S.C. 154(b) by 154 days.

(21) Appl. No.: 15/324,484

(22) PCT Filed: Jul. 7, 2015

(86) PCT No.: PCT/IB2015/055147
§ 371 (c)(1),
(2) Date: Jan. 6, 2017

(87) PCT Pub. No.: WO2016/005912
PCT Pub. Date: Jan. 14, 2016

(65) Prior Publication Data
US 2017/0196236 A1    Jul. 13, 2017

Related U.S. Application Data

(60) Provisional application No. 62/021,522, filed on Jul. 7, 2014.

(51) Int. Cl.
*A47G 19/22* (2006.01)
*A47G 19/14* (2006.01)
(Continued)

(52) U.S. Cl.
CPC .............. *A23F 3/18* (2013.01); *A47G 19/145* (2013.01); *A47G 19/22* (2013.01); *B65D 43/02* (2013.01);
(Continued)

(58) Field of Classification Search
CPC .................... B65D 47/32; B65D 43/02; B65D 2543/00046; A47J 19/22; A47J 31/18
(Continued)

(56) References Cited

U.S. PATENT DOCUMENTS 980,066 A     12/1910  Collins
1,079,942 A   12/1913  Langan
(Continued)

FOREIGN PATENT DOCUMENTS

DE    297 15 610      1/1998
FR    2527917         12/1983
(Continued)

OTHER PUBLICATIONS

Machine English language tramslation of JP 2003339545 A Dec. 2, 2003.*
(Continued)

*Primary Examiner* — Viren A Thakur
*Assistant Examiner* — Thanh H Nguyen
(74) *Attorney, Agent, or Firm* — Pillsbury Winthrop Shaw Pittman LLP

(57) ABSTRACT

A tableware tea piece (10, 11, 12) intended to be used in conjunction with a drinking cup (60, 6) or teapot (63) vessel (60), includes first and second principal surfaces (1) and a well (8) defined by the second surface (1, 2, 95). It further includes a perimeter recess (40), and is configured and arranged (2) to be placed to act as a lid on a vessel (60) containing hot water (90) with the first surface (1, 2, 95) uppermost without slipping sideways off the vessel (60) and forming an aperture in side (1, 2) the rim (62) of the vessel (60). The tea piece (10, 11, 12) may be inverted and placed on a horizontal surface (1, 2, 95) with the second principal surface (1, 2, 95) uppermost and the first principal surface (1, 2, 95) supporting the piece (10) after inversion, to act as
(Continued)

a receptacle for a used tea bag (80, 84), such that tea (89) which emanates from the used tea bag (80, 84) is contained on the second principal surface (1, 2, 95) within the well (8) and does not spill onto the horizontal surface (1, 2, 95).

43 Claims, 37 Drawing Sheets

(51) Int. Cl.
  *B65D 47/32* (2006.01)
  *A23F 3/18* (2006.01)
  *B65D 43/02* (2006.01)

(52) U.S. Cl.
  CPC .... *B65D 47/32* (2013.01); *B65D 2543/00046* (2013.01)

(58) Field of Classification Search
  USPC ....... D7/511, 538, 311, 321; 220/571, 571.1, 220/572, 573, 574, 574.1, 574.2, 574.3, 220/213, 367.1, 368, 369, 371, 373
  See application file for complete search history.

(56) References Cited

U.S. PATENT DOCUMENTS

| | | | |
|---|---|---|---|
| 3,288,344 A | | 11/1966 | Woollen et al. |
| 3,362,590 A | | 1/1968 | Martin |
| 3,977,559 A | * | 8/1976 | Lombardi .......... B65D 43/0256 220/712 |
| 4,736,867 A | | 4/1988 | Feimer et al. |
| D608,147 S | | 1/2010 | Sykes |
| D652,254 S | | 1/2012 | Dancsecs |
| D664,001 S | | 7/2012 | Liu |
| D691,847 S | * | 10/2013 | Beckman .................... D7/392.1 |
| D723,871 S | | 3/2015 | Khubani et al. |
| D763,621 S | | 8/2016 | Szymanski |
| D807,702 S | | 1/2018 | Szymanski |
| 2010/0270284 A1 | * | 10/2010 | Cohen ................ A47J 27/21175 219/429 |
| 2012/0000915 A1 | * | 1/2012 | Swallow ................ A47G 19/06 220/574 |

FOREIGN PATENT DOCUMENTS

| | | | | |
|---|---|---|---|---|
| GB | 249792 A | | 4/1926 | |
| GB | 310470 A | | 7/1930 | |
| GB | 2261594 | | 5/1993 | |
| GB | 2285211 A | | 7/1995 | |
| GB | 2504348 | | 1/2014 | |
| JP | 3038293 U | | 3/1997 | |
| JP | 3038293 | | 6/1997 | |
| JP | 2003339545 A | * | 12/2003 | .............. A47J 31/06 |

OTHER PUBLICATIONS

International Search Report dated Feb. 10, 2016 for Appln. No. PCT/IB2015/055147.
Non-final Office Action issued in U.S. Appl. No. 29/551,489 dated Mar. 28, 2018.
Office Action issued in related European Patent Application No. 15744359.9 dated Apr. 19, 2018, 5 pages.
Office Action issued in related Design U.S. Appl. No. 29/551,489 dated Mar. 28, 2018, 8 pages.
"DragonfliesOnTheWing: Norman Rockwell's Music Master image, Stein Style Mug with Lid," available at https://www.etsy.com/uk/listing/242025644/norman-rockwells-music-master-image?ga_o (last visited Oct. 16, 2018), 8 pages.
Liling Spring Ceramic Industry Co., Ltd, "Ceramic coffee mug with lid and handle, bamboo lid and spoon," Aug. 27, 2012, available at http://www.coffeemugceramic.com/a/en/Ceramic _Knowledge/ More_ Ceramic _produc . . . (last visited Aug. 28, 2018), 1 page.
"Small Dots Mug with Lid and Spoon," Apr. 8, 2015, available at https://web.archive.org/web/20150408175654/https://www.asianfoodgrocer.com/houseware/tea-coffee/designer-mugs/small-dots-mug-lid-spoon, 1 page.
The Perfect Give, "TPG Ceramic Mug—Spoon Lid," Sep. 7, 2015, available at https://web.archive.org/web/20150907164225/http://theperfectgive.com.sg/products-page/mugs/tpg-ceramic-mug-spoon-lid/, (last visited Sep. 7, 2015),1 page.
"Ufengke Ceramic Mug," Jul. 17, 2016, available at https://www.amazon.co.uk/ufengke-Ceramic-Coffee-Wooden-Painting/dp/B01HRQ7S36/ref=sr_1_3?ie=UTF8&qid=1541613806&sr=8-3&keywords=ufengke+Ceramic+Mug (last visited Aug. 28, 2018), 2 pages.
IPC Drinkware, "Ceramic Mug with Lid & Spoon," Nov. 5, 2016, available at https://web.archive.org/web/20161105003211/http://ipcdrinkware.com/product/ceram . . . (last visited Aug. 28, 2018),1 page.
"Aladdin Drink It Hot Mason Jar 20oz—Sea," Webarchive of www.shopaladdin-pmi.com/product/45517 as of Mar. 22, 2014 <https://web.archive.org/web/20140322031007/http:/www.shopaladdin-pmi.com/product/45517> <retrieved Aug. 22, 2019>, 3 pages.
Applicant Information Disclosure Statement Regarding Physical Sample of "Aladdin Drink It Hot Mason Jar" Lid (believed to be Mar. 22, 2014 or earlier), 4 pages.

* cited by examiner

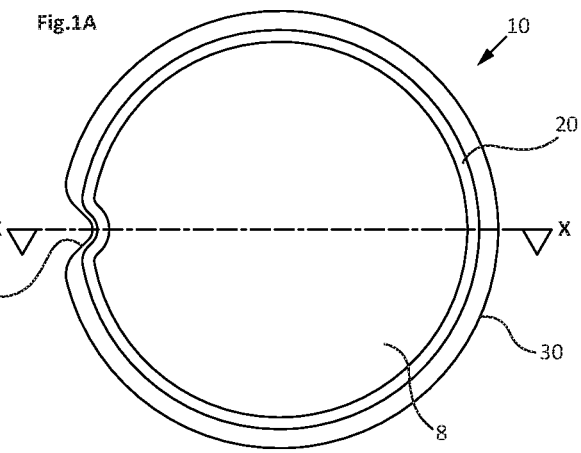
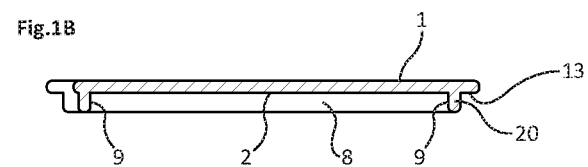
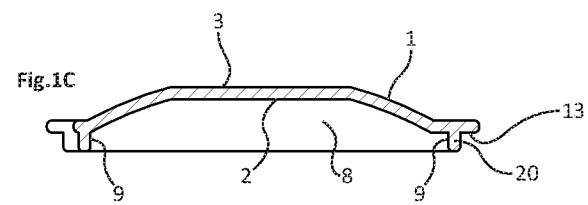
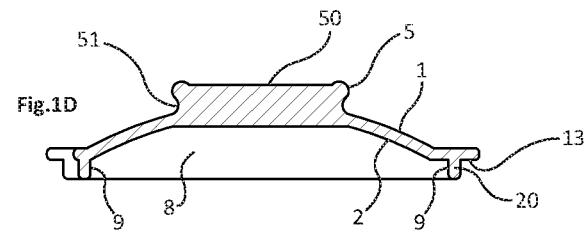
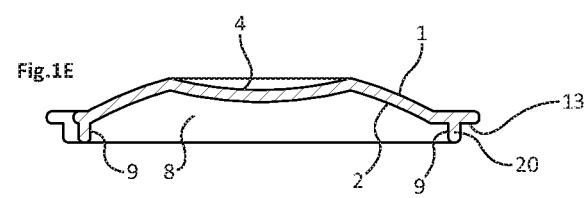
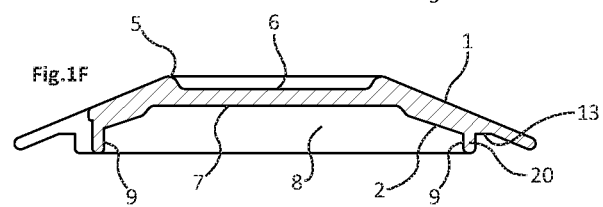

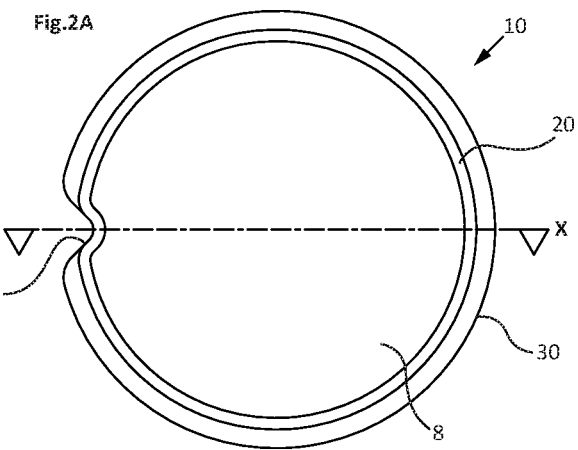
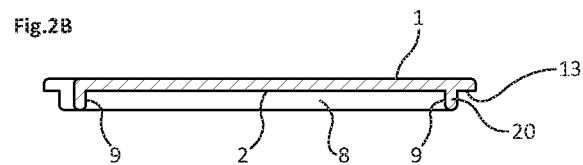
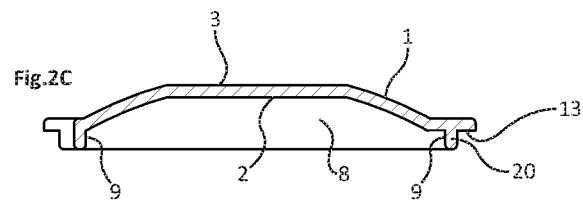
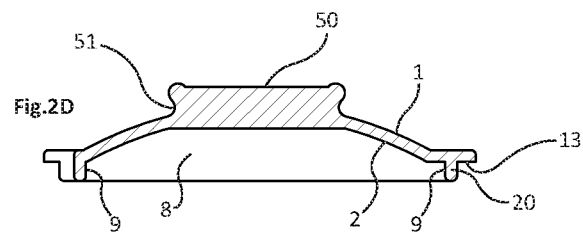
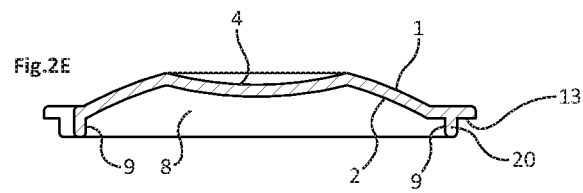
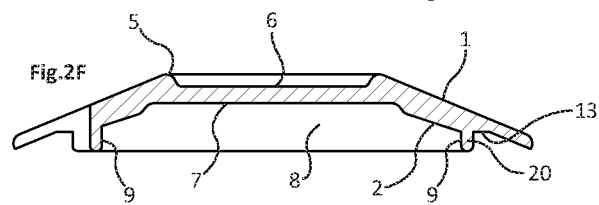

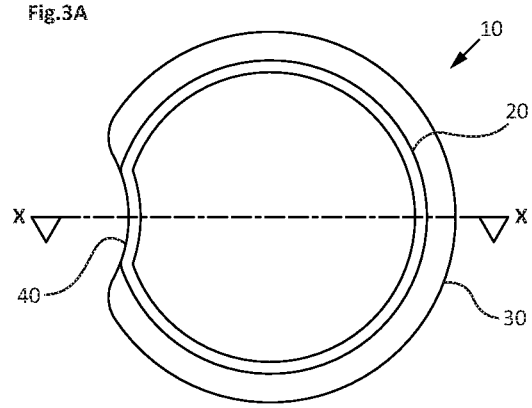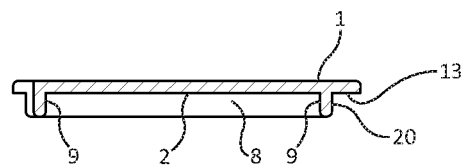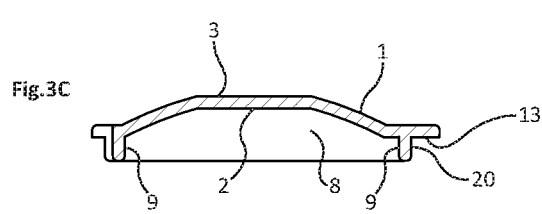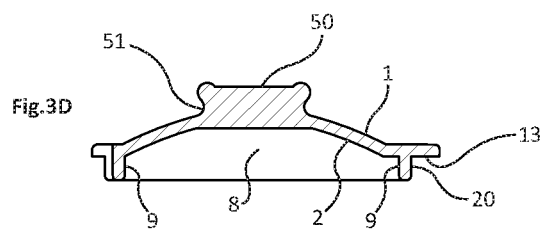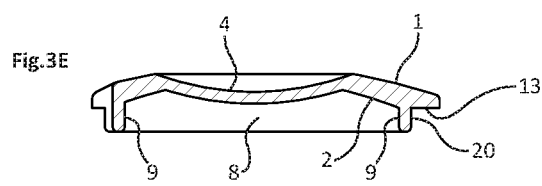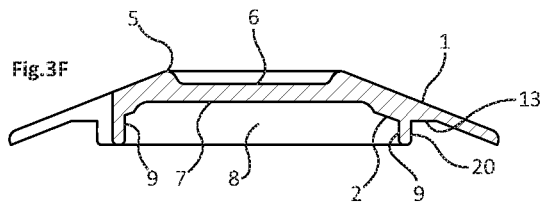

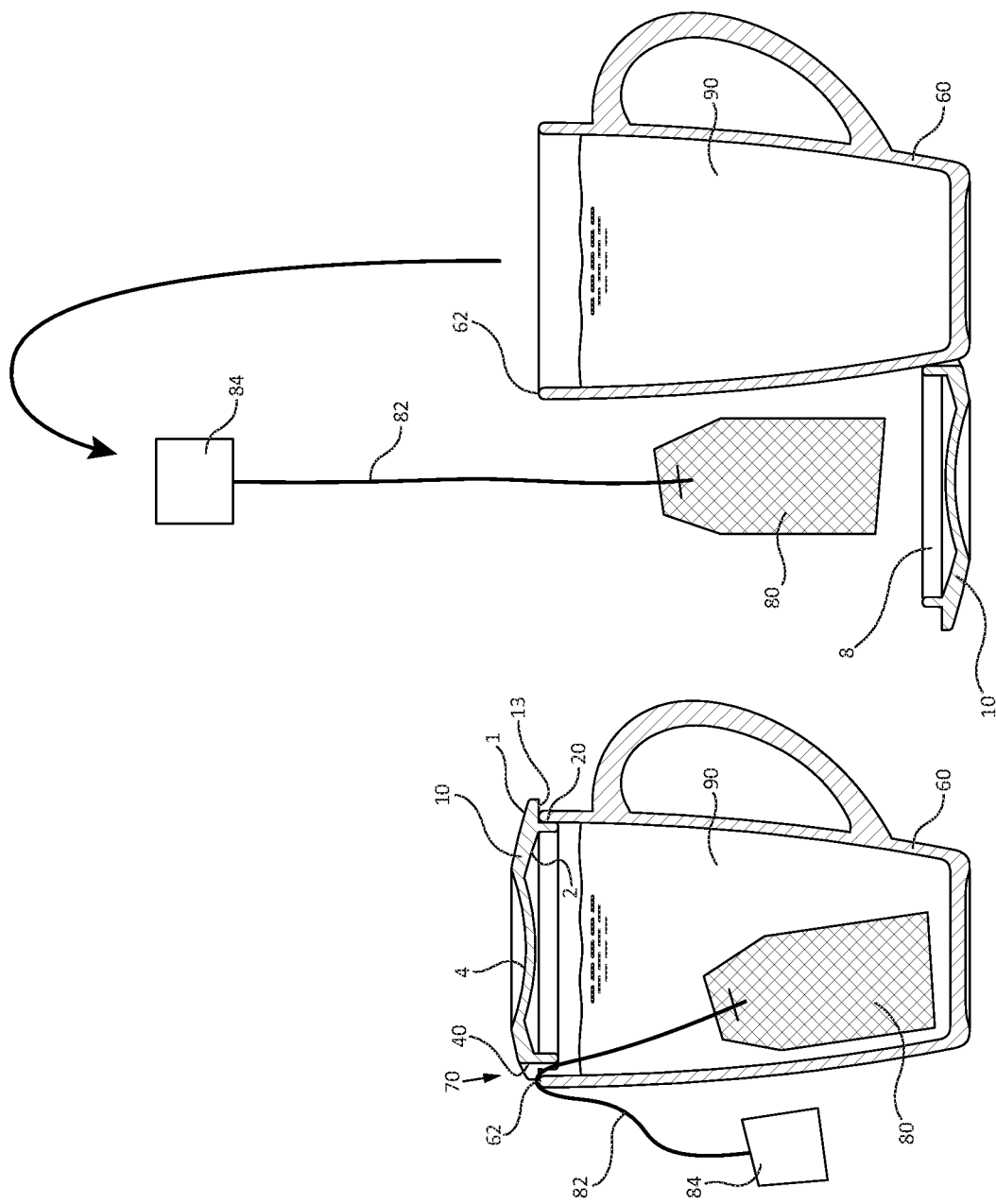

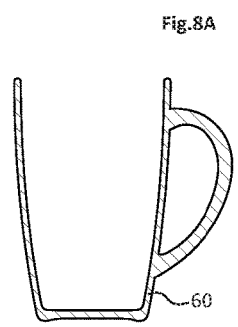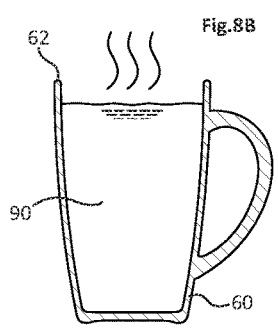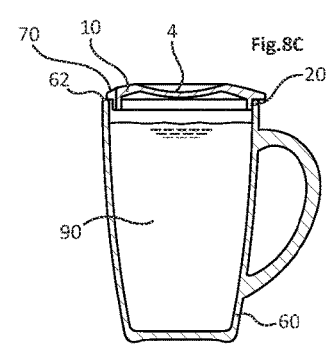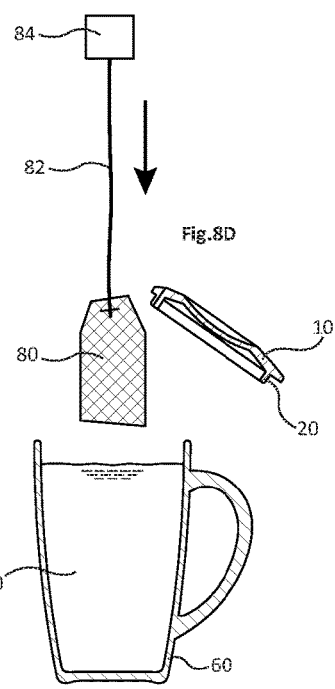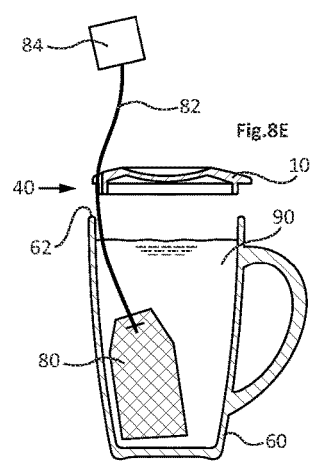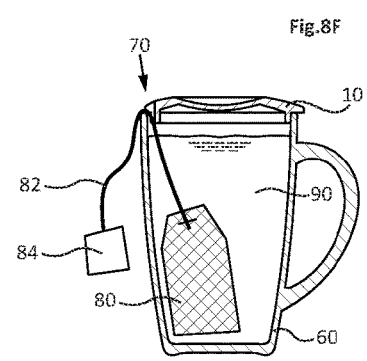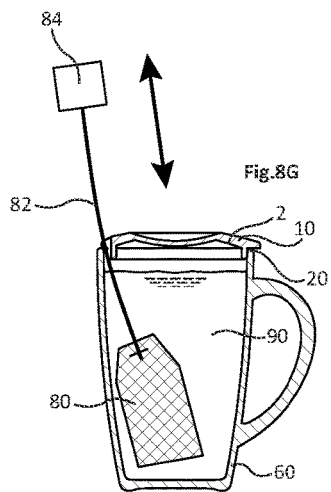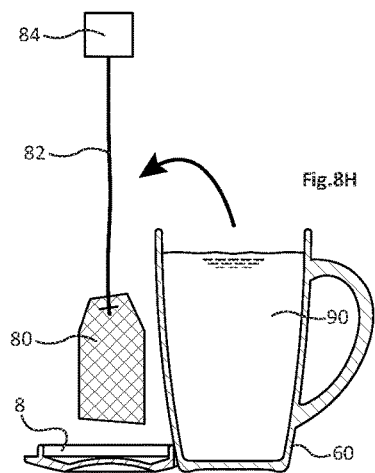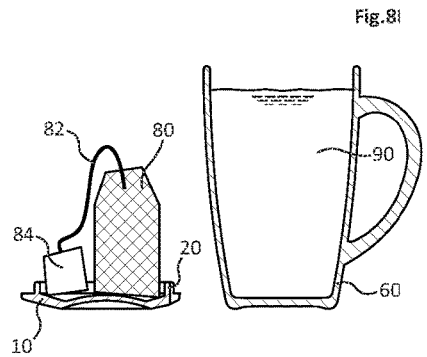

X - X

X - X

X - X

A - A

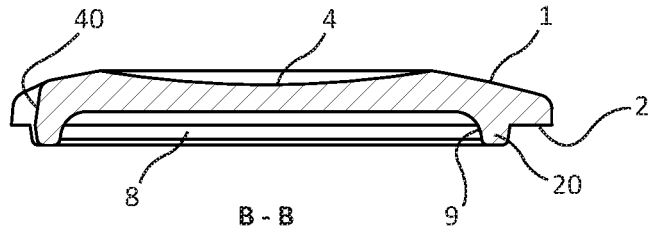
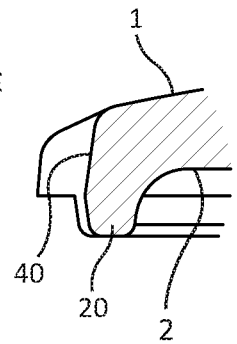
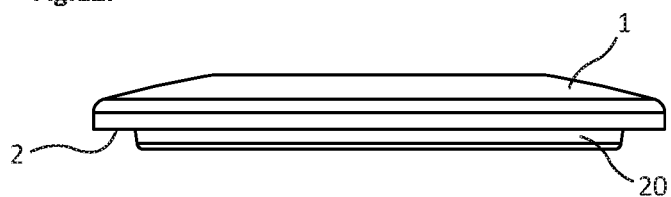
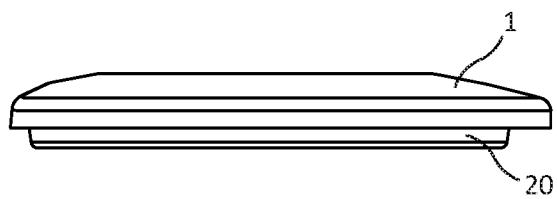
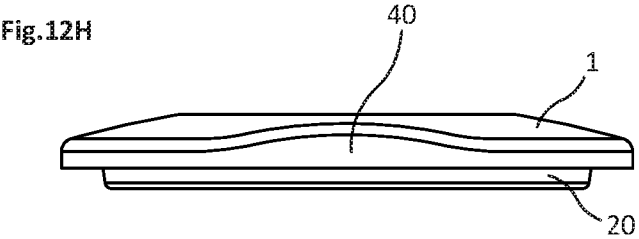
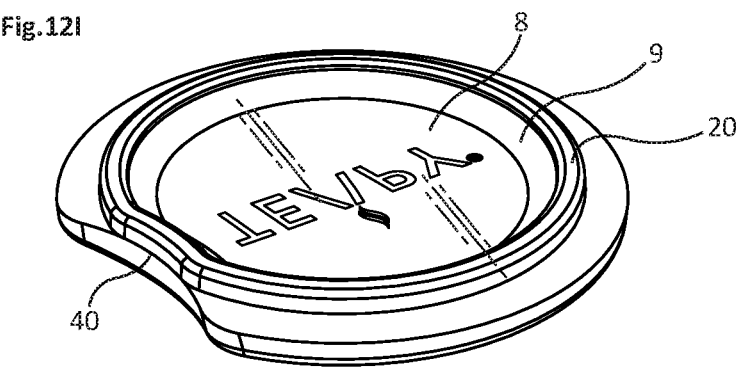

A - A

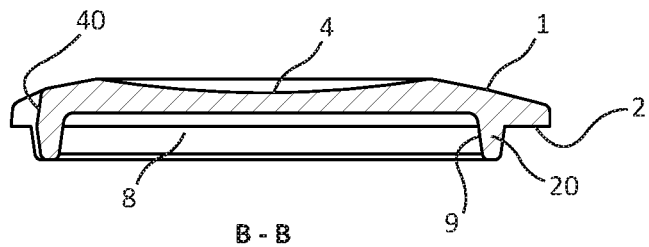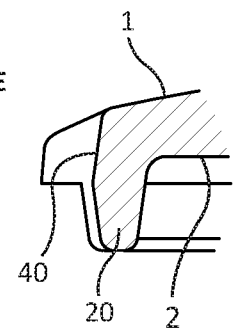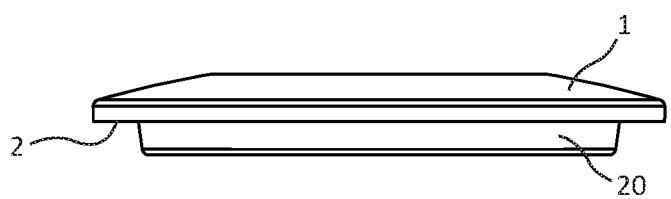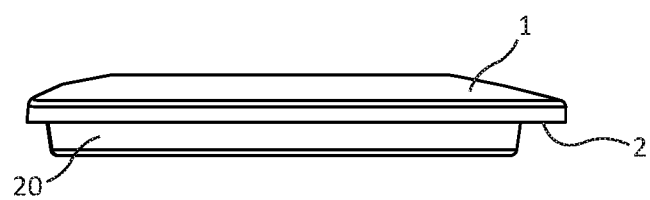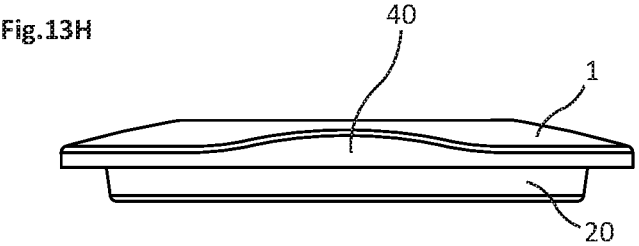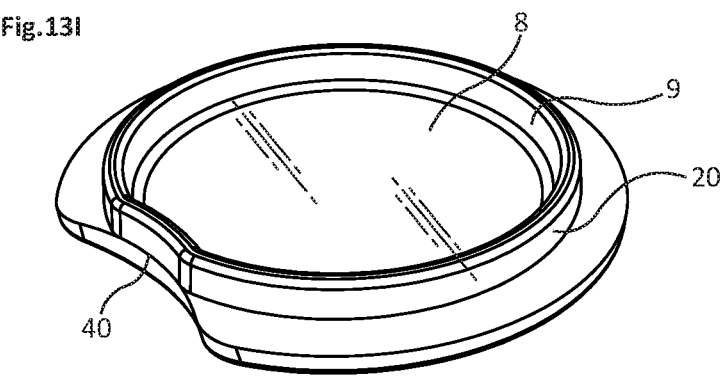

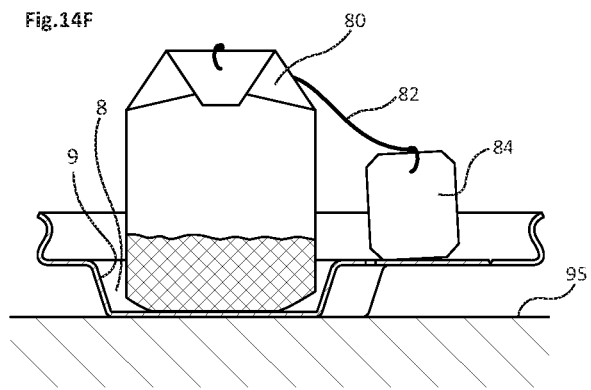
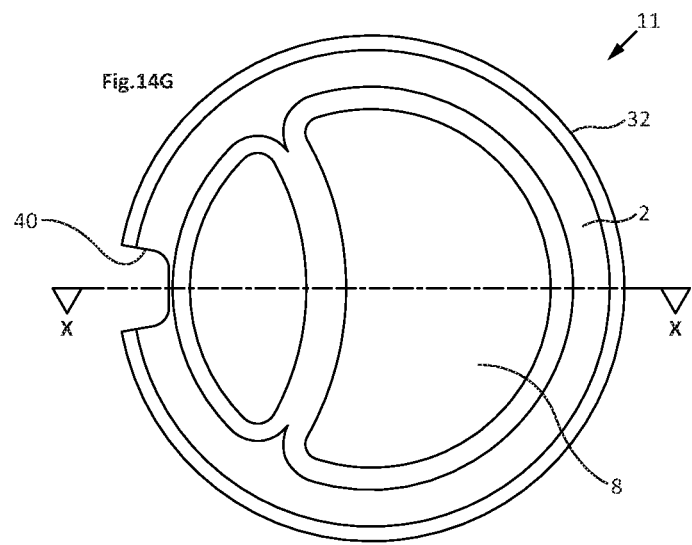
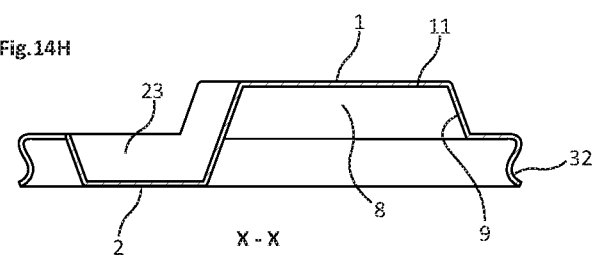

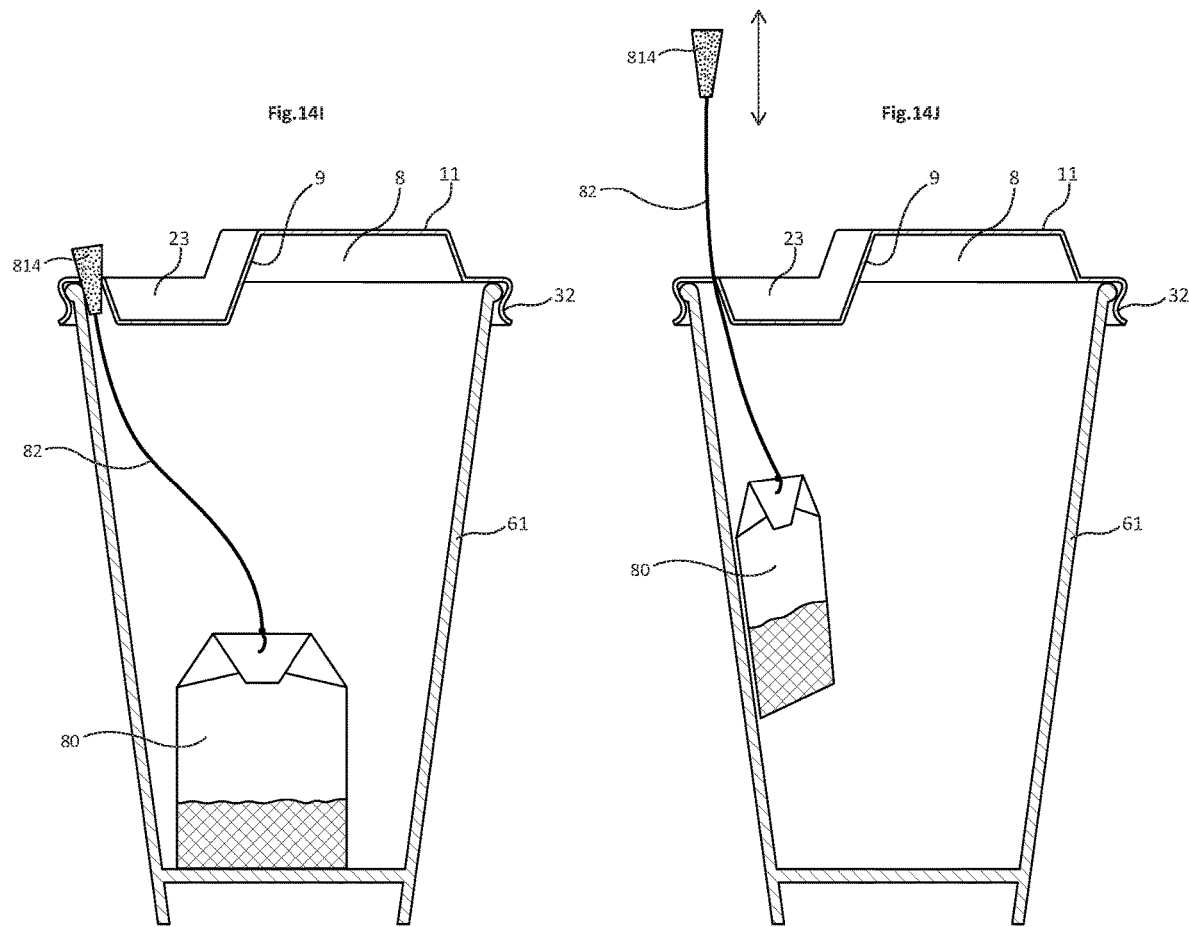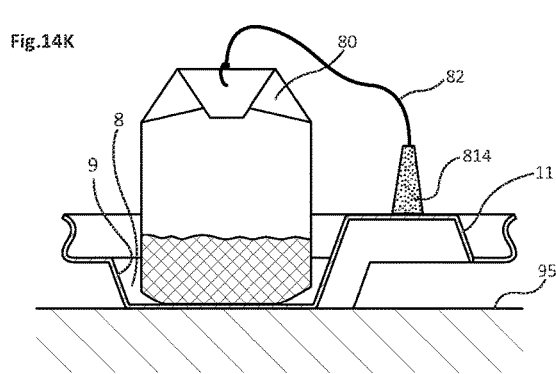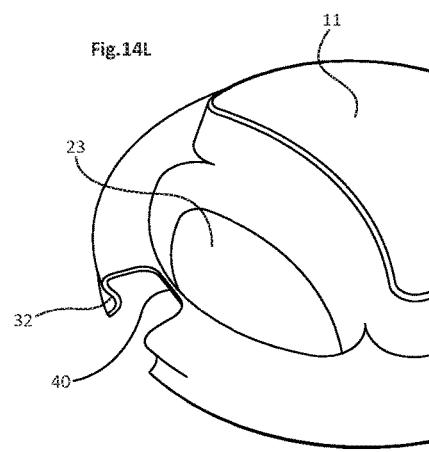

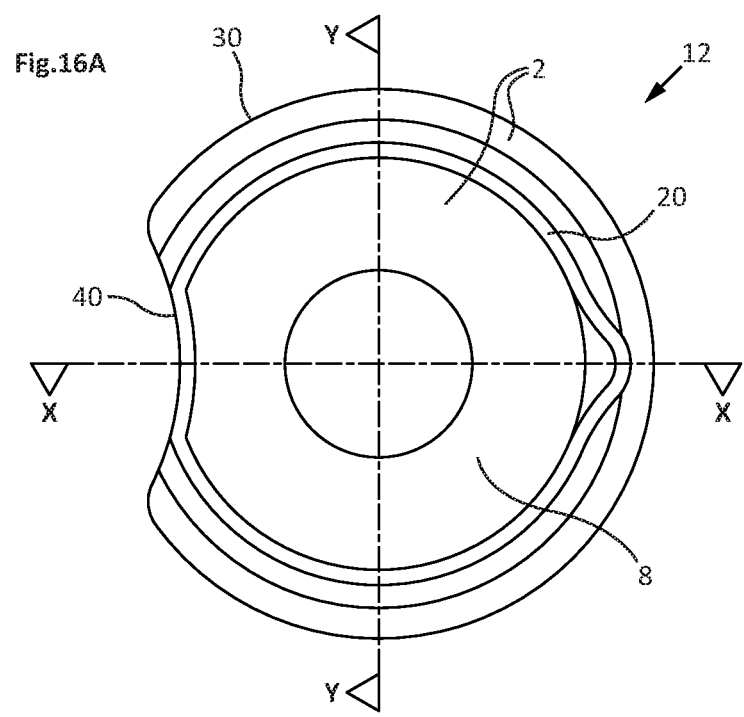
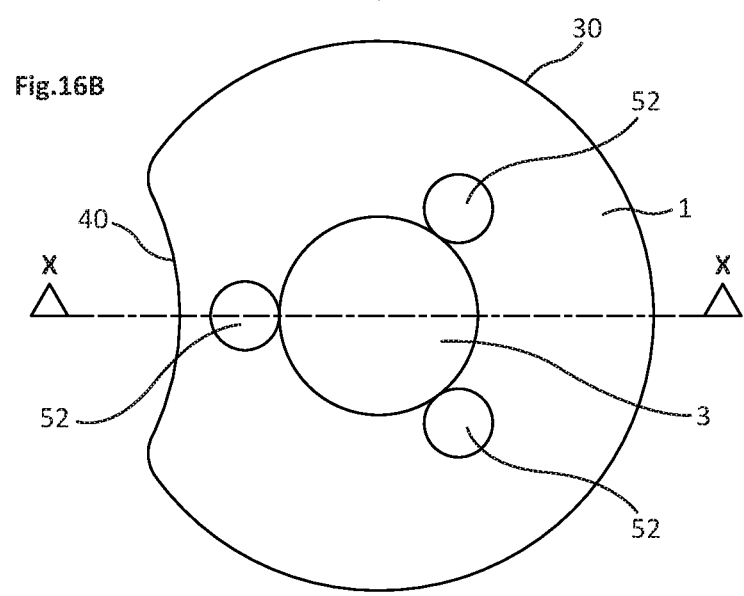
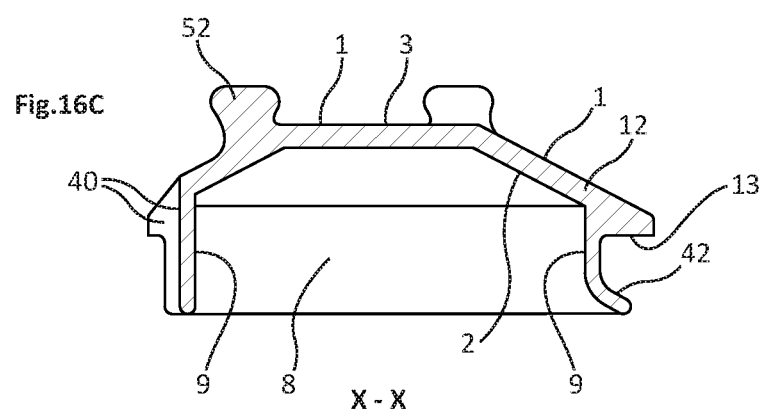

PRIOR ART

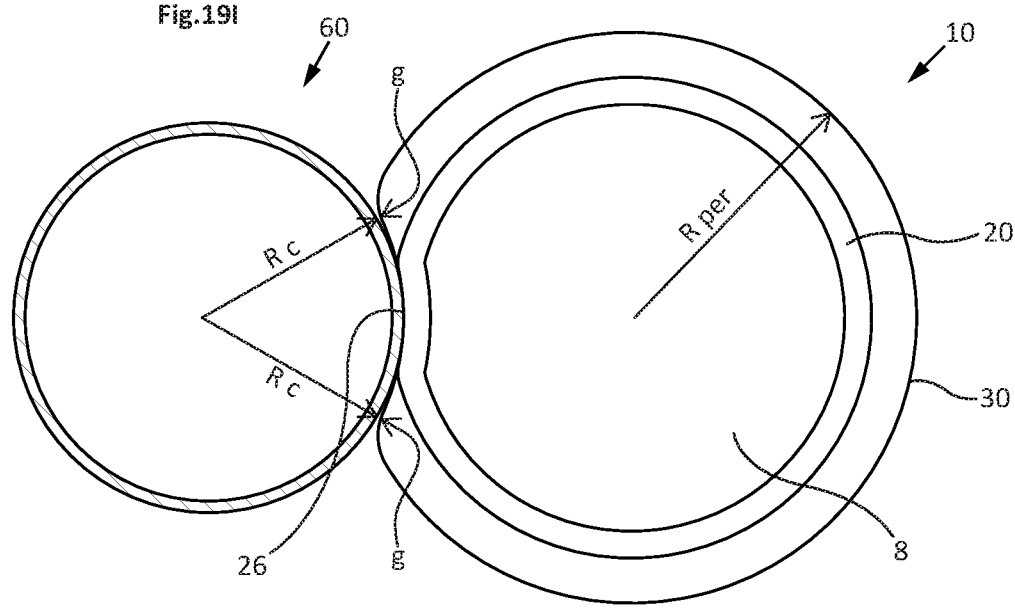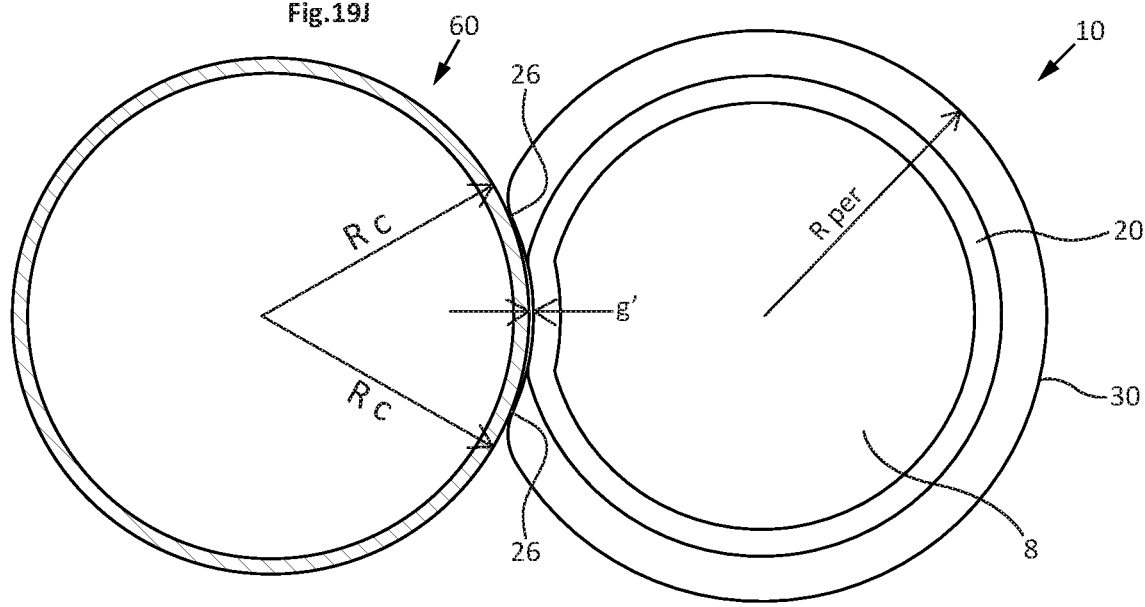

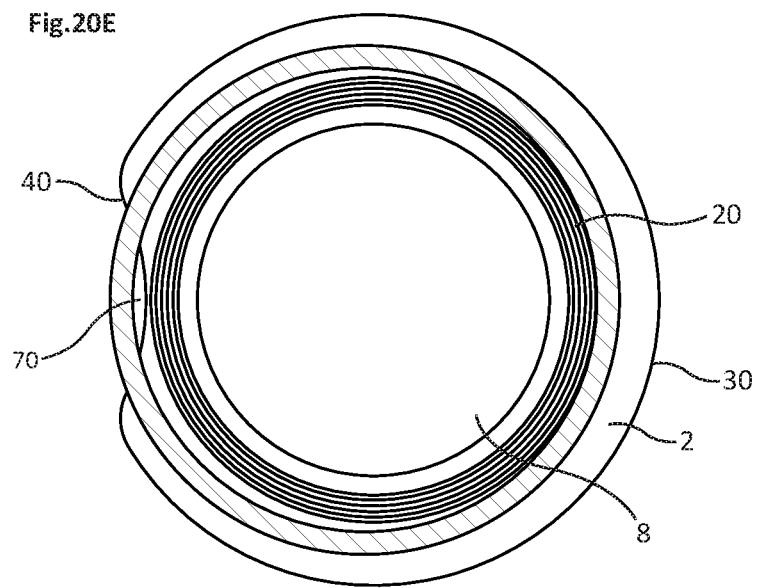

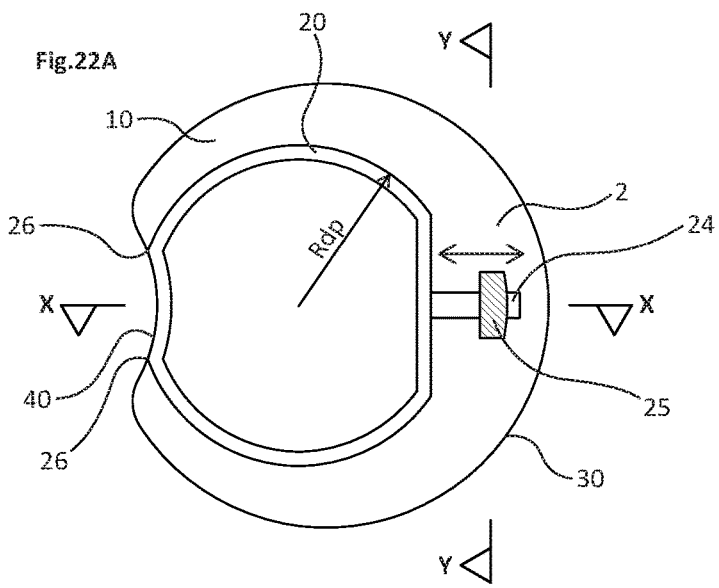
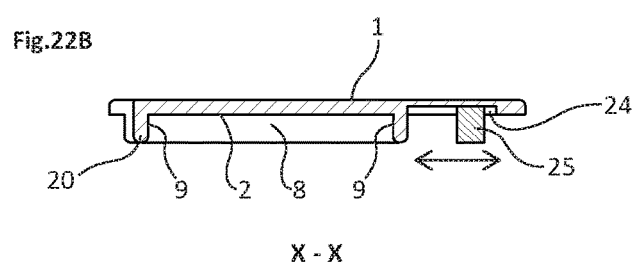
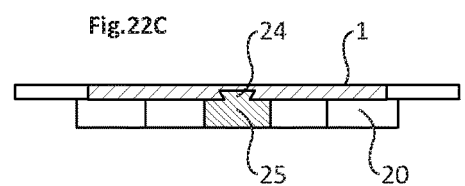
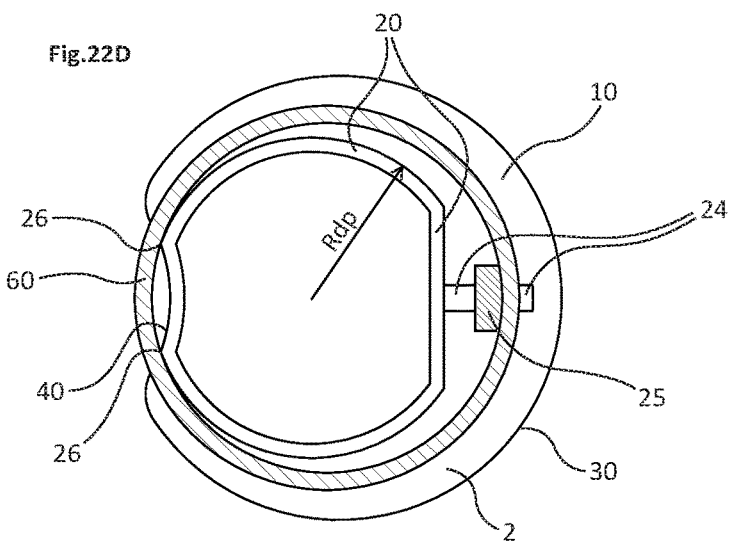

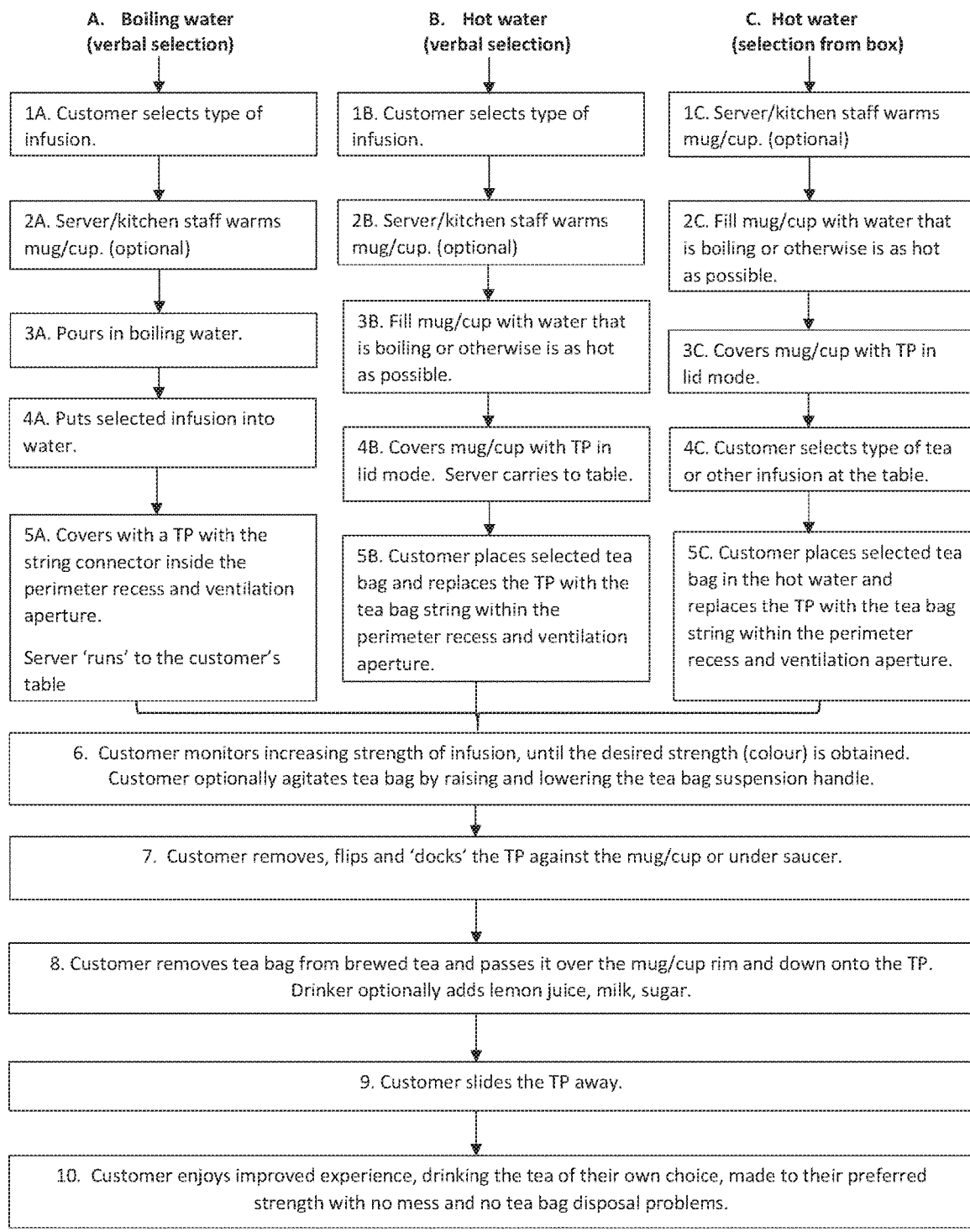
Fig. 23 Making Tea (or other infusion) with a Tea Piece (TP) [Aspect 1]

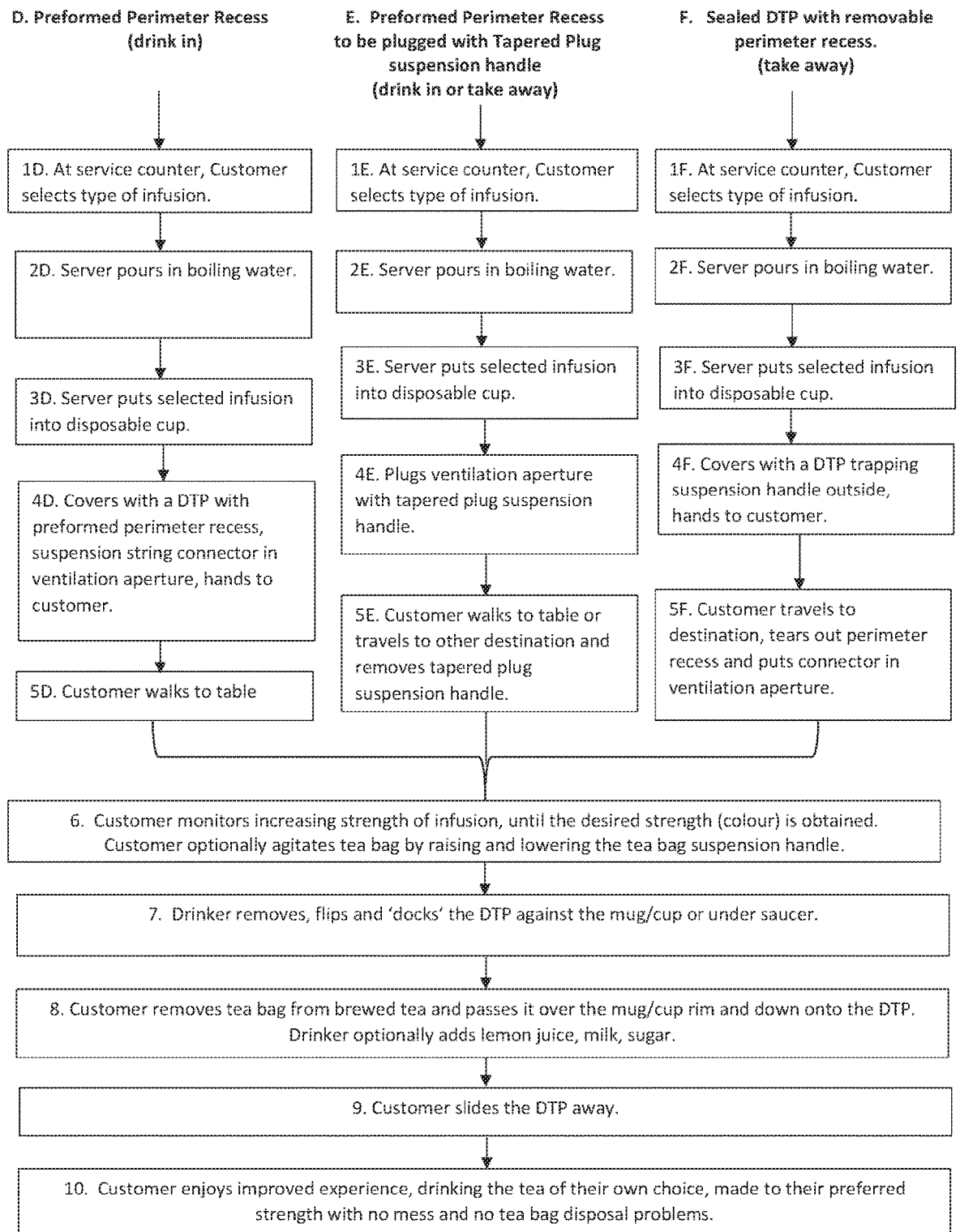

FIG. 25 Making Tea (or other infusion) with a Teapot Tea Piece (TTP) [Aspect 3]
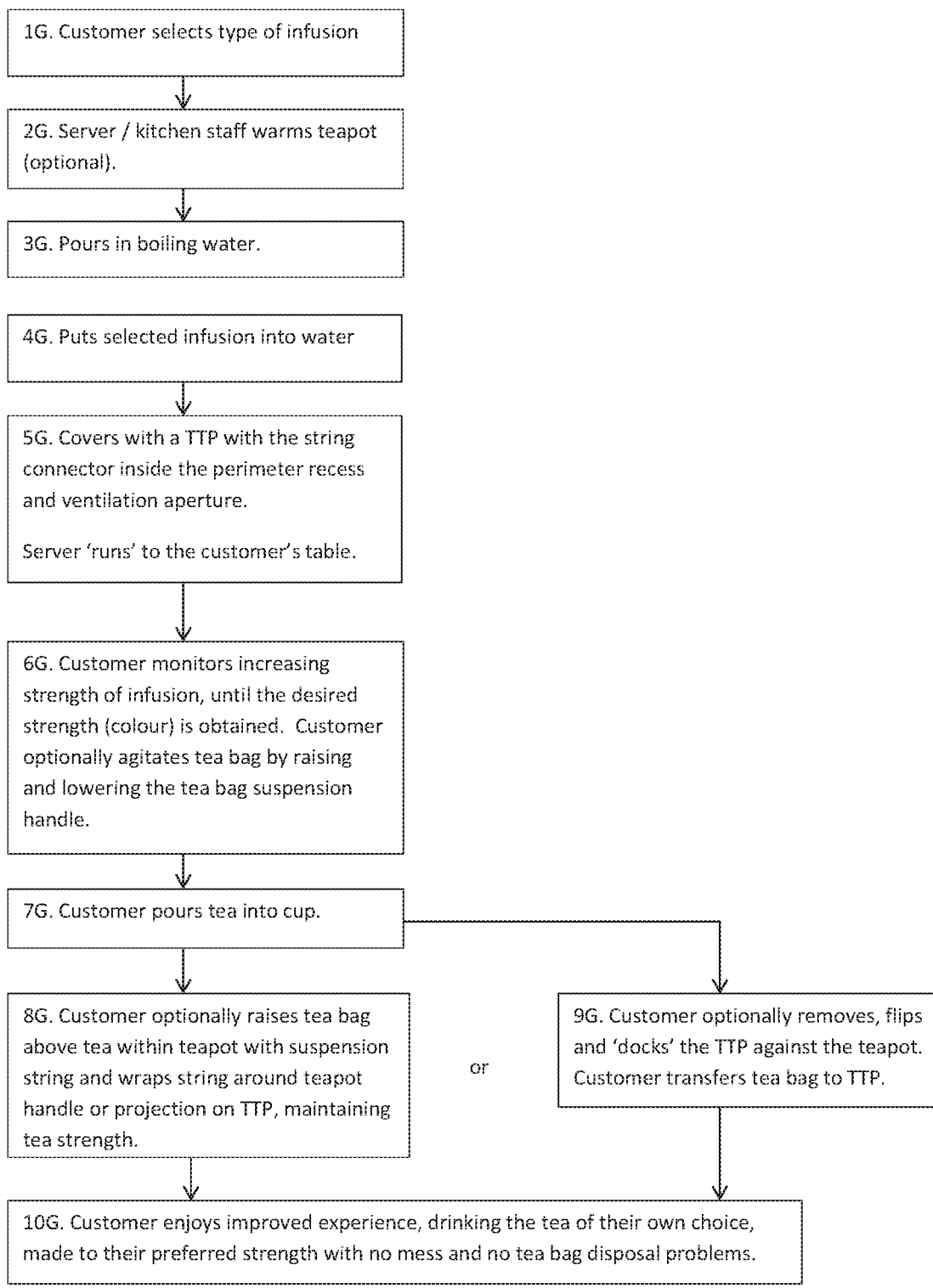

COMBINED VESSEL LID AND TEA BAG RECEPTACLE AND METHOD OF USING

CROSS-REFERENCE TO RELATED APPLICATIONS

This is the U.S. National Stage of PCT/IB2015/055147, filed Jul. 7, 2015, which in turn claims priority to U.S. Provisional Application No. 62/021,522, filed Jul. 7, 2014, the entire contents of all applications are incorporated herein by reference in their entireties.

BACKGROUND

1. Field of the Invention

Various embodiments of the invention relate generally to devices and methods of making infused beverages and more particularly to devices and methods for making tea.

2. Description of Related Art

Tea bags, infusers, mugs, cups, saucers, teapots and teapot lids are well known. The traditional method of making tea with loose leaf tea is now less popular, largely superseded by the use of tea bags. Tea bags in domestic use typically comprise paper with micro-perforations. These are typically disposed of after use in a refuse bin or other available temporary receptacle, such as a spare saucer. Tea bags served in cafes, coffee shops, restaurants, hotels and other hospitality/entertainment locations typically have a suspension handle or "tag" connected to the tea bag by a flexible string, the suspension handle typically made of printed paper, the suspension handle enabling the tea bag to be agitated or "dunked" in the cup to speed up the infusion process and also enabling the hot tea bag to be safely removed from the cup.

There are also several means of overcoming the problem of what to do with a wet tea bag after use if there is no nearby disposal bin. For example, after making tea with a tea bag at a restaurant table, a simple receptacle is occasionally provided such as a very small bowl to contain the tea bag, which is sometimes referred to as a "tea bag tidy", which also enables reuse of the tea bag by the customer to make another cup of tea. An alternative is to place the wet tea bag on a saucer beside a cup of tea which is also on the saucer but this typically causes wet tea to go onto the lower part of the cup, typically leading to dripping from the underside of the cup during drinking, onto a table cloth, table or the drinker's clothes. Another unsatisfactory solution to this problem is to place the cup and wet tea bag on an absorbent paper napkin in a saucer, some tea emanating from the tea bag still finding its way onto the outside of the cup, possibly leading to spillage, as well as not being aesthetically pleasing.

Tea "infusers" are also known, typically washable and reusable, typically comprising an openable, porous container for leaf tea, typically of metal or a plastic or silicone material, with a chain or other flexible or fixed connecting section to a handle to enable manipulation of the porous container, which contains loose tea, in hot water.

Temporary, reusable cup covers, tops or lids are also known, which perform similar functions to a teapot lid of retaining heat during infusion, for example supplied under the Tea forte brand by ASO Developments Ltd, UK. They also keep hot water at a higher temperature if taken to the table during the serving process, before a tea bag is inserted into the hot water. These temporary lids typically comprise a domed cover with a ventilation hole at the central, highest point of the cover, to allow the escape of steam. Special tea bags with a stiff string and suitably small suspension handle to go through the ventilation hole of such a cup lid are also known. However, such cup covers create another disposal problem, as condensation typically forms on the underside of the cover and it cannot be placed on a table, either way up, without condensed water being likely to drain onto the table or table cloth surface, either down the underside of the cover or through the ventilation hole. They also cannot be used for tea bag disposal because of the hole in the lid. Such cup covers are typically served with a tray to catch such free condensed water and a separate used tea bag receptacle.

GB 2261594A discloses a cup lid which can be placed upside down for holding a wet used tea bag. However, there is no ventilation hole and it makes no provision for allowing a tea bag string to be loosely retained and capable of agitation during infusion.

DE 29715610 U1 discloses a cup lid, the underside having a projecting ring with a gap in the ring. The gap in the projecting ring allows water to pass through it when inverted. A narrow slot extends from the lid perimeter to the gap within the open ring and a nose at the inside end of the slot projects on the upper side. On inversion, the inverted lid enables a tea bag to be squeezed, the emanating liquid being channeled through the slot onto the nose which directs the dripping liquid into a cup. The slot is required to be narrow in order to channel the squeezed tea onto the nose. However, the narrow slot makes it difficult to locate a tea bag string within it. The slot provides an opportunity for tea to drip through it on transfer of the used tea bag from the cup onto the inverted lid. Furthermore, the discontinuous nature of the downstand 'ring' would be liable to cause the string connecting a tag to a tea bag to become trapped between it and the inside of the cup if agitation of the tea bag was attempted, in spite of the fact that squeezing of the tea bag against lid, when lifted, is the predominant purpose of the invention of DE 29715610 U1. Also, a used tea bag is liable to fall over after release of the suspension string and is liable to cause leakage through the slot and the hole in the downstand ring.

Disposable lids to disposable cups are well known. These are primarily intended to prevent a beverage spilling from a takeaway disposable cup when being carried, some having provision for drinking through a hole in the lid, typically also having a separate hole for ventilation and release of internal air pressure and to enable the flow of air into the cup when drinking. Some disposable lids have a tear-back facility of a portion of the lid to create a drinking ventilation aperture in the lid. A perimeter drinking ventilation aperture in a disposable lid is typically created by the customer tearing back two sides to a fold line, the acute angle between the torn back section and the adjacent lid section being liable to trap the tea bag string, if repositioned in this ventilation aperture and pulled up and down to agitate the tea bag to accelerate the infusion of the tea. Prior art disposable lids do not provide a means of disposal of a wet tea bag without leaking or a means of allowing a tea bag string to be loosely retained and capable of agitation during infusion.

Prior art teapots typically comprise a handle and a spout for pouring the tea, and are typically provided with a lid that has a ventilation hole. Prior art making of tea with a teapot has the problem that the strength of the tea, which is continually infusing in the pot, varies from too weak to too strong.

Tea "infusers" are also known, typically washable and reusable, typically comprising an openable, porous container for leaf tea, typically of metal or a plastic or silicone material, with a chain or other flexible or fixed connecting section to a handle to enable manipulation of the porous container, which contains loose tea, in hot water.

SUMMARY

One or more embodiments of the present invention overcome one, several, and/or all of the above problems, in providing a combined lid for a tea making vessel and a used tea bag receptacle, in one piece that avoids infused tea or condensed water coming into contact with a table or table cloth or the drinker's clothes. It also has several other functions and advantages over the prior art as outlined below.

According to one aspect of various embodiments, a tableware tea piece comprising a shaped disc comprising a perimeter and two principal surfaces either side of said perimeter, a first principal surface and a second principal surface, wherein said second principal surface comprises a well spaced inside the perimeter, said well being impervious to aqueous liquids, wherein the perimeter comprises a perimeter recess, wherein two end points of said perimeter recess along the perimeter define an angle S relative to a vertex disposed at a geometric center point of the tea piece, wherein the angle S is greater than 15°, wherein the tea piece is capable of being placed to act as a lid on a vessel containing hot water with the first surface uppermost such that the perimeter recess provides a ventilation aperture within a rim of the vessel, wherein the tea piece is capable of inversion and placing on a horizontal surface with the second principal surface uppermost and the first principal surface supporting the piece after said inversion such that the inverted tea piece is capable of acting as a receptacle for a used tea bag such that tea which emanates from the used tea bag is contained on the second principal surface within the well and does not spill onto the horizontal surface.

According to one aspect of various embodiments, a tableware tea piece comprising a shaped disc comprising a perimeter and two principal surfaces either side of said perimeter, a first principal surface and a second principal surface, wherein said second principal surface comprises a well spaced inside the perimeter, said well being impervious to aqueous liquids, wherein the perimeter comprises a perimeter recess, wherein the tea piece is capable of being placed to act as a lid on a vessel containing hot water with the first surface uppermost such that the perimeter recess provides a ventilation aperture within a rim of the vessel, wherein the tea piece is capable of inversion and placing on a horizontal surface with the second principal surface uppermost and the first principal surface supporting the piece after said inversion such that the inverted tea piece is capable of acting as a receptacle for a used tea bag such that tea which emanates from the used tea bag is contained on the second principal surface within the well and does not spill onto the horizontal surface, wherein the second surface comprises a continuous loop drip projection spaced inside a portion of the tea piece perimeter, said drip projection forming a perimeter of the well, wherein when the tea piece is placed to act as a lid on the vessel containing hot water with the first surface uppermost, said drip projection provides a lateral restraint against the inside of the cup if the piece is pushed laterally.

There are three principal product aspects to various non-limiting embodiments, related to the type of vessel with which the tea piece is intended to be used.

Aspect 1 A reusable, washable tea piece, typically of rigid construction, for example of glass, polycarbonate or ceramic material, or optionally of flexible material construction, for example silicone, is intended to be used in conjunction with a reusable, washable cup, mug or glass that is of rigid construction, for example of ceramic, glass or polycarbonate. The tea piece is optionally of variable geometry, to accommodate a range of vessel rim diameter.

Aspect 2 A disposable tea piece, for example of flexible PET, is intended to be used in conjunction with a disposable cup that is not intended for reuse, for example of paper or polystyrene, typically flexible and easily deformable and crushable by hand.

Aspect 3 A reusable, washable tea piece, typically of rigid construction, for example of glass, polycarbonate or ceramic material, or optionally of flexible material, for example silicone, is intended to be used in conjunction with a teapot, for example of rigid ceramic, glass or metal material.

In a first embodiment of a first aspect, a tableware tea piece comprises two principal surfaces, a first principal surface and a second principal surface, a continuous loop drip projection spaced inside a portion of the tea piece perimeter, said drip projection forming part of the second surface and a well, wherein the tea piece perimeter comprises a perimeter recess, wherein said perimeter recess extends over an arc of said tea piece perimeter subtended by an angle of greater than 15°, wherein the tea piece is capable of being placed to act as a lid on a cup containing hot water with the first surface uppermost, said drip projection providing a lateral restraint against the inside of the cup if the tea piece is pushed laterally, which prevents the tea piece slipping sideways off the cup, wherein the perimeter recess provides a ventilation aperture within the rim of the cup, wherein the tea piece is capable of inversion and placing on a horizontal surface with the second principal surface uppermost and the first principal surface supporting the piece after said inversion, wherein the inverted piece is capable of acting as a receptacle for a used tea bag such that any tea which emanates from the used tea bag is contained on the second principal surface within the continuous drip projection and does not spill onto the horizontal surface.

The term "vessel" is intended to include any container capable of containing a volume of water, for example a cup or teapot.

The term "cup" is intended to include any drinking vessel including cups, mugs, beakers and glasses, with or without a handle forming part of the drinking vessel. Tea cups and mugs typically range in inside rim diameter from 65 mm to 90 mm, a range of some 25 mm, and in volumetric capacity from 0.25 litre to 0.5 litre.

The term "reusable cup" is intended to mean any cup that is reusable and washable, for example of ceramic, glass, metal, co-polyester or polycarbonate, optionally insulated or comprising an air or gas-filled void or partial vacuum.

The term "disposable cup" is intended to mean any cup that is typically intended to be disposed of after one use, for example of paper or polystyrene, typically flexible and deformable and crushable by hand.

The term "teapot" is intended to mean any vessel intended for infusing or brewing tea for later transfer to a cup, the teapot typically comprising a spout to aid the pouring of tea and a handle, for example of ceramic, glass, metal, co-polyester or polycarbonate, optionally insulated or comprising an air or gas-filled void or partial vacuum.

The term "tea" is used to denote any type of tea made from tea leaf and all other infusions, including the leaves, blossoms, etc of other plants, coffee beans, camomile and fruit, for example raspberry and mint infusions, and beef or other animal extract.

The term "tea bag" is used to denote a bag containing tea and having sufficient porosity to allow hot water to flow through to contact tea contained therein, to enable the tea to be infused. A tea bag typically comprises perforations or other holes, for example of micro-perforated paper or fine weave fabric. The term "tea bag" also includes the part of a reusable "infuser" that contains tea, for example of metal or silicone, that is perforated, woven or moulded with holes to allow the passage of hot water.

The term "domestic tea bag" is used to denote a tea bag without a suspension handle or string or other connector.

The term "tea bag assembly" is used to denote an assembly comprising a tea bag, a suspension handle and a connector, which connects the suspension handle to the tea bag.

The term "suspension handle" is used to denote the part of a tea bag assembly that is intended to be held when lowering a tea bag into hot water or subsequently retrieving the tea bag. A suspension handle or "tag" optionally comprises a paper or filmic or woven material or plastic material, that is optionally stapled or adhered to the connector, for example of string, which connects the suspension handle to the tea bag. The term "suspension handle" also applies to a loop or knot or other means of adapting a string or other connector so as to be held. The term "suspension handle" is also used to denote the part of an infuser intended to be held in order to manipulate the infuser.

The term "connector" is intended to denote a flexible or rigid connecting material, for example a string, chain, wire or flexible silicone material, connecting the suspension handle to the tea bag.

The term "infuser" is used to denote a reusable and washable device intended to contain tea, typically leaf tea, and also typically comprising a suspension handle and connector. The term "tea bag", as used in relation to an infuser, is typically a container of metal, plastic or silicone material that is water permeable, typically comprising a closing or closure component, for example a hinged lid, the lid also being optionally water permeable, or a removable component, to enable dry leaf tea to be inserted into the infuser tea bag and the wet leaf tea to be subsequently removed, to enable cleaning of the infuser for reuse. The infuser tea bag or container optionally comprises woven wire or perforations to provide the desired water permeability. The connector is optionally of rigid or semi-rigid material, for example metal wire, or a flexible material, for example a metal chain or strip of silicone. Optionally, the infuser tea bag, suspension handle and connector are of integral construction, for example of metal wire or moulded silicone.

The "first principal surface" is also referred to herein as "surface 1" and the "second principal surface" is also referred to herein as "surface 2", for brevity. "Side 1" is used to denote the side of the tea piece facing surface 1 and "Side 2" is used to denote the side of the tea piece facing surface 2.

The term "teapot" includes a coffee pot, a jug or a flask. A teapot typically comprises a pouring spout and handle.

The term "vessel" is used to denote an open container for holding a liquid, including a cup, mug, beaker, glass, teapot, coffee pot, jug, flask, any of the aforementioned with hollow sides and/or bases and a vacuum flask.

The term "perimeter recess" is used to denote a recess or indent in the perimeter of the tea piece. When the tea piece is acting as the lid to a vessel, for example a cup or teapot, the perimeter recess forms a "ventilation aperture" between the perimeter recess and the inside of the rim of the vessel. The ventilation aperture allows steam to emanate. It also provides a convenient void through which a tea bag connector can pass, small enough to maintain the suspension handle outside the vessel and tea piece. The perimeter recess is preferably of sufficient width within which to easily locate a tea bag connector and is preferably of smooth curvature to enable the connector to be easily manoeuvred so that it is in the ventilation aperture created between the perimeter recess and vessel rim.

The ventilation aperture that is formed between the perimeter recess and vessel rim preferably enables the free, up and down movement or agitation of the tea bag to accelerate infusion. Preferably, the perimeter recess also enables the inverted tea piece to "dock" close to and preferably contiguously with the vessel on a horizontal surface, to reduce or eliminate the risk of tea leakage onto the horizontal surface when transferring the used tea bag from the vessel into the well of the inverted tea piece.

The term "tea piece perimeter radius" is intended to mean the radius of the circle forming the perimeter of a tea piece that is substantially circular apart from the extent of the perimeter recess. If the tea piece perimeter is not substantially circular, for example if it comprises a multi-sided shape such as an octagon, the tea piece perimeter radius is that of a circle of the same area as the alternative perimeter geometry.

The term "perimeter grip profile" is used to denote any perimeter profile to a tea piece that exerts a lateral force on a cup when the tea piece is applied as a lid to the cup. A "perimeter grip profile" optionally has liquid sealing properties along its length around a cup perimeter. The lateral force is optionally applied to the outside and/or inside of the cup, typically within a depth of less than 10 mm, preferably less than 6 mm, below the rim of the cup.

The term 'transparent material' is used herein to denote a material that, if used to make a tea piece according to various embodiments of the present invention, allows the strength of the tea infusing in a vessel to be visibly identifiable through the transparent material. Preferably, the transparent material is clear, for example water clear, or no more tinted than common glass.

The term "well" is used to denote the area of surface 2 intended to receive a used tea bag upon inversion of the tea piece, which is impervious to aqueous liquids, preferably enables a used tea bag to be easily located within its plan area and has a cubic capacity or volume suitable for retaining any tea that emanates from a used tea bag. The well preferably comprises a minimum clear internal width of greater than 50 mm, and more preferably greater than 65 mm. The well preferably comprises a volume or cubic capacity of liquid that it will contain, when the tea piece is inverted on a horizontal surface, of greater than 0.5 cc, 1.0 cc, 3.0 cc, 5.0 cc, 10.0 cc and/or 20.0 cc.

The well preferably comprises a continuous "well wall", for example the inside surface of a continuous drip projection or a fold in the construction. The well wall comprises a continuous surface that is optionally sloping, for example to assist the extraction of a tea piece from a mould during manufacture. However, if the tea piece is placed on a horizontal surface with side 2 facing upwards, the surface of a continuous well wall is preferably at an angle of less than 45° to vertical. A continuous well wall has a height greater than 1 mm, preferably greater than 2 mm, more preferably greater than 5 mm, and even more preferably greater than 8 mm.

The base of the well optionally comprises a raised portion of surface 2 when the tea piece is inverted, on which a used tea bag is optionally intended to be located, which allows tea from the used tea bag to drain into a lower portion of the well. This feature assists re-use of the tea bag with less risk of spillage, and subsequent disposal of the tea bag with less risk of spillage.

According to various embodiments, the well not only accommodates the base of the used tea bag when lowered into it but preferably contains any leaking fluid if the tea bag falls to one side, a common occurrence as tea bags are typically unstable after the suspension string is released.

In a number of embodiments of the first aspect, the well comprises a continuous "drip projection" or "skirt", typically configured and sized to be locatable inside the rim of a vessel and is optionally spaced inside a part of or whole of the tea piece perimeter. The drip projection prevents the tea piece from sliding sideways off a vessel when acting as the lid to the vessel. It also enables condensation that forms on or migrates towards the outside of the tea piece to drip from its bottom edge into the hot water rather than leaking onto the outside of the vessel.

Optionally, the drip projection is coterminous with a portion of the edge of the perimeter recess.

Optionally, the drip projection is indented and the indent is coterminous with the perimeter recess.

In various non-limiting embodiments, the perimeter recess plays a number of potential roles, including to provide:

(i) sufficient width within which to easily locate a tea bag string connector and smoothly manoeuvre it into the ventilation aperture created between the perimeter recess and vessel rim, (ii) a ventilation aperture that is sufficiently small to prevent the suspension handle of a tea bag assembly slipping into the hot water.

(iii) a ventilation aperture that enables the free, up and down movement or agitation of the tea bag to accelerate infusion, and (iv) the ability to 'dock' the inverted tea piece close to and preferably contiguously with the vessel on a horizontal surface, to reduce or eliminate the risk of tea leakage onto the horizontal surface when transferring the used tea bag from the vessel into the well of the inverted tea piece.

The shortest or straight line dimension between the two extremities of the perimeter recess, for example the chord length between the points at which it deviates from a circular perimeter, is typically greater than 10 mm, preferably greater than 25 mm, more preferably greater than 50 mm, and even more preferably greater than 75 mm.

In various of the above embodiments, when the tea is infusing, the string connector or other connector preferably passes through the ventilation aperture and the suspension handle is located outside the space contained by a vessel and the tea piece acting as a lid to the vessel.

Preferably, the perimeter recess is configured and sized to prevent the suspension handle slipping into the hot infusion through the ventilation aperture. The ventilation aperture preferably has a maximum dimension in any direction (e.g., radial direction relative to a center of the tea piece or a direction tangential to a circumferential direction) of less than 30 mm, preferably less than 25 mm and more preferably less than 20 mm. Preferably, the ventilation aperture has a plan area of greater than 20 mm$^2$, 50 mm$^2$, 100 mm$^2$, 150 mm$^2$ and/or 200 mm$^2$.

Optionally, the perimeter recess is shaped, for example to an arc of a circle, that enables the perimeter recess edge to be contiguous (fit snugly) with the outside of the vessel after the inversion of the tea piece, in order to reduce the likelihood of, or to prevent, drips from a wet, used tea bag falling onto a table cloth or table during transfer from the infused tea in the vessel to the inverted tea piece acting as a receptacle for the wet, used tea bag.

Optionally, the first principal surface comprises a depressed area, for example a part-spherical depression, that facilities a stable seating of the tea piece upon inversion, for example on a table cloth. Such a depression is optionally used during the serving of a cup with a tea piece acting as a lid to the cup, the cup typically containing hot water, for example to hold a dry tea bag or, for example if the tea bag is in the hot water, a wedge of lemon and/or a packet of sugar or sweetener.

Upon inversion, the tea piece is preferably stable on a horizontal surface, to reduce the chances of the tea piece being rocked to an angle that could allow leakage of tea that has emanated from a used tea bag. Preferably the external points of support of the tea piece when inverted and placed on a horizontal surface are disposed on the horizontal surface at a distance from the centre of gravity of the tea piece of not less than 10 mm, preferably of not less than 15 mm, and more preferably of not less than 20 mm.

Optionally the second principal surface comprises a projection, for example the other side of a depressed area in the first principal surface. Such a projection, for example of a dome shape, assists the drainage of tea from a used tea bag away from the tea bag, reducing the risk of tea spillage if the tea bag is reused, for example returning it to a cup into fresh hot water.

Optionally, the second principal surface comprises a circular depression or is otherwise suited to receiving the base of the cup if the piece is optionally used as a saucer instead of a receptacle for the used tea bag following its inversion, typically if there is another means of disposal of the wet tea bag. In this use, it is preferable to have a paper napkin or other means of drying off free water condensation on the second surface before using the piece as a saucer. In this embodiment, the first surface optionally has a raised circular section or other means of acting as a stable base for its alternative use as a saucer. Such a raised circular section surrounds a convenient area on which to put an unused tea bag, a lemon wedge or packet of sugar or sweetener during serving of the cup containing hot water.

In various embodiments, the drip projection is firstly intended to prevent water, which has condensed on the second surface during infusion, dripping outside the rim of the cup. It is continuous throughout its length to form a closed loop well wall when observed from the second surface side of the piece, to cause tea emanating from the wet tea bag to be contained on the second surface, within the closed loop drip projection.

The tea piece optionally comprises glass, ceramic or plastic material, for example polycarbonate, melamine or polystyrene, or silicone or paper or card, optionally coated.

Various embodiments of the invention comprising a flexible material, for example silicone, are optionally moulded or otherwise formed to have a perimeter grip profile, which makes the locating of the tea piece as a lid more secure.

Optionally, the tea piece comprises a perimeter grip profile over the whole length of the perimeter except for the perimeter recess. Preferably the perimeter grip profile provides an effective seal along its length between the tea piece and the cup, which reduces the likelihood of spillage from the cup, for example when a cup containing hot water or tea is being carried from a service counter to a table or, as another example, being passed from a server to a seated customer on a plane or train.

A tea piece with a perimeter grip profile applied to a cup requires a force greater than its own weight or mass to remove it from the cup, whereas a tea piece without a perimeter grip profile can be removed vertically by a force no greater than the weight of the tea piece.

The well of such a flexible tea piece is optionally formed by a drip projection or by folding or other suitable shaping of the material, for example by creating a bowl shape.

In various non-limiting embodiments, the perimeter recess is preferably of a width and shape to enable easy positioning of a tea bag connector within the perimeter recess before lowering the tea bag into the hot water. If the tea piece perimeter is predominantly circular, then the perimeter recess deviates inside that circle by a radial deviation greater than 3 mm, 5 mm, 10 mm and/or 15 mm. Preferably the perimeter recess does not comprise an angle or curvature of radius less than 3 mm. The perimeter recess 40 should preferably enable 'docking' of the perimeter recess against a cup 60 (not shown) of circular plan, after inversion of the tea piece, such that the external surface of the cup intrudes into a notional continuation of the circle 31 of radius Rper by a distance of greater than 1 mm, 2 mm, 3 mm, 5 mm, 10 mm and/or 15 mm.

If the perimeter of the tea piece is not predominantly circular but another shape, for example is hexagonal or octagonal, then the same standards apply to a notional circle of the same plan area as the another shape.

Optionally, there is a length between two points on the vessel perimeter, over the extent of the perimeter recess, in which the gap between the vessel and tea piece, when measured radially from the vertical axis of the vessel, is less than 1 mm, preferably less than 0.5 mm, and more preferably less than 0.2 mm. Also, the length between the two points is greater than 10 mm, preferably greater than 20 mm and more preferably greater than 30 mm. These 'docking' features reduce the likelihood of spillage of tea when transferring a used tea bag from a vessel to an inverted tea piece compared to prior art cup lids.

Various non-limiting embodiments are of variable geometry, typically to enable a wide range of vessel diameter to be accommodated by an individual tea piece, for example comprising an adjustable lateral restraint to bear against the inside of a vessel rim.

The tea piece acting as a lid reduces the rate of cooling of the hot water or infusion, which results in a faster rate of infusion and stronger potential infusion than would otherwise be the case. The reduction in rate of cooling is greater if there is a relative flow of air over the cup, for example if a cup of hot water is being carried by a server from a kitchen area to a table within a restaurant or other customer area.

Optionally, the tea piece is transparent, which enables the strengthening infusion to be observed, facilitating the desired strength of infusion to be achieved, then terminated by the removal of the used tea bag onto the inverted tea piece.

Optionally the tea piece is used as a cover to the cup after removal of the tea bag and its disposal, to keep the tea warm before and/or during the duration of drinking the tea.

Various non-limiting embodiments provide tea-making functionality similar to a teapot, of a covered infusion environment, to increase the efficiency of infusion. However, it has the advantage over a conventional teapot service of the desired strength of tea being determined by removal of the used tea bag onto the inverted tea piece, whereas the strength of tea in a teapot is continually changing, from too weak to too strong.

Optionally, the tea piece has enhanced insulating properties, for example comprising an internal partial vacuum, air gaps or bubbles, for example of sealed foam construction, further improving heat retention during the serving of the vessel containing hot water and/or the infusion, enabling the required strength of tea to be achieved even faster, and/or keeping the tea warmer before and during the duration of drinking the tea.

Optionally, the vessel has enhanced insulating properties, further improving heat retention, for example by the sides and/or base incorporating an air gap or partial vacuum or comprising an insulating material.

According to a second aspect of various non-limiting embodiments, the tea piece is disposable and intended to be disposed of after one use, typically in conjunction with a disposable drinking vessel, for example a paper, card or polystyrene cup. The disposable tea piece typically comprises a thin plastic material, for example of PET, PP or PS, that is moulded or pressed to clip over the edge of the cup, optionally to provide an effective seal over a length of the cup rim. The well is typically formed as part of the continuous thin plastic material, suitably moulded and/or pressed. Optionally, the disposable tea piece is configured to enable drinking from the cup while the tea piece is clipped on as a lid to the cup. Optionally, the perimeter recess is pre-formed or is created by the user, for example by tearing along a pre-weakened locus, for example by a notch.

According to a third aspect of various non-limiting embodiments, the tea piece is intended to be used in conjunction with a teapot. The tea piece acts initially as the tea pot lid, enabling one or more tea bags to be infused with the tea bag handle(s) maintained outside and prevented from slipping into the teapot, before being removed and placed on the inverted tea piece. One feature of this arrangement is that the tea in the teapot can be infused to the desired strength, instead of the strength increasing continuously from too weak to too strong for the intended drinker.

Furthermore, the tea bag(s) are easily replaced into the tea-pot if more hot water is added, a conventional procedure in the service of tea with a teapot. When the desired strength of tea is achieved with the added hot water, the one or more tea bags are again transferable to the inverted tea piece without dripping onto a table surface.

Alternatively, the tea piece enables a tea bag to be raised within the teapot, for example by a string connector being wrapped around a projection on the first surface of the tea piece or the tea pot handle, such that after the tea has been poured initially, the suspended tea bag is located above or partly above the remaining hot tea, preventing or reducing the ongoing, unwanted strengthening of the infusion.

According to a fourth aspect of various non-limiting embodiments, there is a method of making an infusion using the tea piece of claim 1, a vessel and a tea bag, said method comprising:
(i) placing hot water into a vessel comprising a rim,
(ii) placing the tea piece on the rim of the vessel such that the first principal surface is uppermost, wherein a ventilation aperture is formed between the rim of the vessel and the perimeter recess of the tea piece,
(iii) locating the tea bag in the hot water
(iv) allowing time for the tea to infuse, (v) removing the tea piece, and
(vi) removing the used tea bag from the hot water.
Optionally,
(vii) the tea piece is inverted and the used tea bag is placed onto the inverted tea piece, preferably within the plan area of the well.

Optionally, the tea bag is inserted into the vessel before or after the hot water.

Optionally, the tea bag is part of an assembly comprising the tea bag, a suspension handle and a connector which connects the tea bag to the suspension handle.

Optionally, the tea bag is placed into the hot water by means of the suspension handle and connector.

Optionally, the hot water is boiling water.

Optionally, the connector passes through the ventilation aperture and the suspension handle is located outside the space contained by the vessel and tea piece acting as a lid or cover to the vessel. The ventilation aperture enables ventilation of steam and agitating the infusing tea, typically by repeatedly lifting the tea bag up and allowing it to drop, by means of the suspension handle and connector, sometimes referred to as "dunking" the tea bag, the infusion process sometimes referred to as steeping or brewing the tea, sometimes referred to as tea liquor.

Optionally, the tea piece is inverted and optionally is then located on the same horizontal surface as the vessel and is optionally placed against the vessel, to enable the tea bag to be transferred onto the tea piece without dripping onto the horizontal surface, for example of a table or tablecloth or service counter. Optionally, the perimeter recess is designed and configured to fit close to and preferably contiguously with the outside of the vessel, to further reduce the possibility of tea from the used tea bag spilling onto the horizontal surface.

The connector is optionally string, optionally thread, twine, fine cable or monofilament, preferably flexible, optionally contained within the tea bag before being pulled out from the tea bag before immersion of the tea bag in the hot water.

The suspension handle typically comprises paper, card or plastic material or a loop or other termination of the string and enables the tea bag to be suspended from the string by a person holding the suspension handle, typically between thumb and first finger, for the purposes of placing the tea bag into the hot water in the cup and optionally agitating the tea bag to speed up the infusion process. Following the desired degree of infusion or brewing of the tea, the suspension handle and string are typically used to retrieve the tea bag from the hot tea liquid and, following inversion of the piece and locating it onto a table or other horizontal surface, placing the wet tea bag on the second surface of the piece, preferably within the well volume.

The tea is optionally made from boiling water poured onto the tea bag directly from a kettle or other water boiling device, or the tea bag being placed into a vessel containing hot water. In either case, according to methods according to various embodiments of the present invention allows the individual drinker to determine their preferred strength of tea in a location remote from a kettle or other means of boiling water, as they are in control of the duration of infusion. It also allows the drinker or other user of the tea piece to overcome some of the limitations of the prior art. The lid retains heat, reducing the rate of cooling of the hot water or infusion. The ventilation aperture between the tea piece and the rim of the cup allows the escape of steam, while typically retaining the tea bag connector, enabling the suspension handle to be maintained outside the cup, and the optional agitation of the tea bag by raising and lowering of the tea bag suspension handle. The tea piece provides a convenient holding receptacle for the wet tea bag after infusion, following its inversion, enabling reuse of the already used tea bag and/or its clean and convenient disposal.

Optionally, a part or all of the tea piece is transparent, maintaining visibility of the tea while it is infusing to the required strength of tea. Various non-limiting embodiments of the invention enable alternative uses of the piece following tea making, either for wet tea bag disposal or reuse, or as a saucer for the cup of tea, or as a lid to keep the tea hotter than it otherwise would be before and for the duration of drinking the tea. Various non-limiting embodiments of the invention enable a reduced quantity of tea to be incorporated into each tea bag because of the increased efficiency of infusion compared to the method of making tea with a tea bag in an open cup. The first and second aspects of various embodiments the invention avoid the spilling of tea from a teapot when serving or pouring, caused by a poorly designed or constructed teapot or the person holding the teapot.

The tea piece is optionally used for methods of making tea which do not comprise a tea bag assembly comprising a tea bag, a suspension handle and a string connector. For example, making tea with a domestic tea bag without a suspension handle or string connector still benefits from the heat retention provided by the tea piece as a cup lid. The domestic tea bag is typically dropped into the hot water and is typically removed from the hot water and placed on the inverted tea piece by a tea spoon, a fork, a stirrer or other implement, which is optionally also used to agitate the tea bag or press the tea bag against the side or base of the vessel to accelerate the steeping of the tea or other infusion. A stirrer, typically a slim piece of disposable wood, is optionally used to agitate the tea bag through the ventilation aperture.

Optionally the tea piece is used to make tea in conjunction with an infuser. Preferably, the infuser has a flexible connector, for example a chain or is made of a flexible material, for example silicone, or is suitably shaped to allow the connector part of the infuser to pass through the ventilation aperture and the suspension handle be located outside the cup and tea piece and be capable of manipulating the infuser up and down to accelerate the infusion.

Optionally, the tea piece is used in conjunction with a transparent cup, to further assist identifying when the infused tea is of the desired strength.

Non-limiting aspects of various embodiments eliminate or reduce the requirement to clean away tea which has been spilled from a teapot or emanating from a wet tea bag onto a table cloth or table surface or the clothes of a customer or server, reducing laundry bills or increasing the duration of use of disposable table cloths. One or more embodiments also prevent the annoyance of a person having to leave their seat to dispose of a wet tea bag or ask for a suitable disposal receptacle. One or more of these embodiments, through their previously stated non-limiting efficiencies and avoidance of mess, enables a faster turnaround time of tables in a restaurant or other hospitality location.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of various embodiments as well as other objects and further features thereof, reference is made to the following description which is to be used in conjunction with the accompanying drawings, where:

FIG. 1A is a plan of a tea piece according to various embodiments from the side of surface 2 in which a drip projection is spaced within the outside of the perimeter recess.

FIGS. 1B-1F are diagrammatic cross-sections through different exemplary tea pieces according to FIG. 1A.

FIG. 2A is a plan of a tea piece according to various embodiments from the side of surface 2 in which a drip projection is coterminous with part of the outside of the perimeter recess.

FIGS. 2B-2F are cross-sections through different exemplary tea pieces according to FIG. 2A.

FIG. 3A is a plan of a tea piece according to various embodiments from the side of surface 2 in which a drip projection is coterminous with the outside of the recess and the recess is scalloped.

FIGS. 3B-3F are diagrammatic cross-sections through different exemplary tea pieces according to FIG. 3A.

FIG. 4A is a cross-section through the scalloped embodiment of FIG. 3E located on the rim of a cup.

FIG. 4B is a cross-section through the scalloped embodiment of FIG. 3E inverted and the perimeter recess contiguous with the cup.

FIGS. 8A-8I are diagrammatic cross-sections through a cup and one example method of making tea using the tea piece.

FIGS. 12C-12E are cross-sections through the tea piece of FIGS. 12A and 12B.

FIGS. 12F-12H are elevations of the tea piece of FIGS. 12A and 12B.

FIG. 12I is a perspective of the tea piece of FIGS. 12A and 12B.

FIGS. 13C-13E are cross-sections through the tea piece of FIGS. 13A and 13B.

FIGS. 13F-13H are elevations of the tea piece of FIGS. 13A and 13B.

FIG. 13I is a perspective of the tea piece of FIGS. 13A and 13B.

FIG. 14F is a cross-section through the inverted tea piece of FIG. 14B.

FIG. 14G is a plan of another disposable tea piece, from the side of surface 2.

FIG. 14H is a cross-section through the disposable tea piece of FIG. 14G.

FIG. 14I is a cross-section through the disposable tea piece of FIG. 14G affixed to a drinking vessel with a tea bag assembly comprising a tapered plug suspension handle.

FIG. 14J is a cross-section through the disposable tea piece of FIG. 14G affixed to a drinking vessel with a tea bag assembly comprising a tapered plug suspension handle, showing the handle being moved up and down.

FIG. 14K is a cross-section through the inverted tea piece of FIG. 14G.

FIG. 14L is a perspective of the tea piece of FIG. 14G.

FIG. 16A is a plan of a teapot tea piece from the side of surface 2.

FIG. 16B is a plan of the teapot tea piece of FIG. 16A from the side of surface 1.

FIG. 16C is a cross-section X-X through the teapot tea piece of FIG. 16A.

FIG. 19H-19J are diagrammatic plans from immediately above a tea piece 'docked' against a drinking vessel shown in cross-section.

FIG. 20E is a cross-section through vessel 60 immediately below and viewing upwards towards surface 2 of tea piece 10 located on its rim.

FIG. 22A is a plan from the side of surface 2 of a tea piece of variable geometry.

FIGS. 22B and 22C are cross-sections through the tea piece of FIG. 22A.

FIG. 22D is a cross-section through vessel 60 immediately below and viewing upwards towards surface 2 of tea piece 10 located on its rim.

FIGS. 23-25 are flow charts showing exemplary methods of making tea with a tea piece according to various embodiments.

Figure 5A:
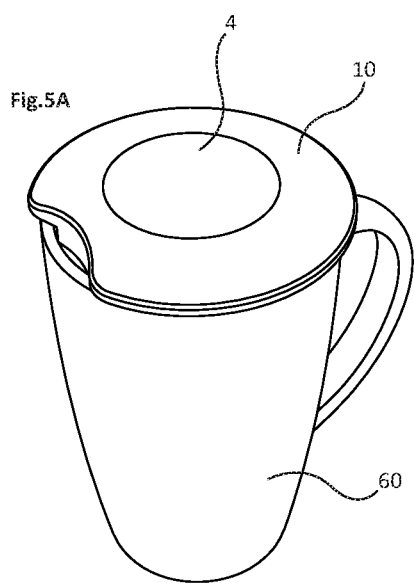
FIG. 5A is a perspective view of the scalloped embodiment of FIG. 3E located on the rim of a cup.

In the figures, for clarity, only features on the facing surface are shown, features on a remote surface not indicated, even with transparent embodiments.

DETAILED DESCRIPTION OF EXEMPLARY EMBODIMENTS

The first aspect of various non-limiting embodiments typically concerns tea pieces designed to suit ceramic, glass or plastic cups which are intended to be reused.

In FIG. 1A, tea piece 10 comprises continuous drip projection 20 spaced inside perimeter 30 throughout its length, including perimeter recess 40. In the embodiments of cross-sections X-X in FIGS. 1B to 1F, the drip projection 20 is a continuous projection within the area of surface 2. The perimeter 30 and continuous drip projection 20 are typically circular apart from the perimeter recess 40, the drip projection 20 being designed to sit within the rim of a cup while ledge 13 of the tea piece 10 sits on the rim of the cup.

In the embodiments of FIGS. 1B to 1F, well 8 is located within continuous drip projection 20 and well 8 comprises continuous well wall 9.

In the embodiment of FIG. 1B, surfaces 1 and 2 are predominantly planar.

The tea piece of FIG. 1C is domed with a central plane area 3 to surface 1 to provide a stable support to the piece upon inversion.

In the embodiment of FIG. 1D, surface 1 comprises a projecting portion 50, optionally comprising a perimeter concave portion 51 to act as a grip or handle to the piece 10 and raised ring 5 to assist stability when inverted.

In the embodiment FIG. 1E, surface 1 has a depression, for example concave portion 4 in surface 1, to enable the piece to be stable on inversion and optionally accommodating an unused tea bag, lemon wedge or sugar sachet during serving a cup with hot water.

The piece of FIG. 1F comprises a raised ring 5 surrounding a depressed area 6 to surface 1, both to act as a stable base upon inversion. There is a depressed area 7 to surface 2, to optionally retain the base of a cup following inversion of the piece 10, in its alternative use as a saucer.

The tea piece is typically intended to sit loosely within a cup rim, there being a suitable tolerance between the outside of the continuous drip projection 20 and the inside of the rim of the cup onto which it is located, such that it can be subsequently removed by a force no greater than the weight of the tea piece.

This tolerance between the outside of drip projection 20 and the inside of the cup rim allows for the tolerances of manufacture of the cup with which tea piece 10 is intended to be used, which will have acceptable deviations in diameter from a true circle. The greater the tolerance between the outside of the drip projection and one cup size, the greater range of cup size which can be accommodated by that particular design of tea piece 10. A nominal circumferential gap between the outside of drip projection 20 and the inside of a cup rim of 0.5 mm to 3 mm has been found to be useful according to various embodiments.

Optionally the tea piece is made of a flexible material, for example of silicone, which is optionally designed so that the drip projection fits snuggly inside at least part of the cup rim perimeter, for example to avoid the tea piece falling off the cup and optionally to provide an effective seal over this part of the inside of the cup rim perimeter. Optionally the outside edge of such a flexible tea piece is designed to wrap around the cup rim, as illustrated in the embodiments of FIGS. 9 to 11.

FIG. 2A is similar to FIG. 1A except the drip projection 20 is conterminous with part of the outside of the perimeter recess 40.

The embodiments of FIGS. 2B to 2F are similar to FIGS. 1B to 1F except that the drip projection 20 is coterminous with part of the outside of the perimeter recess 40.

Figure 5B:
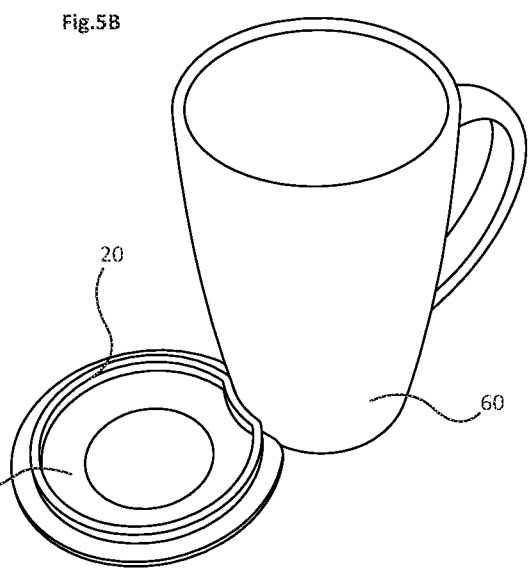
FIG. 5B is a perspective view of the scalloped embodiment of FIG. 3E inverted and the perimeter recess contiguous with the cup.
Figure 6A:
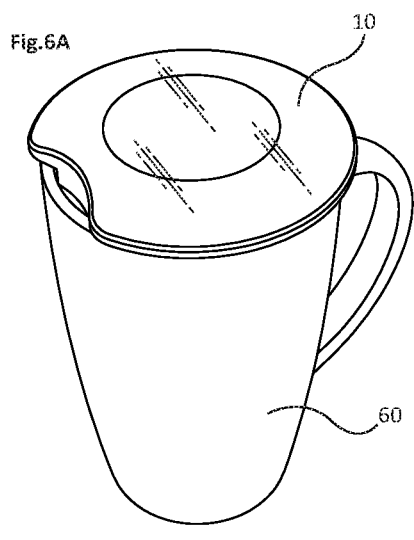
FIG. 6A is similar to FIG. 5A but with a transparent tea piece.
Figure 6B:
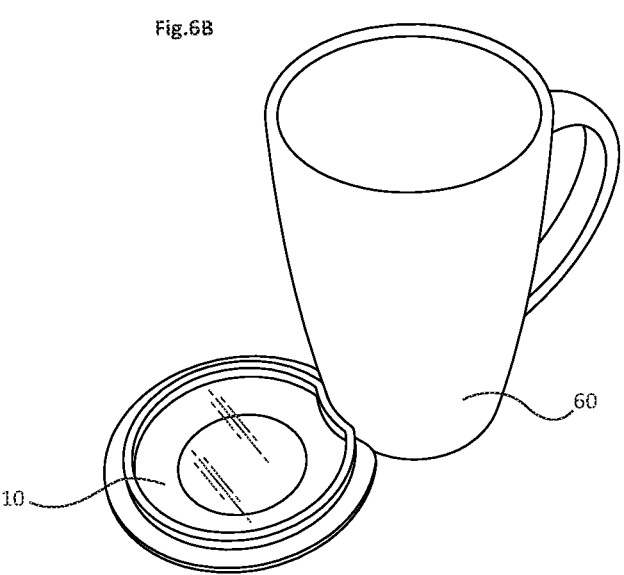
FIG. 6B is similar to FIG. 5B but with a transparent tea piece.

FIG. 3A is similar to FIG. 2A except the recess 40 is scalloped, preferably to the arc of a circle for at least the length of the drip projection 20 that is coterminous with the outside of perimeter recess 40, for the purpose of fitting close to a cup and preferably contiguous with the cup after inversion of the piece 10, as illustrated in FIGS. 4B, 5B and 6B.

FIGS. 3B to 3F are similar to FIGS. 2B to 2F except the perimeter recess 40 is scalloped as in FIG. 3A, to fit close to a cup after inversion of tea piece 10.

FIG. 4A is a cross-section through the piece of FIG. 3E acting as a lid to cup 60. Ventilation aperture 70 is located between the rim 62 of cup 60 and the perimeter recess 40 of tea piece 10, enabling the escape of steam and retention of a string connector 82, connected to suspension handle 84 and tea bag 80, the ventilation aperture 70 preferably being of smaller maximum dimension than the smallest dimension of suspension handle 84, to ensure the suspension handle 84 does not slip into the hot water 90. Hot water 90 becomes infused with tea from tea bag 80.

In FIG. 4B, the same tea piece 10 as in FIG. 4A is inverted and located to fit snugly and preferably contiguously with cup 60. Well 8 provides for the disposal of tea bag 80 following its removal from tea infused hot water 90. Any drops or other leakage of tea from tea bag 80 are contained within well 8, without any tea dripping onto the horizontal surface supporting them.

FIGS. 5A and 5B are perspectives of the tea piece 10 of FIG. 3E on top of and by the side of cup 60 respectively. A wet tea bag can be transferred from cup 60 to inverted tea piece 10 without any tea dripping onto the horizontal surface supporting them.

FIG. 6A is similar to FIG. 5A except tea piece 10 is transparent allowing the visibility of the strength of tea infusing in cup 60, the piece 10 being removed from cup 60 when the tea is of the desired strength and then inverted, as shown in FIG. 6B.

Figure 7A:
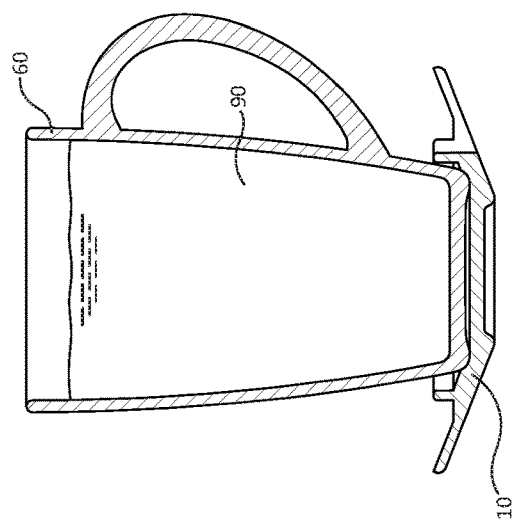
FIG. 7A is a cross-section through the embodiment of FIG. 3F located on the rim of a cup containing hot water and a tea bag.

FIG. 7A is a cross-section through the tea piece 10 of FIG. 3F acting as a lid to cup 60, while the tea in tea bag 80 is infusing in water 90 in cup 60.

Figure 7B:
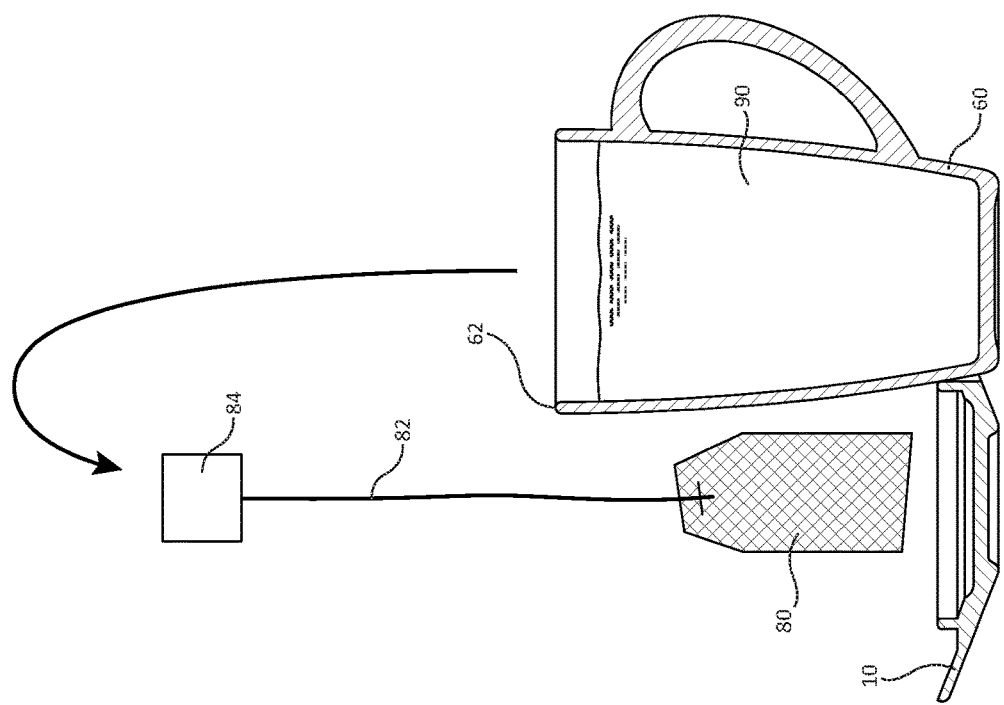
FIG. 7B is a cross-section through the embodiment of FIG. 3F inverted and the perimeter recess contiguous with the cup, showing transfer of a used tea bag.

FIG. 7B illustrates the optional use of piece 10 as a receptacle to a wet tea bag 80 transferred from the water 90 in cup 60 by means of string connector 82 and suspension handle 84.

Figure 7C:
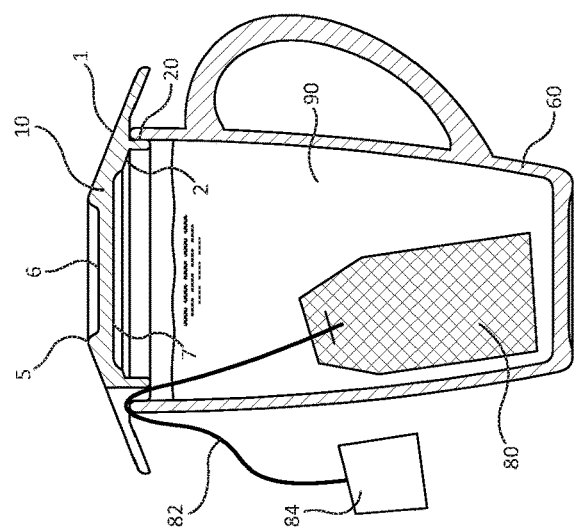
FIG. 7C is a cross-section through the embodiment of FIG. 3F inverted to act as a saucer for the cup.

FIG. 7C illustrates the alternative use of tea piece 10 as a saucer to cup 60, tea bag 80 having been otherwise disposed of.

In the above embodiments, the perimeter recess 40 optionally includes an outer edge comprising smoothly transitioned curves to assist manipulation of the string connector 82 within the ventilation aperture 70, with a minimum internal radius of curvature of 3 mm. The perimeter recess is typically open such that if a circular arc of radius r is struck concentric with the tea piece perimeter 30 that intersects the perimeter recess 40 at two points, the tangents of the perimeter recess 40 at the two points of intersect within the radius of the arc, at a subtended angle T greater than 0° and preferably greater than 90°, as illustrated in FIGS. 19K-19M.

FIGS. 8A-8I are diagrammatic cross-sections through cup 60 in one method of tea-making using tea piece 10.

An empty cup 60 is shown in FIG. 8A and the same cup 60 filled with hot water 90 to a suitable level below its rim 62 in FIG. 8B. In FIG. 8C, tea piece 10 according to FIG. 3E is located to act as a lid on the rim of cup 60, the continuous drip projection 20 preventing tea piece 10 sliding off cup 60. This arrangement maintains hot water 90 to a higher temperature than if cup 60 remained uncovered as in FIG. 8B. Ventilation aperture 70 allows steam evaporating from the hot water 90 to be released into the atmosphere. The tea piece 10 is optionally placed onto the cup 60 immediately after inserting hot water 90 into cup 60 and the cup is carried to the tea drinker with the tea piece 10 acting as a lid on cup 60, optionally with a selected type of dry tea bag 80 located in concave portion 4. Alternatively, a tea bag 80 is selected by the tea drinker at a serving table from a selection of types of tea being offered. In FIG. 8D, tea piece 10 is temporarily removed to allow the placing of tea bag 80, by means of string connector 82 and suspension handle 84, into hot water 90, following which tea piece 10 is relocated on the rim 62 of cup 60, perimeter recess 40 enabling the guiding and retaining the string 82 between the perimeter recess 40 and cup rim 62 in ventilation aperture 70, as shown in FIGS. 8E and 8F. The ventilation aperture 70 is preferably small enough to ensure suspension handle 84 is maintained outside cup 60 and tea piece 10. Ventilation aperture 70 preferably has a maximum dimension less than the minimum dimension of suspension handle 84, and preferably has a maximum dimension of less than 30 mm, 25 mm, 20 mm and/or 10 mm.

Optionally, as shown in FIG. 8G, tea bag 80 is agitated by raising and lowering it in the hot water 90 by means of string connector 82 and suspension handle 84, in order to accelerate the infusion process of the tea in tea bag 80 in hot water 90, until the required strength of tea is obtained. The drip projection 20 causes any drops of condensed water on surface 2 to drip back into the hot water 90 in cup 60. The drip projection 20 with coterminous perimeter recess 40 also provides a smooth side restraint to any raising and lowering of the string to agitate tea bag 80. The underside of the drip projection, forming part of the edge of the ventilation aperture 70, also acts as a "stop" to the shoulder of a tea bag being raised while tea piece 10 is acting as a lid to cup 60. Preferably the tea piece comprises transparent material such that the colour of the infusing tea is visible through the tea piece.

In FIG. 8H, tea piece 10 has been removed from cup 60, inverted and placed snugly against the outside of cup 60, to eliminate or reduce tea spillage on transfer of the wet, used tea bag, 80 into the well 8 of inverted tea piece 10. In FIG. 8I, tea piece 10 is typically moved relative to cup 60. The used tea bag 80 is located in the well 8 within drip projection 20, typically ensuring no tea leaks from the tea piece, an arrangement which also allows the optional reuse of tea bag 80. In some embodiments, the tea piece 10 and cup 60 are made as part of a set or are otherwise selected such that the radius of the scalloped perimeter recess at the edge of the continuous drip projection 20 is the same as the radius of the cup 60 where they touch when the tea piece 10 is "docked" against cup 60. This height is the height between the horizontal surface, for example a table (which is also the lowest point of surface 1 after inversion) and the top edge of the continuous drip projection after inversion. Preferably, the tea piece 10 and cup 60 are positioned to be touching and preferably contiguous at that height, to minimise the risk of any spillage of tea onto the table or other horizontal surface.

The design of the tea piece is optionally varied to take account of the material it is made from and its method of production. For example, the embodiment of FIGS. 9A and 9B comprises a flexible material, for example silicone, and a perimeter grip profile 32. Drip projection 20 comprises a continuous circular projection from a flat surface 2 to form well 8 with continuous well wall 9. When applied to cup 60, as shown in FIG. 9C, ventilation aperture 70 formed by perimeter recess 40 allows steam to escape and provides a means of retaining a string connector 82 while enabling tea in cup 60 to be infused faster by raising and lowering tea bag 80 (not shown) in hot water 90 by means of suspension handle 84. Perimeter grip profile 32 is typically deformed or flexed in making a secure, optionally sealed connection to the rim of cup 60.

Figure 9C:
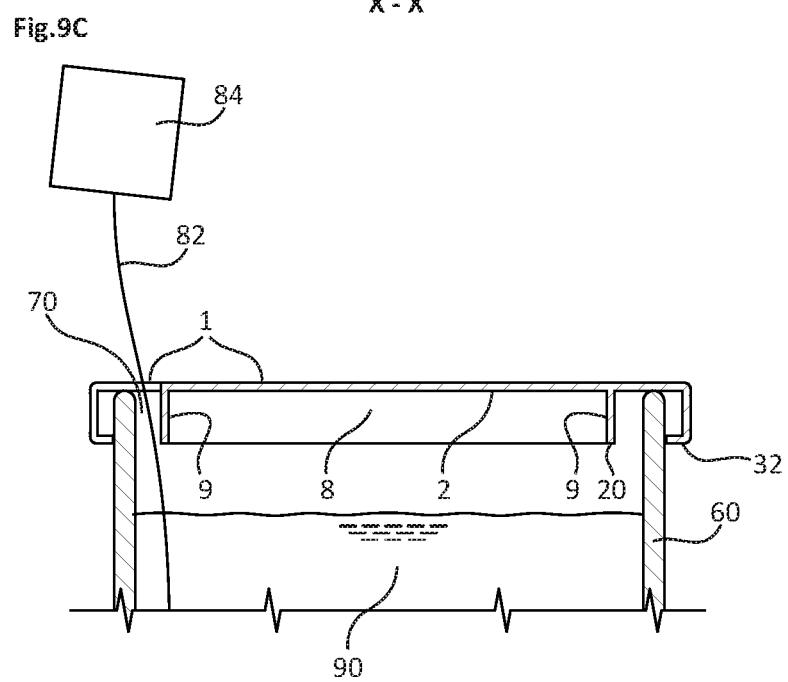
FIG. 9C is a cross-section through the tea piece of FIG. 9A on vessel 60.
Figure 10A:
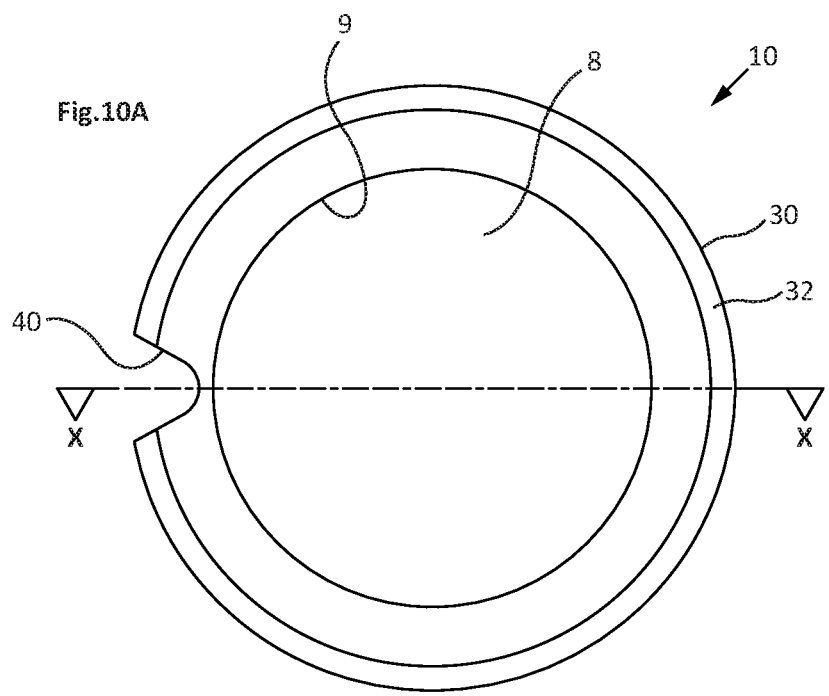
FIG. 10A is a plan of a tea piece according to various embodiments from the side of surface 2.
Figure 10B:
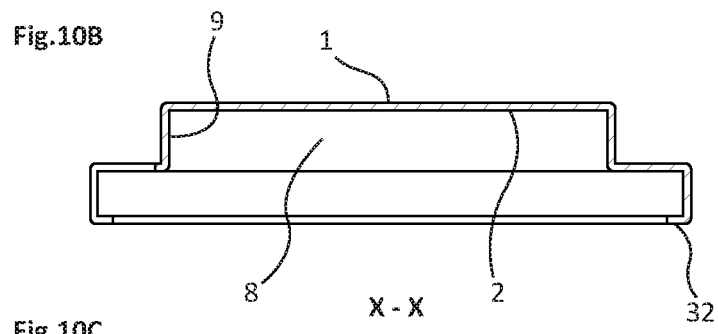
FIG. 10B is a cross-section through the tea piece of FIG. 10A.
Figure 10C:
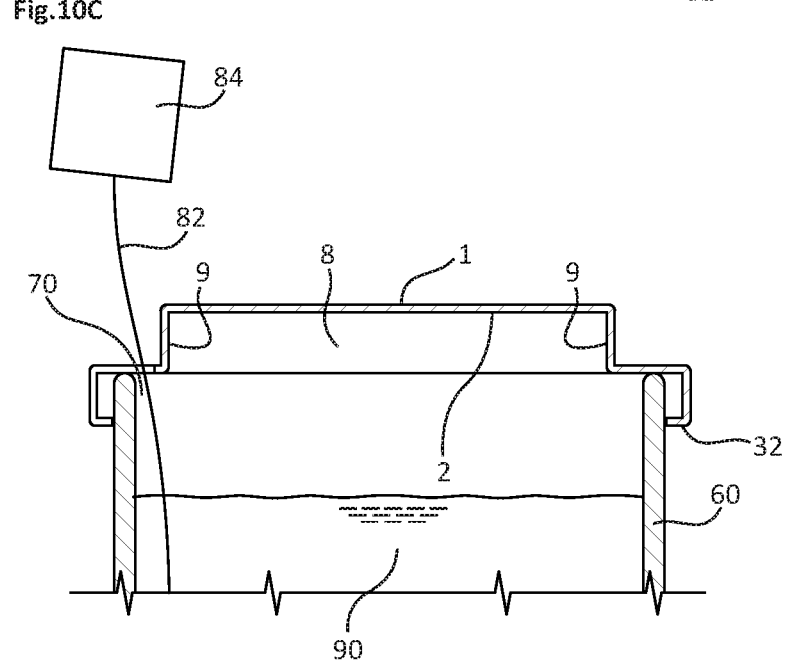
FIG. 10C is a cross-section through the tea piece of FIG. 10A on vessel 60.

FIGS. 10A and 10B illustrate another tea piece embodiment comprising a flexible material, for example silicone, and a perimeter grip profile 32. Well 8 and continuous well wall 9 are formed by a raised portion when acting as a lid, becoming a cylindrical well 8 upon inversion, to receive a used tea bag. FIG. 10C is similar to FIG. 9C except for the raised well 8 of this embodiment.

Figure 9A:
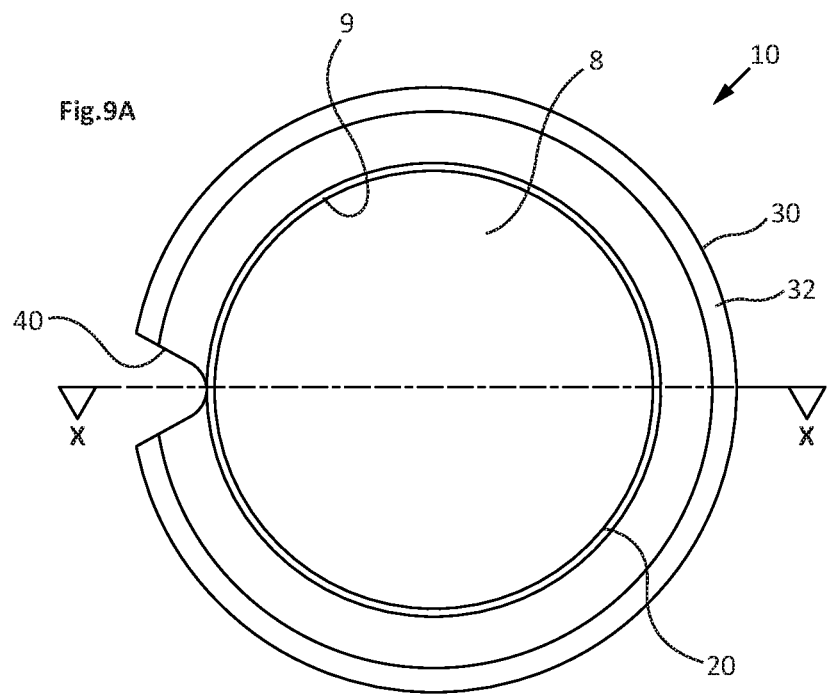
FIG. 9A is a plan of a tea piece according to various embodiments from the side of surface 2.
Figure 9B:
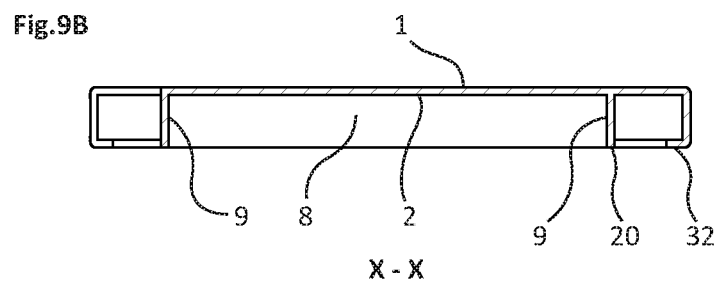
FIG. 9B is a cross-section through the tea piece of FIG. 9A.
Figure 11A:
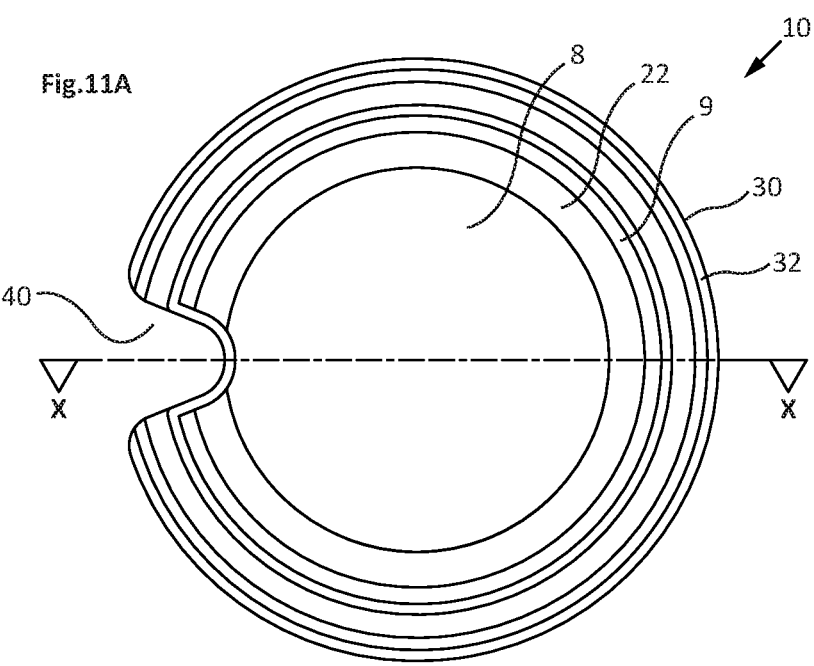
FIG. 11A is a plan of a tea piece from the side of surface 2.
Figure 11B:
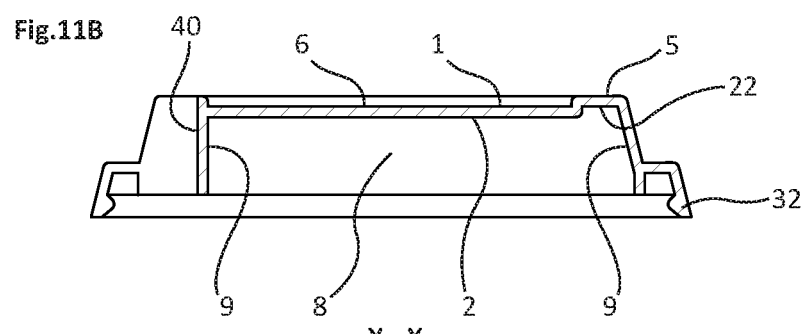
FIG. 11B is a cross-section through the tea piece of FIG. 11A.
Figure 11C:
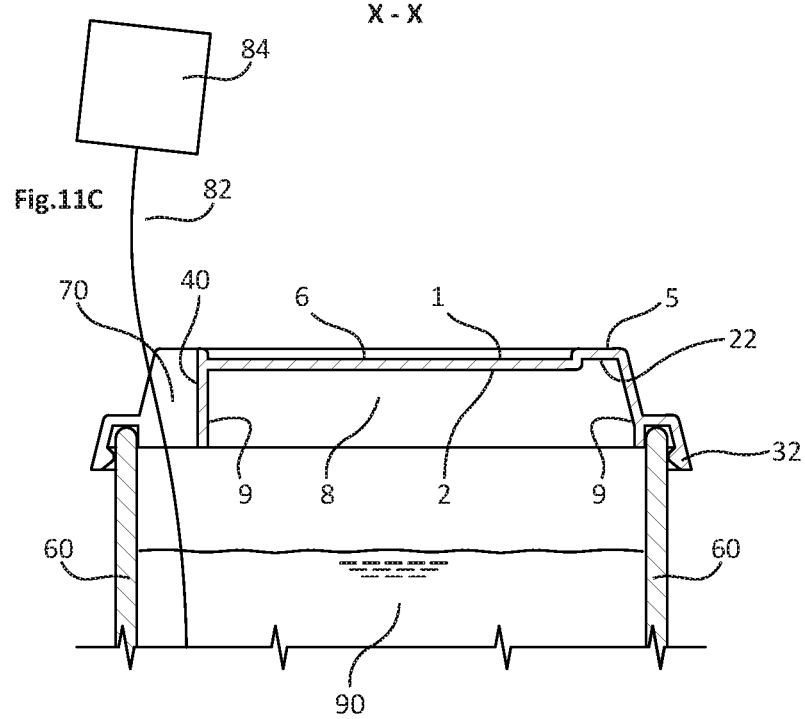
FIG. 11C is a cross-section through the tea piece of FIG. 11A on vessel 60.

FIGS. 11A and 11B are of another tea piece embodiment comprising a flexible material, for example silicone, and a perimeter grip profile 32 of different cross-section to those in FIGS. 9A and 10A, which is intended to grip on both sides of a cup rim. Well 8 comprises continuous well wall 9 which springs from the inside of the perimeter grip profile 32 with the exception of its indent around perimeter recess 40. The central area of surface 1 is depressed area 6 with raised ring 5 to provide improved stability of tea piece 10 upon inversion and also a perimeter depressed "moat" 22 to the well 8 when tea piece 10 is inverted, into which tea from a used tea bag will drain, making subsequent reuse of the tea bag less likely to cause leakage. FIG. 11C shows tea piece 10 clamped to rim of cup 6, the perimeter recess 40 forming a ventilation aperture 70, with similar functional benefits to those described in relation to FIG. 9C.

The embodiments of FIGS. 9A, 10A and 11A optionally have a perimeter recess 40 shaped to be contiguous with a cup after inversion and being "docked" against the cup.

Figure 12A:
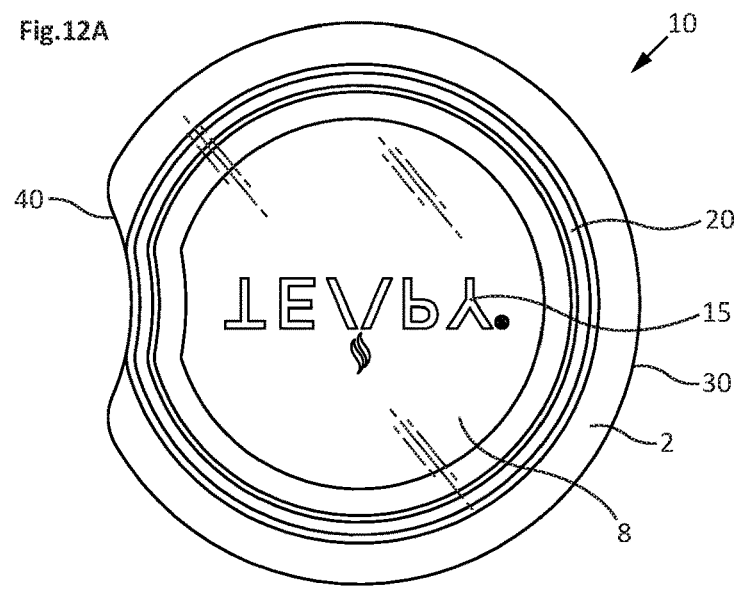
FIG. 12A is a plan of a glass tea piece from the side of surface 2.

FIGS. 12A-12I are drawings of an embodiment of the invention designed to suit the method of moulding glass known as "pressed glass" or "press moulding" in which one side of the piece, for example surface 1, has a suitable first mould into which a lump of molten glass is located and a second mould or "plunger" is pressed down onto the molten glass to form the desired shape of tea piece 10, after which the two moulds are separated. FIG. 12A is a plan viewed from side 2 of tea piece 10 comprising perimeter 30, perimeter recess 40, continuous drip projection 20, well 8 and logo 15 impressed so as to be right-reading through the transparent glass tea piece after its inversion.

Figure 12B:
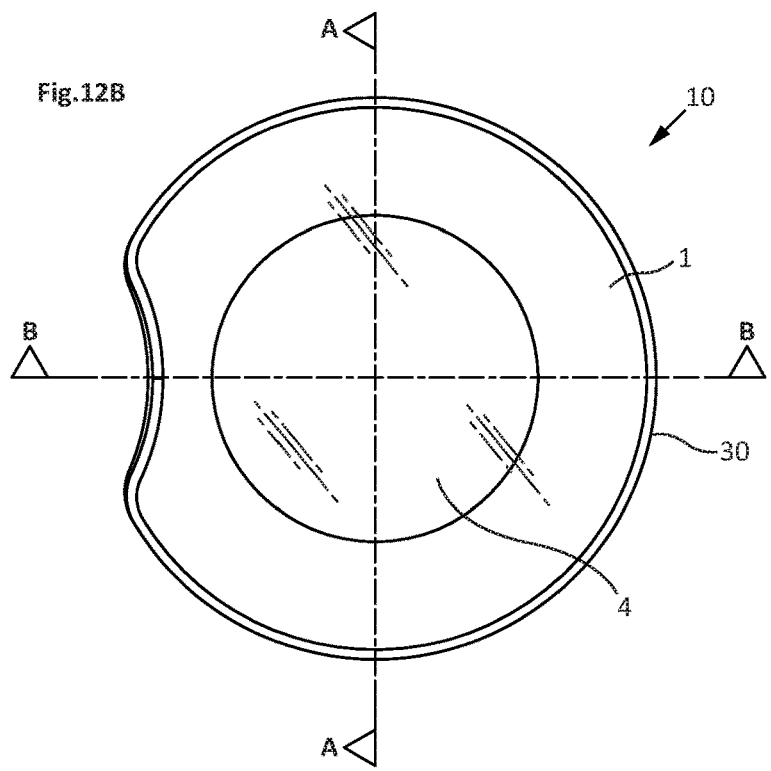
FIG. 12B is a plan of the glass tea piece of FIG. 12A from the side of surface 1.
Figure 12C:
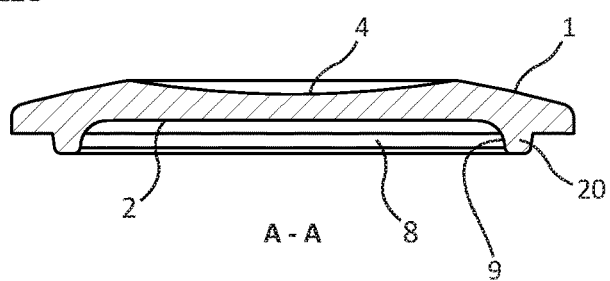

FIG. 12B is a plan viewed from side 1 (not showing the logo or other features of side 2). Concave portion 4 provides a stable base upon inversion and optionally accommodates a tea bag or other item, for example a lemon wedge, when serving with the tea piece 10 on a drinking vessel. FIGS. 12C, 12D and 12E show well 8 and well wall 9. Perimeter recess 40 comprises two slopes, as shown in FIGS. 12 D and 12E, for example to enable easy mould separation in manufacture and accommodate a flared rim of a drinking vessel. FIGS. 12F, 12G and 12H are elevations of tea piece 10 showing continuous drip projection 20 and FIG. 12I is a diagrammatic perspective showing well 8 within continuous drip projection 20 comprising well wall 9.

Figure 13A:
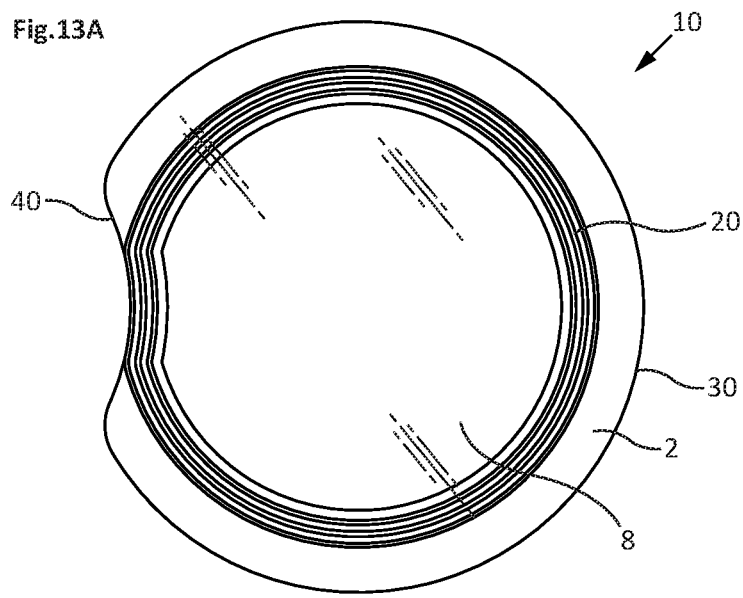
FIG. 13A is a plan of a transparent plastic tea piece from the side of surface 2.
Figure 13B:
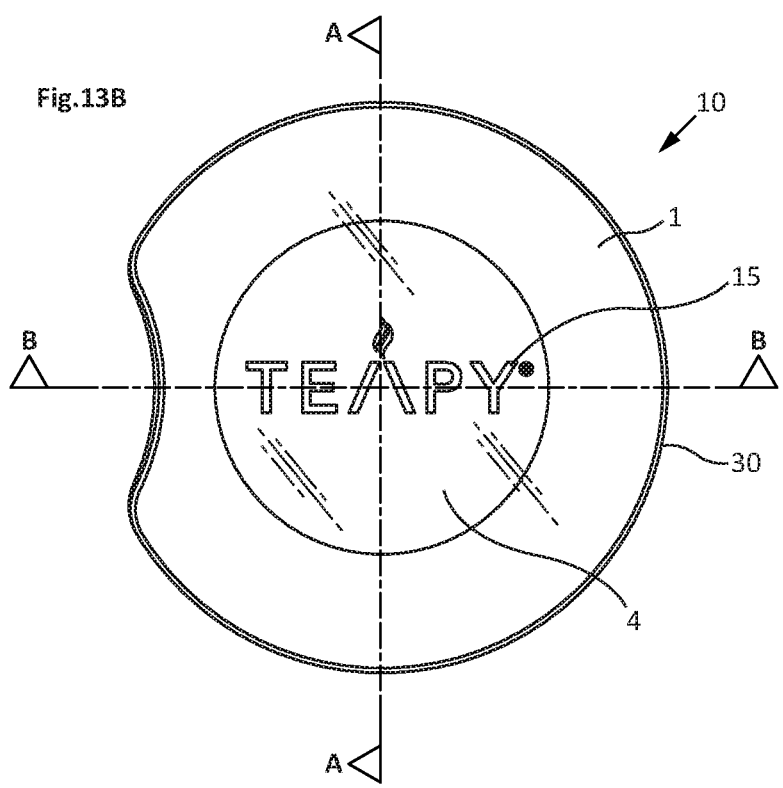
FIG. 13B is a plan of the transparent plastic tea piece of FIG. 13A from the side of surface 1.
Figure 13C:
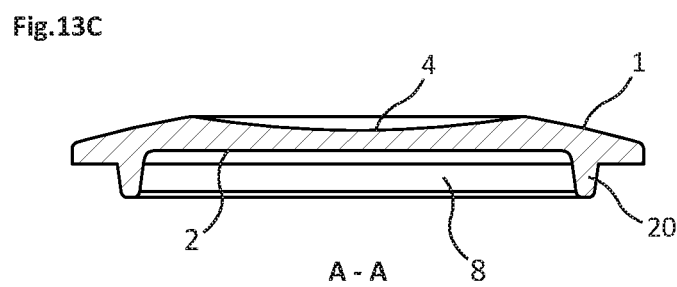

FIGS. 13A to 13I illustrate a similar embodiment of the invention to suit the method of injection moulding of plastic materials, for example of polycarbonate or a co-polyester, for example Eastman Tritan®, a trademark of Eastman Chemical Company, US. This method of injection moulding would typically also comprise moulding in two parts, to form each side of tea piece 10. Optionally a third, centre section to form a logo impression 15 is interchangeable so that different logos or other designs can be impressed into surface 1 "right-reading", or into surface 2 "reverse-reading", so as to be visible right-reading from side 1 through transparent tea piece 10. FIGS. 13A-13I show similar features to FIGS. 12A-12I except that logo 15 is impressed into surface 1, as illustrated in FIG. 13B.

The second aspect of various non-limiting embodiments typically concerns disposable tea pieces which are designed to suit paper, card or plastic cups that are typically disposed of after one use. Such disposable cups are typically sold in retail outlets, in which the disposable cup with hot tea is to be carried by the customer to another location, either remote from the outlet or a table within the outlet, for example in a fast food restaurant.

As in the case of prior art disposable cup lids, disposable tea pieces according to various non-limiting embodiments of the present invention have perimeter grip profiles to grip around the rim of a disposable cup to provide for safer carrying of the hot liquid than would be the case with a loose lid. The perimeter recess 40 is either formed initially or is capable of being created by the customer, typically by rupturing the disposable tea piece 11 along a weakened rupture line or locus 101 in the disposable tea piece, typically a notch 101, typically by manual tearing.

Unlike the prior art disposable cup lids, which typically have a pre-formed drinking hole and an additional air ventilation hole to enable the liquid to be drunk with the lid on, the disposable tea piece according to various non-limiting embodiments of the present invention comprises a well which has no holes through it and is impervious to aqueous liquids.

The prior art service using disposable cups typically comprises trapping a tea bag string connector between the disposable cup rim and the perimeter grip profile with the tea bag handle outside the cup and lid, which provides a leakage route, albeit of small cross-section, to either side of the string connector. It also requires removal of the disposable lid to agitate the tea bag. In contrast, various non-limiting embodiments of the present invention allow the tea bag string to be retained in the ventilation aperture, which allows agitation of the tea bag without removal of the disposable tea piece 11.

Furthermore, unlike a prior art disposable lid, the disposable tea piece according to various non-limiting embodiments is optionally removable and invertible in order to dispose of the used tea bag in the well, where there is no prior art ventilation hole in the wall, any ventilation hole provided being outside the well.

Figure 14A:
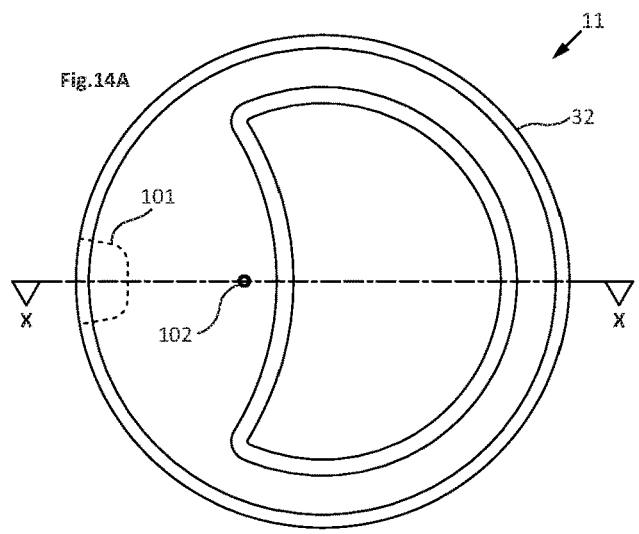
FIG. 14A is a plan and FIG. 14B is a part plan of a disposable tea piece, from the side of surface 2.
Figure 14B:
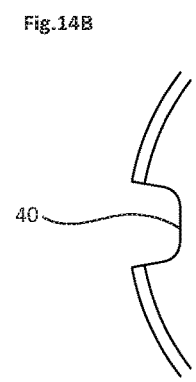
Figure 14C:
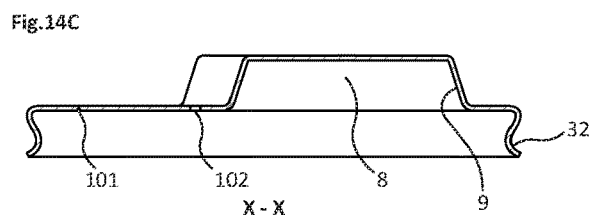
FIGS. 14C and 14D are cross-sections through the disposable tea piece of FIGS. 14A and 14B.
Figure 14D:
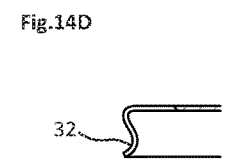
Figure 14E:
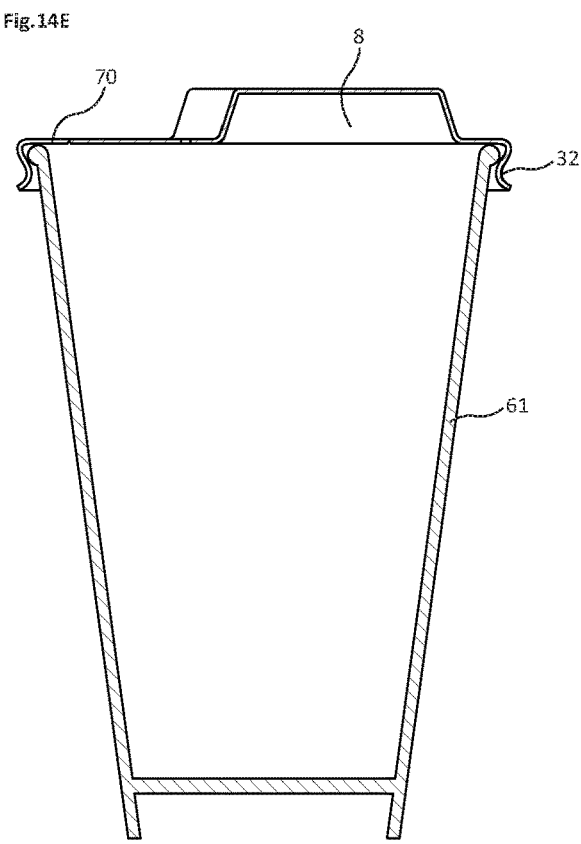
FIG. 14E is a cross-section through the tea piece of FIG. 14B affixed to a disposable drinking vessel.

In FIGS. 14A and 14C, disposable tea piece 11 comprises perimeter grip profile 32, and removable perimeter recess 40, torn out when required along the line of weakness 101, typically a notch and additional ventilation hole 102. The perimeter recess 40 is optionally preformed as in FIGS. 14B and 14D. Perimeter grip profile 32 shown in cross-section in FIGS. 14C and 14D, exerts a lateral inward force on the rim of disposable cup 61, as shown in FIG. 14E. Well 8, depressed on side 2, is shaped to facilitate optional drinking the tea through ventilation aperture 70 with the tea piece attached to disposable cup 61, as shown in FIG. 14E. FIG. 14F shows the disposable tea piece 11 inverted on surface 95, for example a table, with a used tea bag 80 in the well 8.

There are many different embodiments of the invention, for example FIGS. 14G and H illustrate an embodiment of tea piece 11 with perimeter grip profile 32, an upper lip zone 23 of surface 1 depressed to facilitate optional drinking from ventilation aperture 70, after application to a disposable cup. Well 8 is a depressed area of surface 2.

If the perimeter recess 40 is preformed, there remains the risk of spillage through ventilation aperture 70 when carrying the disposable cup 61 with attached tea piece 11 acting as a lid. This risk can be reduced or eliminated by plugging the ventilation aperture 70 temporarily, for example with a tapered plug. A novel tea bag assembly comprising a tapered plug suspension handle 814 can be used to temporarily plug the ventilation aperture 70 for carrying purposes, as shown in FIG. 14I, to be removed and optionally raised and lowered to agitate the tea bag 80 suspended from it, as shown in FIG. 14J, to be subsequently transferred to the inverted tea piece 11, as shown in FIG. 14K. FIG. 14L is a perspective of the tea piece 11, showing upper lip zone 23, perimeter recess 40 and perimeter grip profile 32.

Figure 15A:
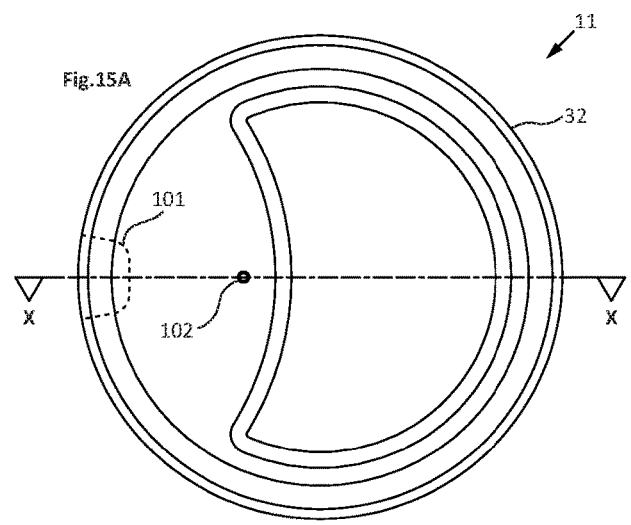
FIG. 15A is a plan and FIG. 15B is a part plan of a disposable tea piece, from the side of surface 2.
Figure 15B:
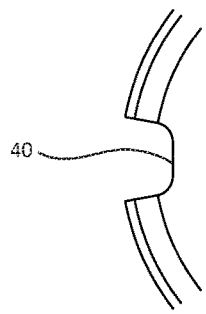
Figure 15C:
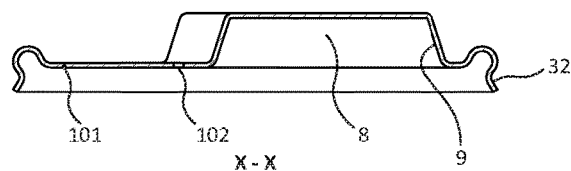
FIGS. 15C and 15D are cross-sections through the disposable tea piece of FIGS. 15A and 15B.
Figure 15D:
Figure 15E:
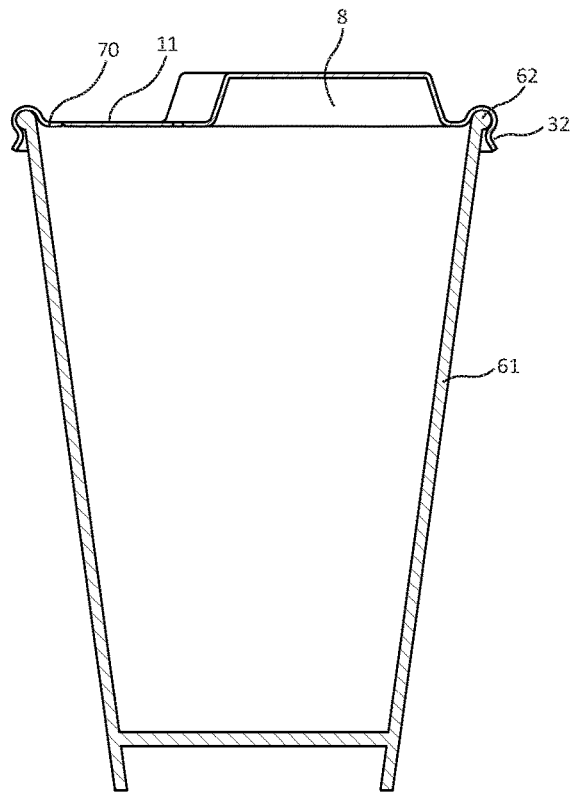
FIG. 15E is a cross-section through the tea piece of FIG. 15B affixed to a drinking vessel.
Figure 15F:
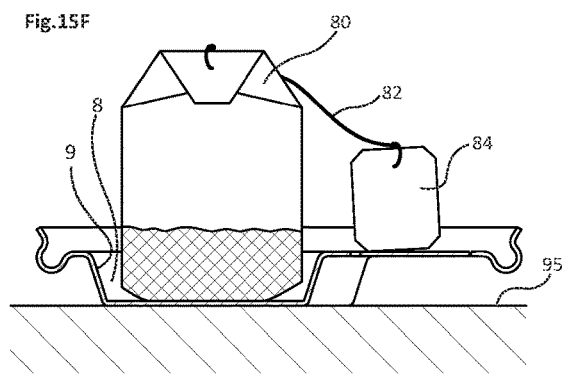
FIG. 15F is a cross-section through the inverted tea piece of FIG. 15B.

The disposable tea piece of FIGS. 15A-15F is similar to that in FIGS. 14A-14E except that the perimeter grip profile 32 applies pressure on the inside of the rim 62 of disposable cup 61 as well as the outside, making a more secure seal when carrying or drinking from the disposable cup 61 through ventilation aperture 70 with the disposable tea piece 11 in place, as shown in FIG. 15E. FIG. 15F shows the inverted tea piece 11 of FIG. 15A with tea bag 80 within well 8.

Disposable tea pieces are preferably transparent, to allow visibility of a strengthening infusion, to assist the making of tea to the customer's preference.

Various disposable tea piece embodiments have advantages over prior art methods of serving tea at coffee shops and other locations, where prior art service includes placing a tea bag in hot water in a disposable cup and trapping a string connector between the prior art lid perimeter and the cup rim, at a service and payment counter. This then requires the customer to remove the lid while standing at a second service station, waiting for the tea to infuse to the required strength, adding any lemon, milk or sugar and disposing of the used tea bag into a trash can or other receptacle at the second service station, all taking time with the likelihood of other customers causing delay ahead and waiting behind, likely to cause stress and increasing the likelihood of spillage. In contrast, various disposable tea piece embodiments enable the customer to go straight to a table and make the infusion and dispose of the tea bag onto the inverted tea piece in a stress-free environment.

The third aspect of various non-limiting embodiments the invention concerns a tea piece acting as the lid of a teapot. Tea pieces of the first and second aspects do not require a teapot and typically provide a cheaper tea service than one with a teapot. However, a teapot service can be improved by a tea piece according to various non-limiting embodiments of the present invention acting as the lid of the teapot.

Figure 16D:
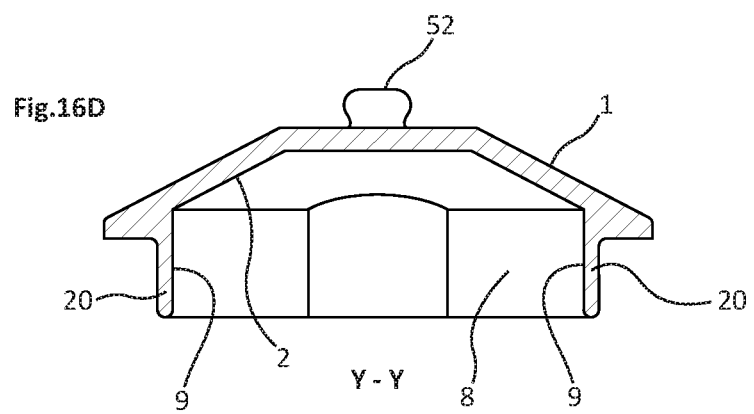
FIG. 16D is a cross-section Y-Y through the teapot tea piece of FIG. 16A.

FIG. 16A is a plan of side 2 of teapot tea piece 12 with perimeter 30 and perimeter recess 40. Continuous drip projection 20 is indented along perimeter recess 40, to the radius of teapot 63 (not shown) at a height from its base, the same as the height of teapot tea piece 12 when inverted, to provide contiguous docking, following its inversion, against the teapot 63. Well 8 is within the drip projection 20, comprising continuous well wall 9, as shown in cross-section X-X, in FIG. 16C. Three optional support legs 52, which also facilitate handling of the teapot tea piece 12 from side 1, are bollard-shaped, as shown from side 1 in FIG. 16B and in cross-section X-X FIG. 16C. and Y-Y, FIG. 16D.

Figure 16E:
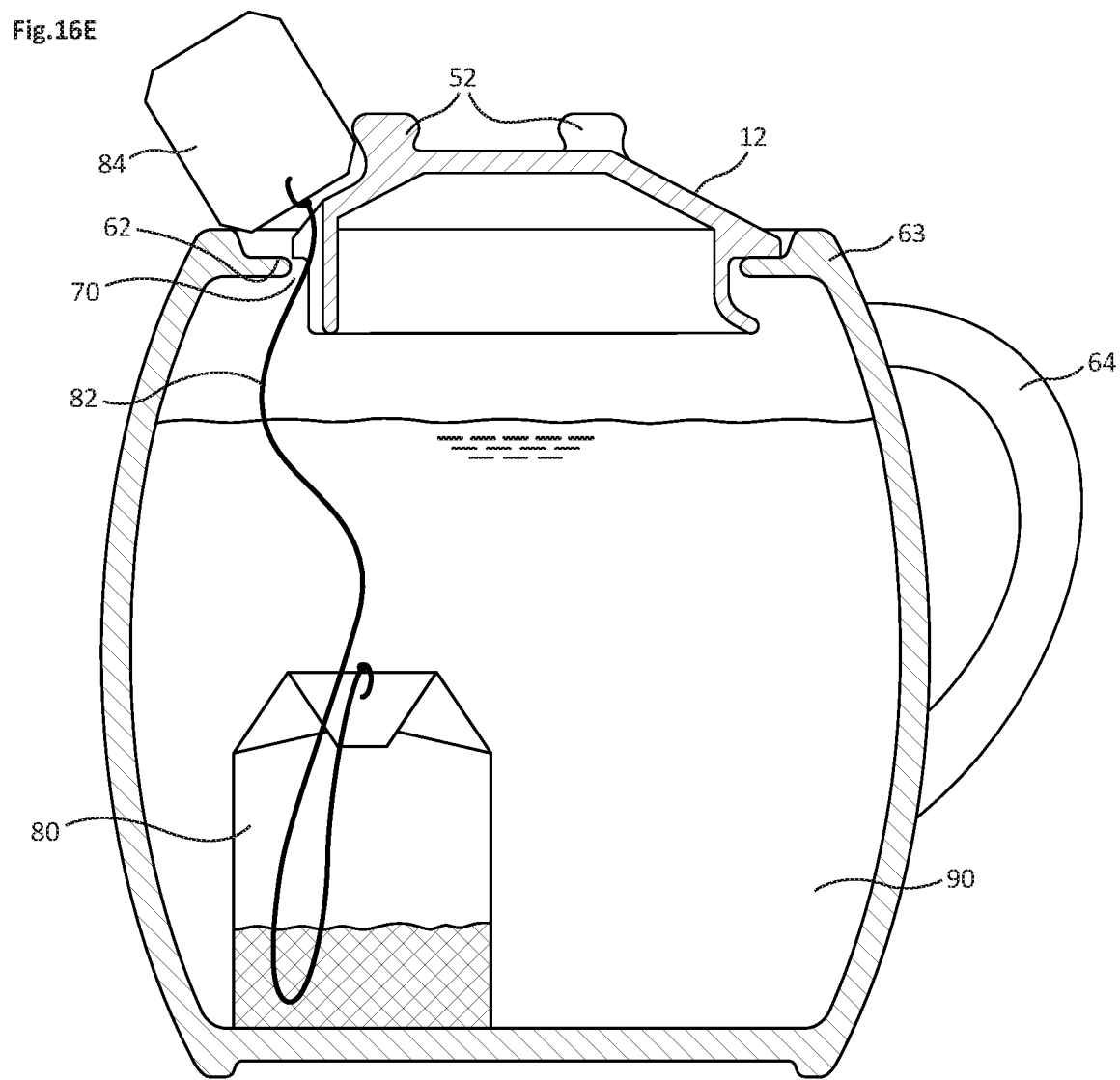
FIG. 16E is a cross-section through the teapot tea piece of FIGS. 16A and 16B located on a teapot.
Figure 16F:
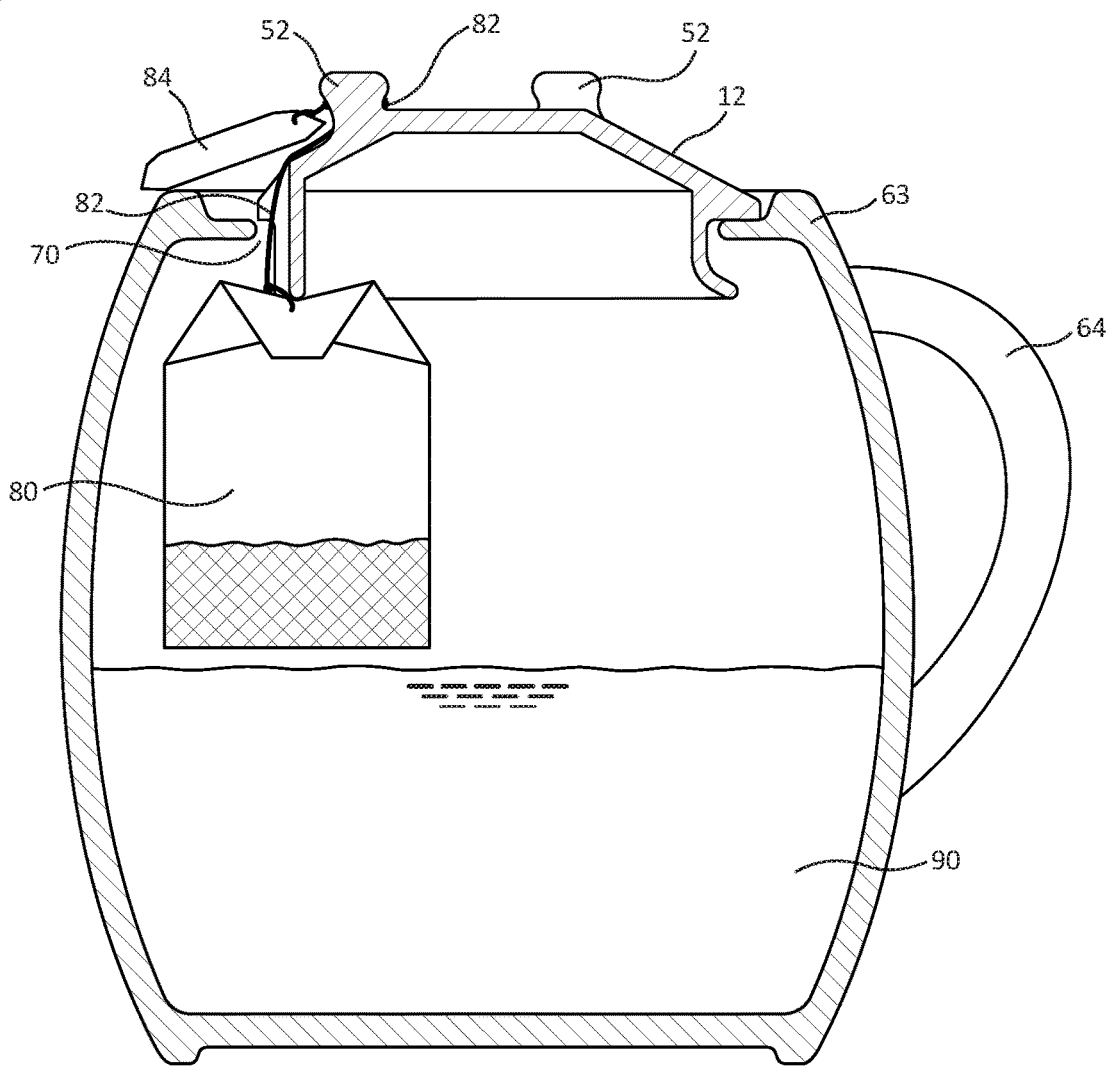
FIG. 16F is a cross-section through the teapot piece of FIGS. 16A and 16B located on a teapot.

In FIGS. 16E and 16F, a teapot 63 contains hot water and one or more tea bags 80, with teapot tea piece 12 acting as the lid to teapot 63. Perimeter recess 40 combines with the rim 62 of teapot 63 to form ventilation aperture 70 which retains the string connector 82 to the tea bag 80, maintaining suspension handle 84 outside the teapot.

Figure 16G:
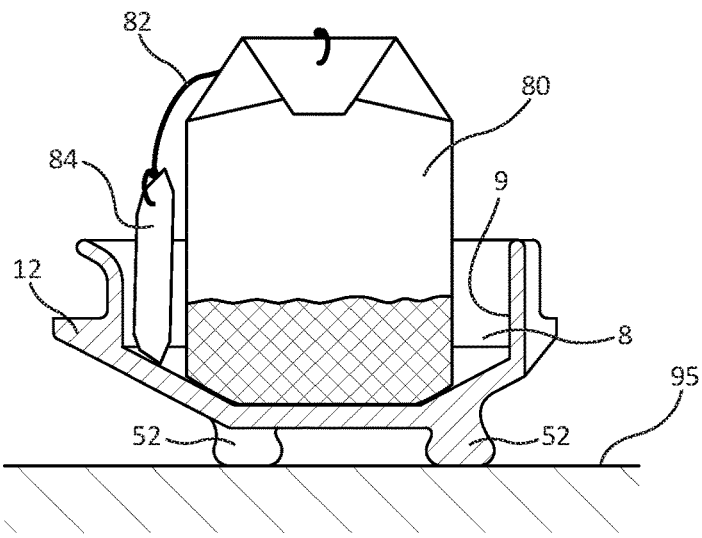
FIG. 16G is a cross-section through the inverted teapot tea piece of FIGS. 16A and 16B.

The ventilation aperture 70 allows the agitation of the tea bag 80 to accelerate the infusion of the tea. With a conventional prior art teapot service, the strength of the infusion becomes progressively stronger, from too weak to too strong, before or after one or more cups of tea have been poured. As shown in FIG. 16F the tea bag 80 is optionally raised inside the teapot by means of the string connector 82 and suspension handle 84, to be suspended wholly above the tea remaining in the teapot 63, this tea maintaining the same strength, not becoming progressively stronger. The tea bag 80 is fixed at the raised height by the string connector 82 being wrapped around the handle of the teapot or an optional projection on surface 1 of the tea piece 12, for example in the form of an arch or, as another example, a projecting bollard-shaped leg 52, as illustrated in FIG. 16F. The bollard-shaped legs 52 provide a stable support to the inverted tea piece 12, as shown in FIG. 16G.

Teapot tea pieces are preferably transparent, to allow visibility of a strengthening infusion, to assist the making of tea to the customer's preference.

Preferred designs of well 8 are partly determined by the designs of prior art tea bags, and whether the tea pieces are intended to be used with a variety of tea bag shapes and sizes or whether they are intended to be used in conjunction with just one tea bag shape and size, for example if the tea pieces are purchased by a particular tea company as an incentive to secure, or as part, of a tea bag supply contract to a chain of hotels or coffee shops.

Common micro-perforated paper tea bag constructions are illustrated in FIGS. 17A-17F. They vary in overall size from typically 40 mm to 65 mm in width and 60 mm to 80 mm in height. The micro-perforated paper is translucent, so the tea inside is visible from outside, typically filling from one quarter to one half of the height of the space envelope. An important factor is how stable a used tea bag will be when placed in the well of the inverted tea piece.

Figure 17A:
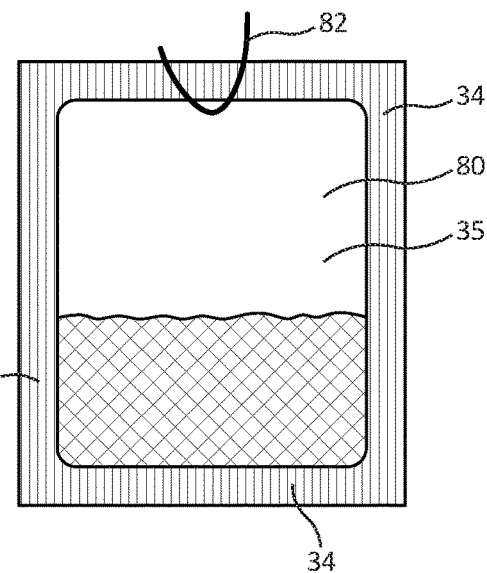
FIGS. 17A, 17C and 17E are elevations of prior art tea bags.
Figure 17B:
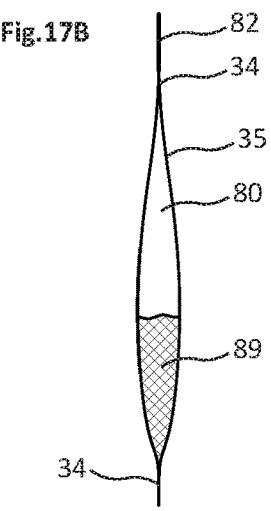
FIGS. 17B, 17D and 17F are cross-sections through prior art tea bags of FIGS. 17A, 17C, and 17E, respectively.

The tea bag 80 of FIG. 17A comprises two rectangular sheets of micro-perforated paper 35 which have a press-bonded strip 34 throughout their perimeter, the string connector 82 being bonded between the two sheets 35. Tea 89 typically fills from a quarter to one half the gap between the two sheets of paper 35 when tea bag 84 is suspended from string connector 82 and suspension handle 80 (not shown), all as illustrated in the cross-section of FIG. 17B.

Figure 17C:
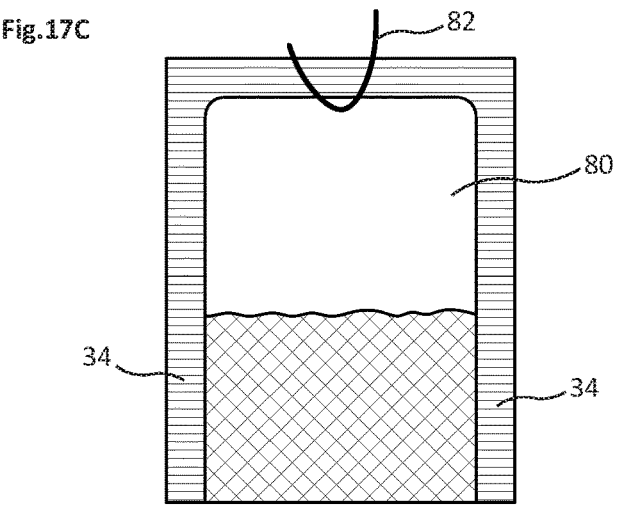
Figure 17D:
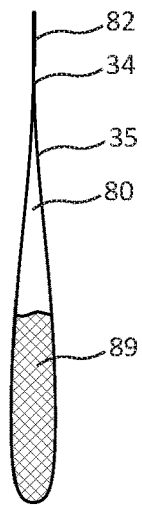

The tea bag 80 of FIG. 17C comprises one sheet of micro-perforated paper 35 folded to form one side of a rectangle with a press-bonded strip 34 around the other three sides, containing tea 89 as shown in FIG. 17D.

Figure 17E:
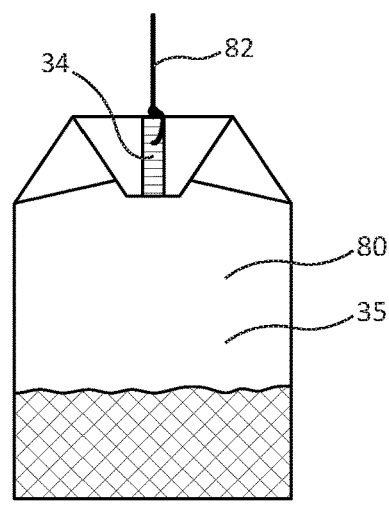
Figure 17F:
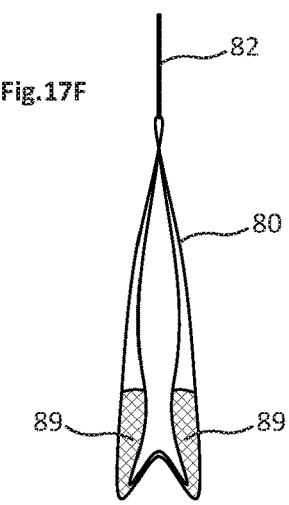

The tea bag 80 of FIG. 17E is made from a tube of micro-perforated paper with single press-bonded strip 34. A length of this tube is folded as shown in FIG. 17E, secured by a tie of string connector 82. Tea 89 is contained in the two sides of the tube of micro-perforated paper 35, as shown in FIG. 17F. The base of the used tea bag 84 of FIGS. 17E and 17F is more stable than the tea bag of FIGS. 17C and 17D, which in turn is more stable than the tea of FIGS. 17A and 17B, when being transferred onto an inverted tea piece.

Figure 18A:
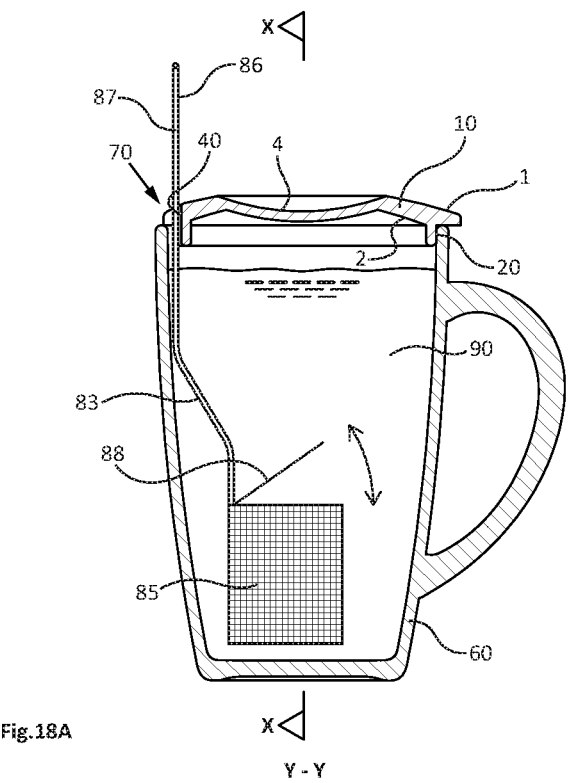
FIG. 18A is a cross-section through an infuser, mug and tea piece.
Figure 18B:
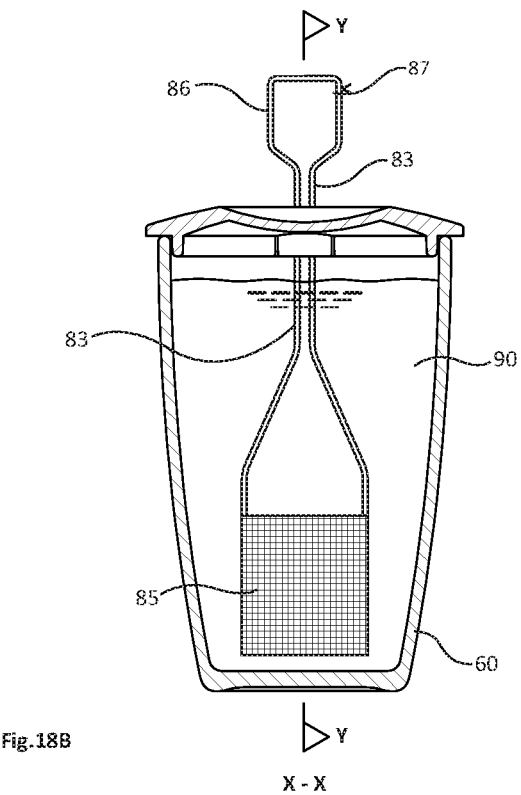
FIG. 18B is a cross-section through the infuser, mug and tea piece of FIG. 18A.

Novel Infuser 87 in FIGS. 18A and 18B comprises infuser tea bag 85, which is an openable, porous container, infuser connector 83 and infuser suspension handle 86. Infuser tea bag 85 comprises a means of temporary closure, for example a hinged lid 88 illustrated in FIG. 18A. The infuser tea bag 85 and hinged lid 88 are optionally made of fine metal wire mesh. Infuser 87 optionally comprises bent metal wire forming the structure of infuser tea bag 85, hinged lid 88, and infuser connector 83, which is intended to pass through the ventilation aperture provided by a tea piece according to various non-limiting embodiments of the present invention with infuser suspension handle 86 located outside. Infuser tea bag 85 is intended to contain loose tea 89 with closed hinged lid 88. The novel infuser connector 83 is offset, as shown in cross-section in FIG. 18A, to enable the infuser tea bag 85 to be conveniently agitated by lifting and lowering suspension handle 86 while the infuser connector 83 is within ventilation aperture 70.

Figure 19A:
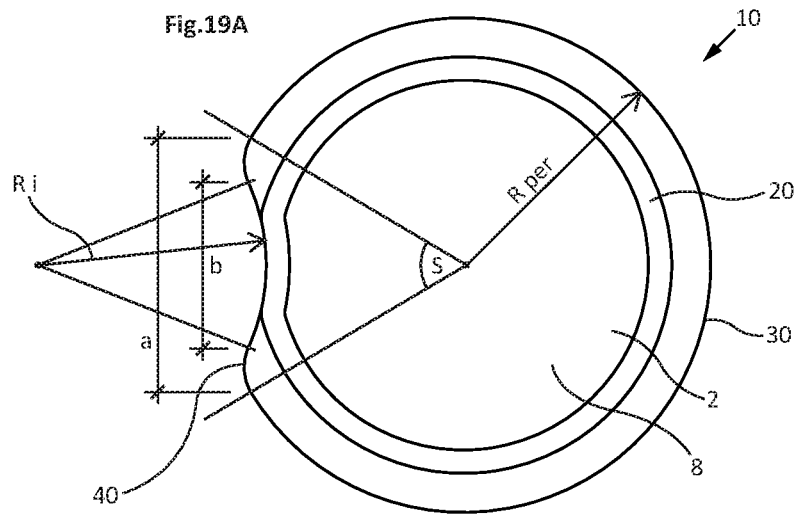
FIGS. 19A-19C are diagrammatic plans of tea pieces from the side of surface 2.
Figure 19B:
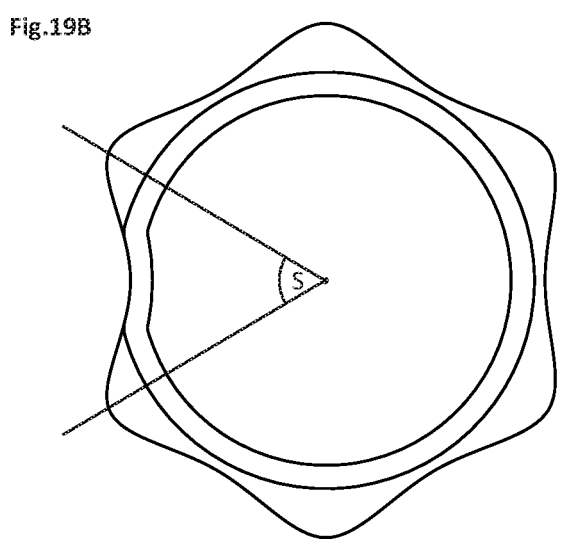
Figure 19C:
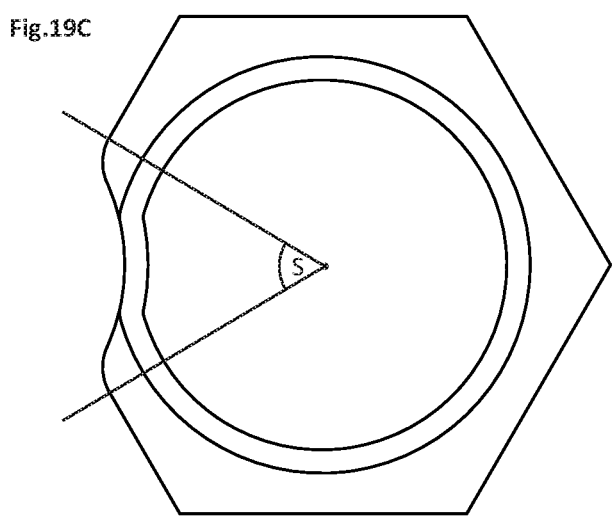

FIG. 19A is a diagrammatic plan from side 2 of a tea piece 10 with a perimeter 30 and perimeter recess 40 intended to dock snugly against a drinking vessel, to reduce the risk of tea spillage when transferring a used tea bag 80 (not shown) to the well 8 of tea piece 10 within continuous drip projection 20. According to various embodiments and as shown in FIGS. 19A-C, two end points of the perimeter recess 40 along the perimeter 30 define an angle S relative to a vertex disposed at a geometric center point of the tea piece, as viewed in plan. As used herein, the "geometric center point" of a tea piece ignores the missing area of the recess (i.e., the recess itself does not shift the center point away from the recess). For example, if the tea piece does not have a fixed radius Rper (e.g., for polygonal shapes such as hexagons), then the vertex of the angle S is defined by the geometric center point of the tea piece if the recess is ignored, as illustrated in FIGS. 19B and 19C. According to various embodiments, the angle S is greater than 10°, 12°, 15°, 20°, 25°, 30°, 35°, 40°, 45°, 50°, and/or 60°. According to various embodiments, the angle S is less than 120°, 110°, 100°, 90°, and/or 80°. According to various embodiments, the shortest or straight line dimension 'a' between the two end points of the recess 40, for example the chord length between the points at which it deviates from a circular perimeter, is greater than 10, 20, 25, 30, 40, 50, 60 and/or or 70 mm and/or less than 80 mm.

If the perimeter of a tea piece 10 is not circular but for example is fluted, as shown in FIG. 19B or is based on a polygon, for example a hexagon, as shown in FIG. 19C, the end points of the recess are defines as the points of deviation from that shape, as illustrated in FIGS. 19B and 19C.

The perimeter recess is typically symmetrical and comprises an internal curve, for example a circular internal curve of radius Ri extending between two points, of chord dimension as shown in FIG. 19A.

Figure 19D:
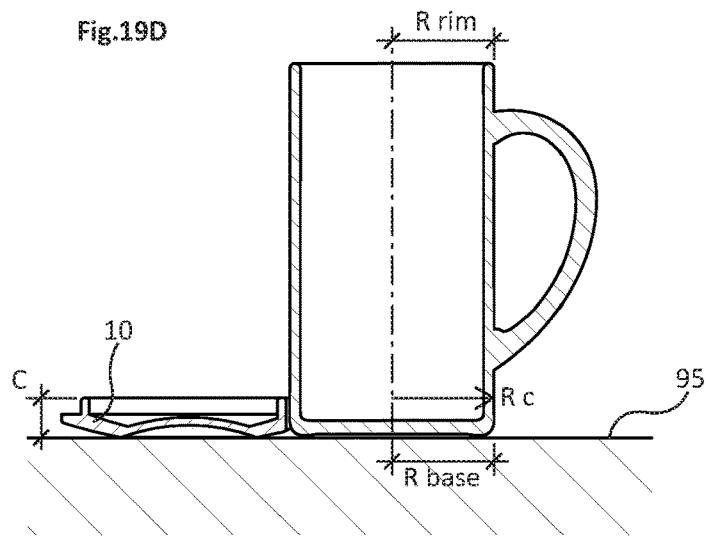
FIGS. 19D-19G are diagrammatic cross-sections through tea pieces with side 2 uppermost and 'docked' against drinking vessels.
Figure 19E:
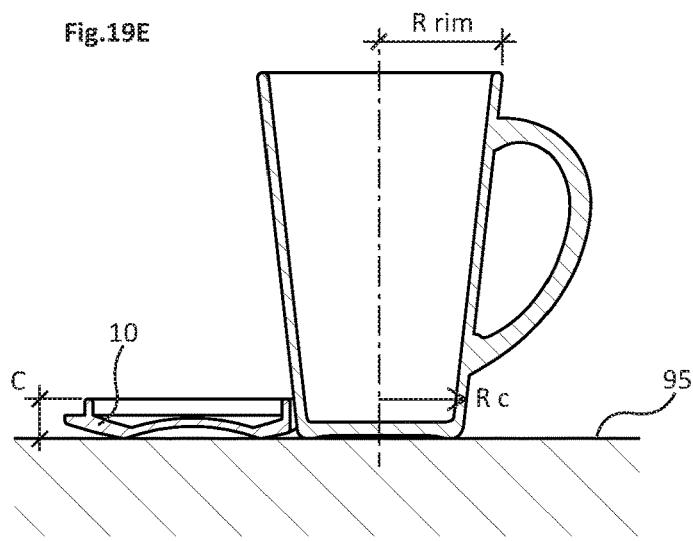
Figure 19F:
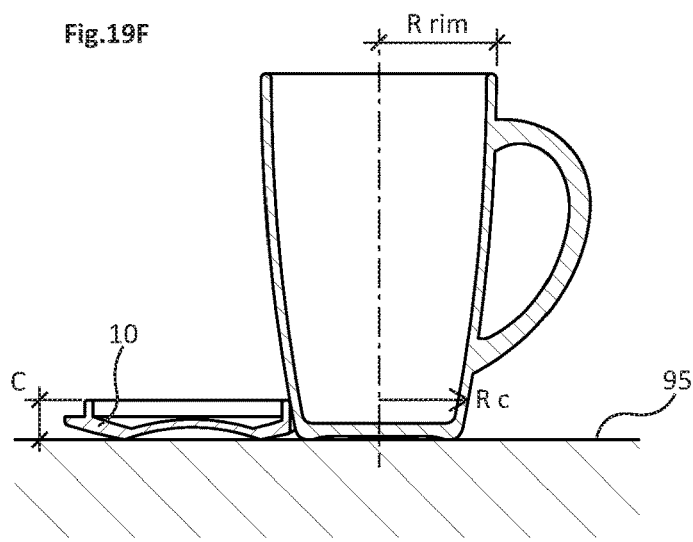
Figure 19G:
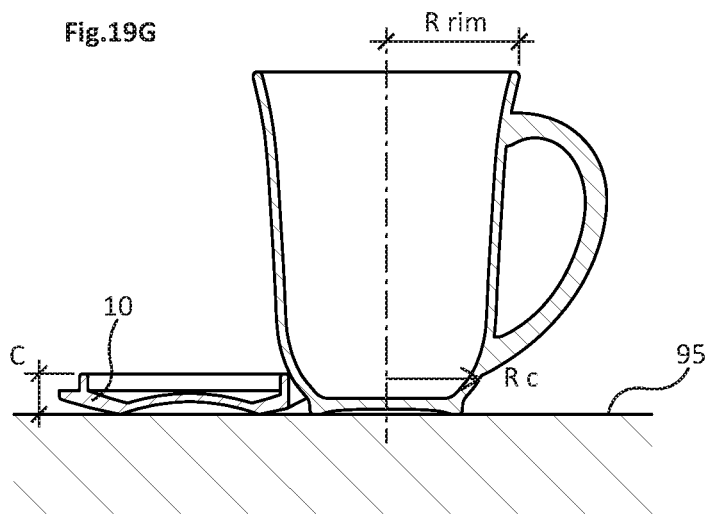
Figure 19H:
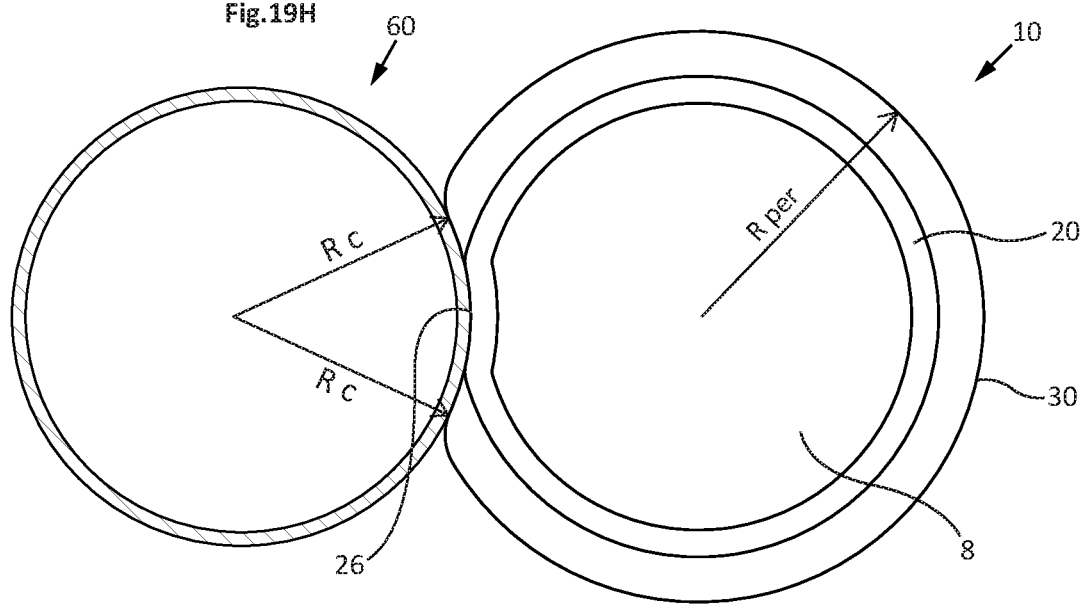
Figure 19K:
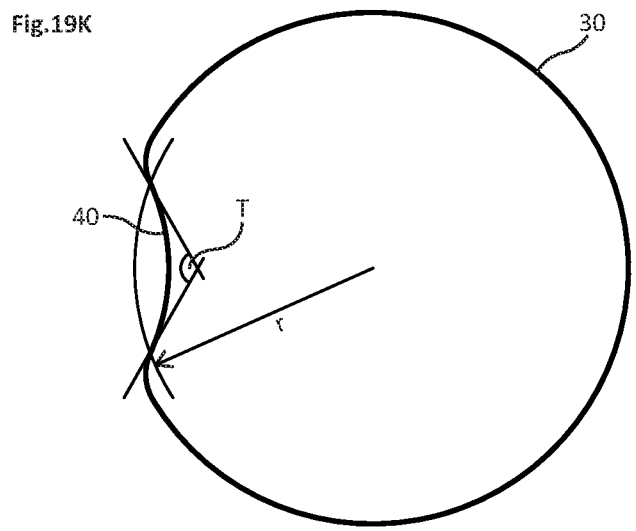
FIGS. 19K-19N are diagrammatic plans of a tea piece perimeter.
Figure 19L:
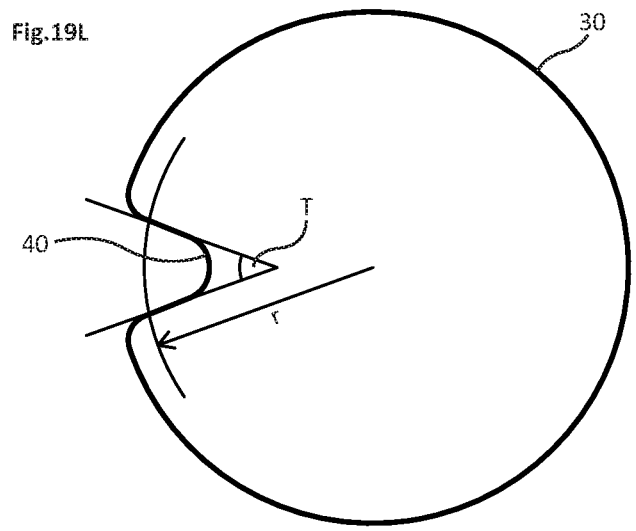
Figure 19M:
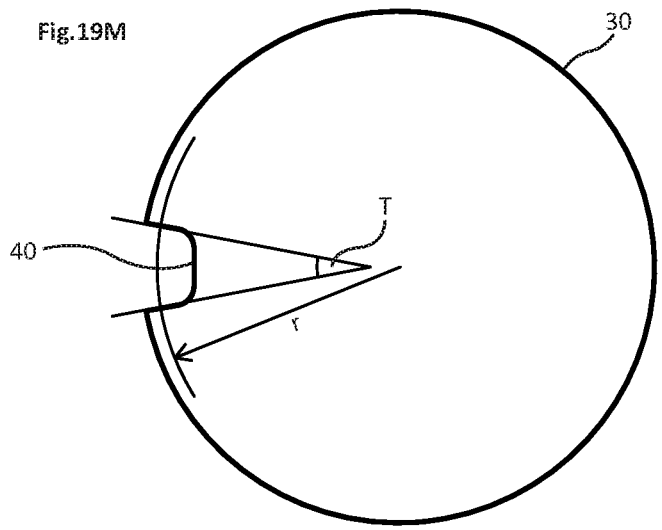

As shown in FIG. 19H, drinking vessels 60 are typically annular in cross-section, but vary significantly in their shape and proportions. A high percentage have cylindrical external geometry, the radius of the outside of the rim, Rrim, the radius at the base, Rbase, and the radius at the height of contact 'C' between the tea piece and the vessel, when the tea piece is "docked", Rc, are substantially the same, as shown in FIG. 19D. FIGS. 19E to 19G illustrate prior art drinking vessels that are tapered or narrow towards their base, the vessel of FIG. 19E being a truncated cone, that of FIG. 19F tapering progressively with an increasing angle to the vertical from rim to base, and that of FIG. 19G sometimes being referred to as "tulip-shaped" with a flared rim. The radius of a tapered drinking vessel, at a tea piece contact point, Rc, typically varies from 0.65 of the outside rim radius, (0.65 Rrim), to the outside rim radius, (Rrim). Optionally, the perimeter recess 40 comprises a curve of radius Ri, extending over an arc of chord length b, as shown in FIG. 19A. The centre of the circle comprising the arc of the internal curve of radius Ri is located outside the perimeter of the tea piece, optionally on the vertical axis of a vessel for which the tea piece 10 is intended to act as a lid and against which it is intended to be docked following inversion of tea piece 10. The internal curve radius, Ri, of a tea piece perimeter recess 40, is preferably matched to or equal to a vessel contact radius, Rc, so as to be contiguous with the drinking vessel after "docking" the inverted tea piece 10 against the drinking vessel, as shown in FIG. 19H. A tapered drinking vessel provides further security against spillage of tea when transferring the tea bag, as the tea piece receives shelter from the overhang of the vessel rim.

However, if the tea piece is being designed to cater for unknown and different shapes of drinking vessel, an internal curve radius Ri of the perimeter recess 40 is optionally made to be the radius of the tea piece perimeter Rper. This is the largest vessel rim, of radius Rrim, that would typically be accommodated by tea piece 10. This will also ensure that the single contact point 26 for vessels of smaller contact radius Rc than that of the tea piece perimeter radius Rper is capable of being located at the centre of a symmetrical perimeter recess, as illustrated in FIG. 19I, with gaps g to the outer points of the internal curve.

This maximum gap g is optionally reduced over a range of combinations of tea piece and drinking vessels by having a reduced internal curve radius, Ri, which typically results in gap g' in FIG. 19J being less than g in FIG. 19I. Following inversion and placing on the horizontal surface with a vessel on the horizontal surface, and the perimeter recess is touching the vessel at two points, the gap between the vessel and the tea piece between the two points when measured radially from the vertical axis of the vessel is less than 1 mm, preferably less than 0.5 mm, and more preferably less than 0.2 mm. The length between the two points is greater than 10 mm, preferably greater than 20 mm, and more preferably greater than 30 mm.

In various of the above embodiments, the perimeter recess 40 optionally includes an outer edge comprising smoothly transitioned curves to assist manipulation of the string connector 82 within the ventilation aperture 70, with a minimum internal radius of curvature of 3 mm. The perimeter recess is typically open such that if a circular arc of radius r is struck concentric with the tea piece perimeter 30, that intersects the perimeter recess 40 at two points, the tangents of the perimeter recess 40 at the two points intersect within the radius of the arc, at a subtended angle T greater than 0° and preferably greater than 90°, as illustrated in FIGS. 19K-19M.

Figure 19N:
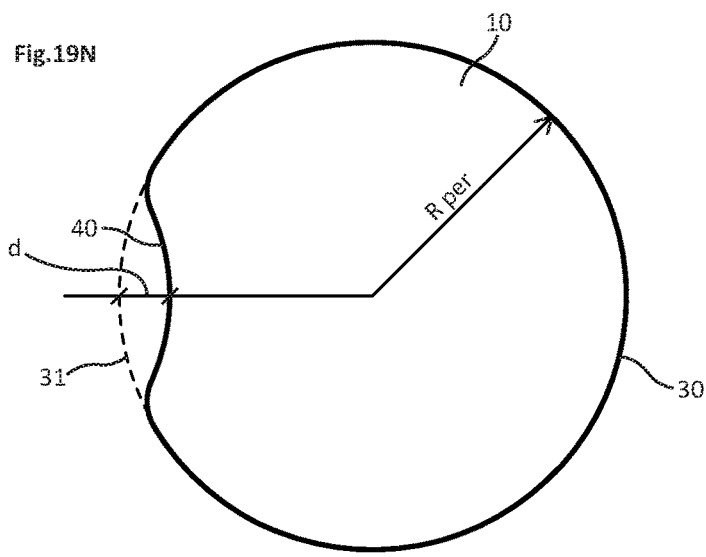

FIG. 19N illustrates a predominantly circular tea piece 10 with perimeter 30 and perimeter recess 40 which deviates from the perimeter radius Rper by a radial deviation d greater than 3 mm, 5 mm, 10 mm, and/or 15 mm.

The perimeter recess 40 should preferably enable 'docking' of the perimeter recess against a cup 60 (not shown) of circular plan, after inversion of the tea piece, such that the external surface of the cup intrudes into a notional continuation of the circle 31 of radius Rper by a distance greater than 1 mm, 2 mm, 3 mm, 5 mm, 10 mm and/or 15 mm.

Figure 19O:
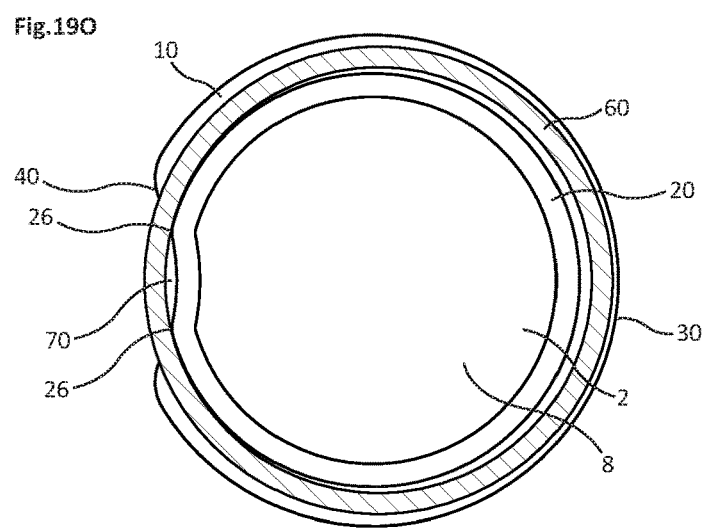
FIGS. 19O & 19P are cross-sections through vessel 60 immediately below and viewing upwards towards surface 2 of tea piece 10 located on its rim.

FIG. 19O illustrates tea piece 10 from the underside of surface 2 showing perimeter 30, continuous drip projection 20, perimeter recess 40, vessel 60 in cross-section immediately below the tea piece 10. Tea piece 10 is pushed against the inside of vessel 60 at perimeter recess 40. Ventilation aperture 70 is the smallest possible with this combination of tea piece 10 and vessel 60 and preferably has a minimum dimension of greater than 1 mm, 2 mm, 3 mm, 5 mmn, 10 mm and/or 15 mm and an area greater than 20 mm$^2$, 50 mm$^2$, 100 mm$^2$, 150 mm$^2$ and/or 200 mm$^2$.

Figure 19P:
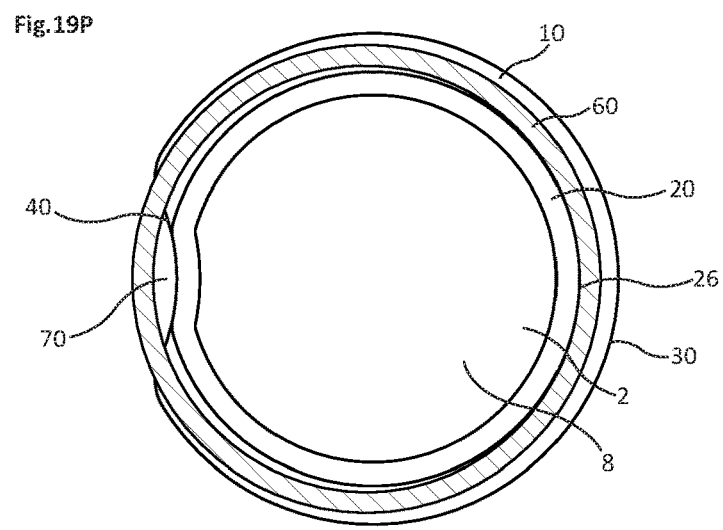
Figure 20A:
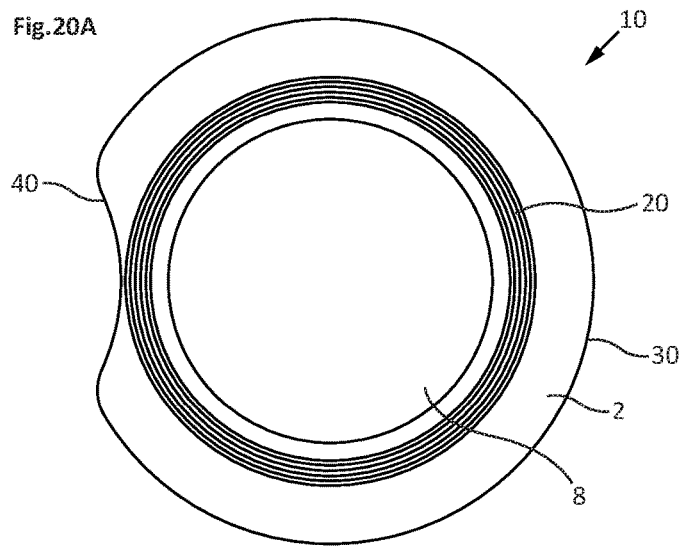
FIG. 20A is a plan of a tea piece with a circular drip projection from the side of surface 2.
Figure 20B:
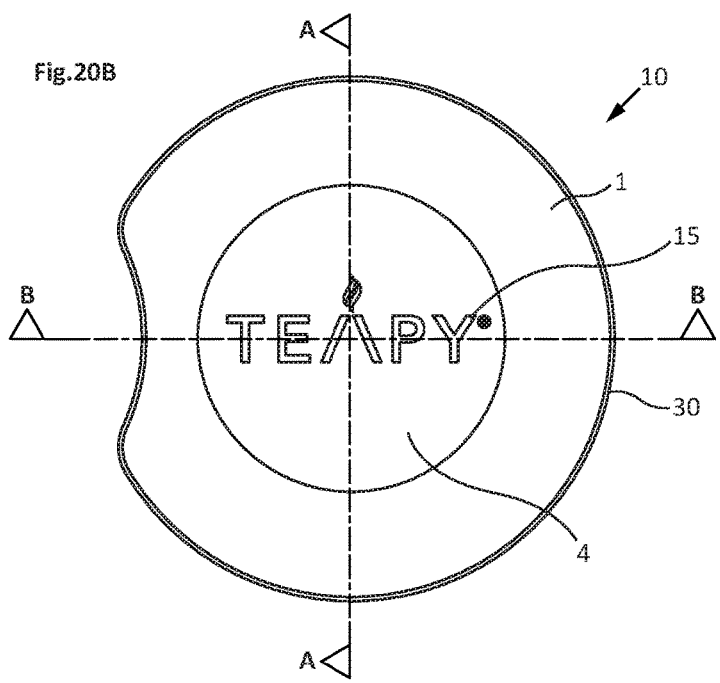
FIG. 20B is a plan of the tea piece of FIG. 20A with a circular drip projection from the side of surface 1.
Figure 20C:
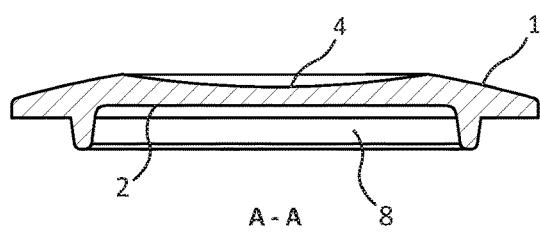
FIGS. 20C and 20D are cross-sections through the tea piece of FIGS. 20A and 20B.
Figure 20D:
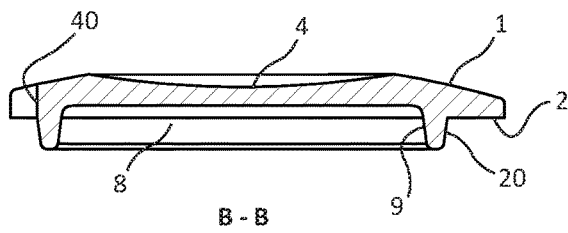
Figure 21A:
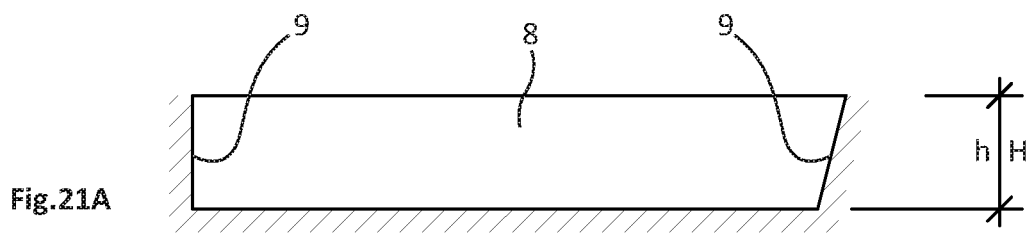
FIGS. 21A-21H are diagrammatic cross-sections through example wells according to various embodiments.
Figure 21B:
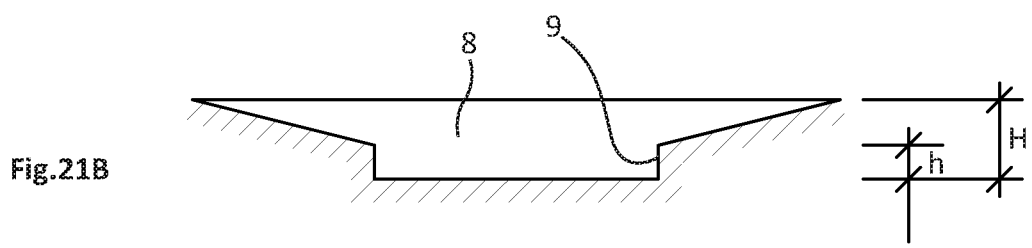
Figure 21C:
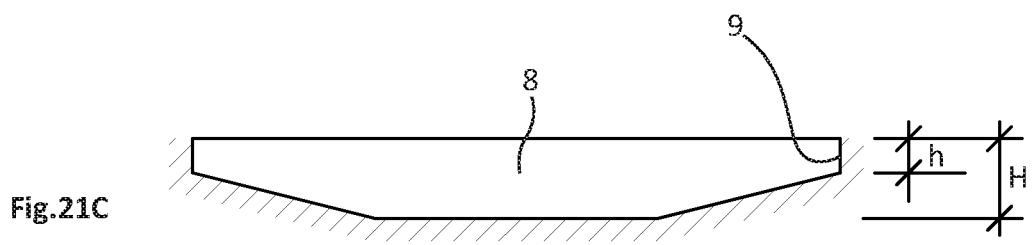
Figure 21D:
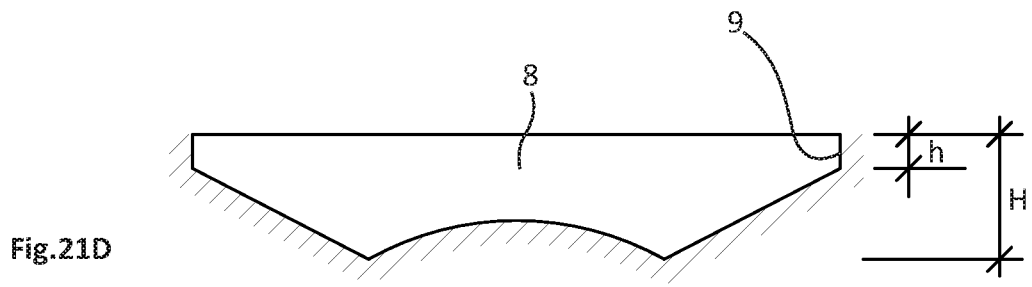
Figure 21E:
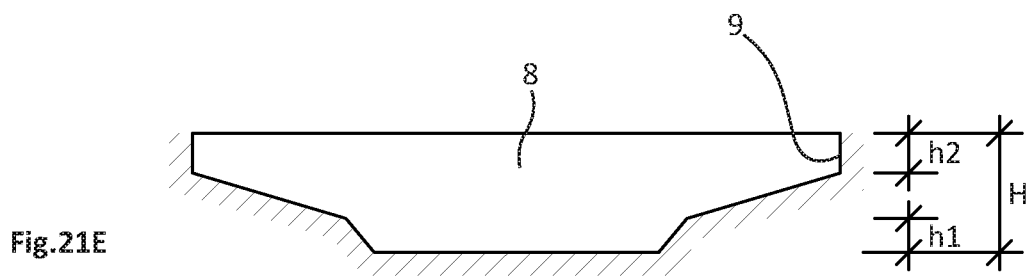
Figure 21F:
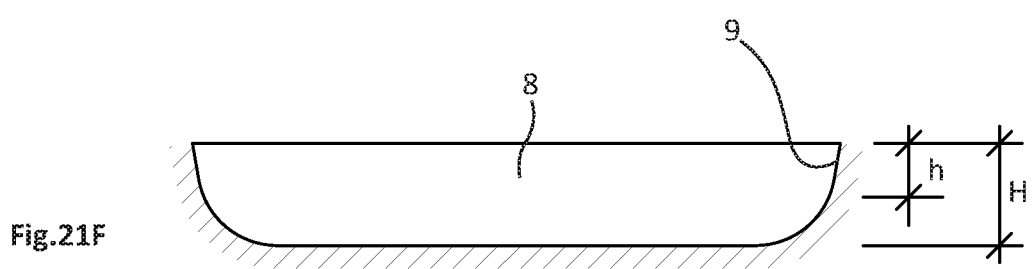
Figure 21G:
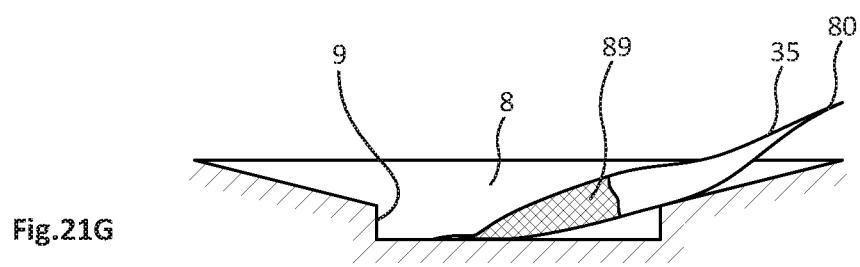
Figure 21H:
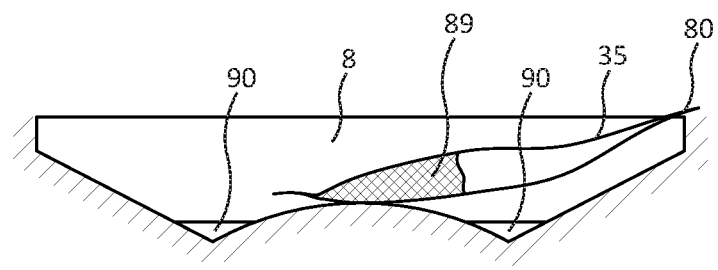

FIG. 19P illustrates a similar view to FIG. 19O but tea piece 10 is pushed against the inside of vessel 60 diametrically opposite to the perimeter recess 40, which provides the larger ventilation aperture 70 with this combination of tea piece 10 and vessel 60 and insert (O) and an area of less than 300 mm$^2$, 250 mm$^2$ and/or 200 mm$^2$.

FIGS. 20A-20D illustrate tea piece 10 with perimeter recess 40 entirely outside circular drip projection 20, which has no indent. This arrangement requires a vessel rim with an internal diameter sufficiently greater than the outside diameter of circular drip projection 20 in order to create a ventilation aperture 70 of sufficient size, as shown in FIG. 20E.

FIGS. 21A-21H represent example shapes of well 8, of overall water retaining height H and a continuous well wall 9 height h, the latter having a continuous surface at an angle to the vertical of less than 45°, and height greater than 1 mm, preferably greater than 2 mm, more preferably greater than 5 mm, and even more preferably greater than 10 mm.

Various embodiments of Aspect 1 accommodate a range of vessel rim diameter by variable geometry, for example of one or more adjustable lateral restraints. As one example, FIGS. 22A-22D illustrates tea piece 10 with continuous drip projection 20 and perimeter recess 40. Slot 24, for example of a fishtail profile, retains variable lateral restraint 25 which is moveable along slot 24 to accommodate a range of inside rim diameter of vessel 60 (not shown), from a circle of radius of the outside of drip projection 20, Rdp, to a circle comprising two perimeter recess contact points 26 and the end of slot 24. FIG. 22D shows contact points 26 pushed against the inside of the rim of vessel 60 and variable lateral restraint 25 in an intermediate position, inside the diametrically opposite position of vessel 60.

Variable restraint 25 and the perimeter recess 40 maintain contact points 26 of tea piece 10 in position as a lid to vessel 60, the restraining force of the variable lateral restraint 25 being, for example, dependent on friction with the inside of slot 24 or serrations or dimples within slot 24.

Tea pieces according to various non-limiting embodiments of the present invention optionally have many other designs than those illustrated.

The tea piece is typically designed to suit the rim of a particular cup design, or range of cup sizes, or to suit cup rims of non-circular geometry, for example the rim and therefore tea piece perimeter being substantially square or hexagonal.

The tea piece optionally comprises graphics, for example a corporate trademark or logo or instructional information, for example on tea making. If the tea piece is transparent, then indicia applied or moulded to one surface are seen as a reverse image from the other surface. For example indicia applied "right-reading" to the first surface will typically be seen as a reverse or mirror image when the tea piece is inverted. This problem can be overcome by the logo being printed in reverse followed by an opaque background followed by the logo printed right-reading, so that the logo is seen right-reading in both the lid and receptacle modes. However, it is typically desirable for the tea piece to have overall transparency in order for the tea maker to be able to observe and gauge the strength of the brewing tea, in which case any graphics, whether indicia or pictorial, are preferably produced as see-through graphics according to US RE37,186. This enables, the desired image to be made visible right-reading from both sides and, overall transparency is maintained.

Optionally, the tea piece incorporates a printed grayscale of a hue of tea printed or otherwise adhered onto the tea piece with optional advice on what graytone approximates to weak, medium or strong tea.

Optionally surface 2 of the tea piece is printed with thermochromic ink (temperature sensitive ink) that indicates the temperature of the air space between the hot water or tea and the tea piece, which is an indication of the temperature of the hot water or tea.

Tea pieces according to various non-limiting embodiments of the present invention can be made by many processes, depending on their material, including injection moulding, press moulding, and additive manufacture, for example 3D printing.

Essential features of moulding, so-called witness marks, are preferably located to coincide with other features, for example the perimeter of surface depression 4.

Mould ejection pins are preferably not used, for example being replaced by an annular ejection "pin" located inside the perimeter 30.

Flow charts of example methods of using a tea piece to make tea or another infusion using a tea piece are provided according to Aspect 1 in FIG. 23, Aspect 2 in FIG. 24 and Aspect 3 in FIG. 25. Optionally, the method also includes the use of an infuser tea bag assembly comprising an infuser tea bag comprising a closable container, an infuser suspension handle and an infuser connector.

The tea piece is optionally used to make tea by many different methods and is optionally used for other purposes. For example, the tea piece can be placed on a glass or other drinking vessel and the ventilation aperture is used to contain a straw in order to drink a warm or cold beverage, for example iced tea, thus protecting the beverage from flies or air borne dirt, pollen, etc. As another example, the cup is optionally served with a saucer and the inverted tea piece placed under the edge of the saucer to prevent drips onto the table upon transfer of the wet tea bag to the inverted tea piece.

There are many other benefits in the various non-limiting embodiments of the invention than those already given. For example, trapping the tea bag suspension handle outside the ventilation aperture saves the time spent in prior art methods of serving, in winding the string connector of a tea bag around a drinking vessel or teapot handle, the prior art means of preventing the suspension handle slipping into the hot water.

Various non-limiting embodiments of the invention have many secondary benefits. For example if a hospitality company converts from a teapot service to a cup service with the tea piece, the cost of the teapots, their storage space and washing up are eliminated, the cost of the tea piece being comparable with the cost of a teapot lid.

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., an alterations within the spirit and scope of the following claims).

What is claimed is:

1. A combination comprising:
   a vessel; and
   a tableware tea piece comprising a shaped disc comprising a perimeter, a first principal surface and a second principal surface on opposing sides of the perimeter, wherein said second principal surface comprises a well spaced inside the perimeter, said well being impervious to aqueous liquids and configured to contain aqueous liquids when the tea piece is inverted and placed on a horizontal surface, wherein the perimeter comprises a perimeter recess, wherein two end points of said perimeter recess along the perimeter define an angle relative to a vertex disposed at a geometric center point of the tea piece, wherein the angle is less than 80° and greater than 25°, wherein the second surface comprises a drip projection and a ledge, wherein the tea piece is configured to act as a lid on the vessel when containing hot water with the first surface uppermost such that a ventilation aperture is formed between a rim of the vessel and the perimeter recess and such that the drip projection sits within the rim of the vessel while the ledge sits on the rim of the vessel, wherein said ventilation aperture has a maximum dimension of less than 30 mm, wherein when the tea piece is pushed against the inside of the vessel diametrically opposite to the perimeter recess said ventilation aperture has an area of less than 300 mm$^2$, wherein said drip projection comprises a continuous loop drip projection spaced inside a portion of the tea piece perimeter, said drip projection forming a perimeter of the well, wherein when the tea piece is placed to act as a lid on the vessel containing hot water with the first surface uppermost, said drip projection provides a lateral restraint against the inside of the vessel when the tea piece is pushed laterally, wherein said drip projection is coterminous with a portion of the edge of the perimeter recess, wherein said well comprises a continuous well wall comprising the inside surface of said continuous loop drip projection, wherein the height of said continuous well wall is greater than 1 mm, wherein the vessel comprises an annular cross-section, wherein an inside rim diameter of the vessel is between 65 mm and 90 mm, wherein the tea piece is configured to be inverted and placed on the horizontal surface with the second principal surface uppermost and the first principal surface supporting the piece after said inversion such that the inverted tea piece is configured to act as a receptacle for a used tea bag such that tea which emanates from the used tea bag is contained on the second principal surface within the well and does not spill onto the horizontal surface, wherein when said tea piece is inverted on said horizontal surface, the well has a cubic capacity of greater than 3.0 cc for retaining any tea that emanates from the used tea bag, and wherein the tea piece and vessel are shaped and configured such that the tea piece can be inverted and docked against the vessel with both the tea piece and the vessel resting on a horizontal surface such that a portion of said perimeter recess edge is contiguous with an outside of the vessel.

2. The combination as claimed in claim 1, wherein said angle is greater than 45°.

3. The combination as claimed in claim 1, wherein the shortest distance between said two end points is greater than 25 mm.

4. The combination as claimed in claim 1, wherein the tea piece and vessel are shaped and configured such that the tea piece can be inverted and docked against the vessel with both the tea piece and the vessel resting on a horizontal surface such that said perimeter recess is touching said vessel at two points, a gap between the vessel and the tea piece between said two points when measured radially from the vertical axis of the vessel is less than 1 mm.

5. The combination as claimed in claim 4, wherein the length between said two points is greater than 20 mm.

6. The combination as claimed in claim 1, wherein said perimeter comprises part of a circle and said perimeter recess deviates radially within said part of a circle by a deviation of greater than 3 mm from said part of a circle.

7. The combination as claimed in claim 6, wherein after said inversion said vessel can be located against said perimeter recess and intrude within the perimeter of said part of a circle by a distance greater than 2 mm.

8. The combination as claimed in claim 1, wherein when a circular arc is struck concentric with the tea piece perimeter that intersects the perimeter recess at two points, the tangents of the points of the perimeter recess intersect within the radius of the arc at a subtended angle greater than 90°.

9. The combination as claimed in claim 1, wherein when said tea piece is pushed against the inside of the vessel at the perimeter recess said ventilation aperture has a plan area of greater than 20 mm$^2$.

10. The combination as claimed in claim 1, wherein when said tea piece is located upon a horizontal surface with said second principal surface facing upwards, the external points of support of the tea piece are disposed on the horizontal surface at a horizontal distance from a center of gravity of not less than 10 mm.

11. The combination as claimed in claim 1, wherein said well comprises a continuous well wall, wherein when said tea piece is placed on a horizontal surface with the second principal surface facing upwards said well wall comprises a continuous surface that is at an angle of less than 45° to vertical.

12. The combination as claimed in claim 1, wherein said well comprises a minimum internal width of greater than 50 mm.

13. The combination as claimed in claim 1, wherein said well comprises a cubic capacity of greater than 10.0 cc.

14. The combination as claimed in claim 1, wherein said tea piece comprises a perimeter grip profile, wherein said perimeter grip profile is configured to attach to the rim of said vessel.

15. The combination as claimed in claim 1, wherein said tea piece comprises transparent material.

16. The combination as claimed in claim 1, wherein said tea piece acting as a lid on said vessel can be subsequently removed vertically by a force no greater than the weight of the tea piece.

17. The combination as claimed in claim 1, wherein said tea piece comprises an adjustable lateral restraint.

18. The combination according to claim 1, wherein the ledge and drip projection are adjacent to each other.

19. The combination as claimed in claim 1, wherein said first principal surface comprises a depression.

20. The combination as claimed in claim 19, wherein said depression comprises a central depressed area within a raised ring.

21. The combination as claimed in claim 1, wherein:
a portion of said perimeter recess is shaped in an arc of a circle wherein a center of said circle is located outside the perimeter of the tea piece;
the vessel comprises an annular cross-section and a vertical axis; and
the tea piece and vessel are shaped and configured such that the tea piece can be inverted and docked against the vessel such that (i) a single contact point is made between the vessel and said perimeter recess or (ii) the perimeter recess touches the vessel at two contact points and a gap between the vessel and the tea piece between the two contact points when measured radially from the vertical axis of the vessel is less than 1 mm and the length between the two points is greater than 10 mm or (iii) a radius of said arc of a circle is equal to a radius of said vessel at a height of contact between the tea piece and vessel.

22. The combination as claimed in claim 1, wherein the tea piece and vessel are shaped and configured such that the tea piece can be inverted and docked against the vessel such that the perimeter recess docks against an outside of the vessel.

23. The combination as claimed in claim 1, wherein:
a portion of said perimeter recess is shaped in an arc of a circle wherein a center of said circle is located outside the perimeter of the tea piece; and
a radius of said arc equals a radius of said vessel at a height of contact between the tea piece and vessel.

24. The combination as claimed in claim 1, wherein:
a portion of said perimeter recess is shaped in an arc of a circle having a radius Ri wherein a center of said circle is located outside the perimeter of the tea piece;
a portion of the perimeter of the tea piece is shaped in an arc of a circle having a radius Rper with its center located inside the perimeter of the tea piece; and
Ri is less than or equal to Rper.

25. The combination as claimed in claim 1, wherein the well encompasses a center of the second principal surface.

26. The combination as claimed in claim 1, wherein said well is shaped and configured to enable said tea bag to be entirely disposed within the plan area of the well when the tea piece is inverted on said horizontal surface.

27. The combination as claimed in claim 1, wherein the vessel comprises a vertical axis, wherein the tea piece and vessel are shaped and configured such that the tea piece can be inverted and docked against the vessel, wherein there is a length between two points on the vessel perimeter over the length of the perimeter recess in which the gap between the vessel and the tea piece between two points when measured radially from the vertical axis of the vessel is less than 1 mm, and wherein the length between the two points is greater than 20 mm.

28. A method of making an infusion using a tea piece, a vessel, and a tea bag, the tea piece comprising a shaped disc comprising a perimeter, a first principal surface and a second principal surface on opposing sides of the perimeter, wherein said second principal surface comprises a well spaced inside the perimeter, said well being impervious to aqueous liquids and configured to contain aqueous liquids when the tea piece is inverted and placed on a horizontal surface, wherein the perimeter comprises a perimeter recess, wherein two end points of said perimeter recess along the perimeter define an angle relative to a vertex disposed at a geometric center point of the tea piece, wherein the angle is less than 80° and greater than 25°, wherein the second surface comprises a drip projection and a ledge, wherein the tea piece is configured to act as a lid on the vessel which contains hot water with the first surface uppermost such that a ventilation aperture is formed between a rim of the vessel and the perimeter recess and such that the drip projection sits within a rim of the vessel such that an outside of the drip projection faces an inside of the rim of the vessel while the ledge sits on the rim of the vessel,
wherein said ventilation aperture has a maximum dimension of less than 30 mm,
wherein when the tea piece is pushed against the inside of the vessel diametrically opposite to the perimeter recess said ventilation aperture has an area of less than 300 mm$^2$,
wherein said drip projection comprises a continuous loop drip projection spaced inside a portion of the tea piece perimeter, said drip projection forming a perimeter of the well,
wherein when the tea piece is placed to act as a lid on the vessel containing hot water with the first surface uppermost, said drip projection provides a lateral restraint against the inside of the vessel when the tea piece is pushed laterally,
wherein said drip projection is coterminous with a portion of the edge of the perimeter recess, wherein said well comprises a continuous well wall comprising the inside surface of said continuous loop drip projection,
wherein the height of said continuous well wall is greater than 1 mm,
wherein the vessel comprises an annular cross-section,
wherein an inside rim diameter of the vessel is between 65 mm and 90 mm,
wherein the tea piece is configured to be inverted and placed on a horizontal surface with the second principal surface uppermost and the first principal surface supporting the piece after said inversion such that the inverted tea piece is configured to act as a receptacle for a used tea bag such that tea which emanates from the used tea bag is contained on the second principal surface within the well and does not spill onto the horizontal surface,
wherein when said tea piece is inverted on said horizontal surface, the well has a cubic capacity of greater than 3.0 cc,
wherein the tea piece and vessel are shaped and configured such that the tea piece can be inverted and docked against the vessel with both the tea piece and the vessel resting on a horizontal surface such that a portion of said perimeter recess edge is contiguous with an outside of the vessel,
said method comprising:
(i) placing hot water into the vessel comprising the rim,
(ii) placing the tea bag in the hot water,
(iii) placing the tea piece on the rim of the vessel such that the first principal surface is uppermost, wherein the ventilation aperture is formed between the rim of the vessel and the perimeter recess of the tea piece,
(iv) allowing time for the tea to infuse,
(v) removing the tea piece, and
(vi) removing the tea bag from the hot water.

29. The method as claimed in claim 28, wherein said tea bag is part of a tea bag assembly comprising a suspension handle and a connector which connects the suspension handle to the tea bag.

30. The method as claimed in claim 29, wherein the method stage (iii) further comprises locating the connector within the ventilation aperture with the suspension handle outside the vessel.

31. The method of claim 28, wherein the tea bag is part of an infuser.

32. The method as claimed in claim 28, wherein there is a tolerance between the outside of the drip projection and the inside of the rim of the vessel, such that the tea piece can be subsequently removed from the rim of the vessel by a force no greater than the weight of the tea piece.

33. The method as claimed in claim 28, further comprising:
inverting the tea piece after said removing of the tea piece, and placing the tea bag on said inverted tea piece after said removing of the tea bag from the hot water.

34. The method as claimed in claim 33, further comprising placing the inverted tea piece on a horizontal surface, wherein following said inverting and placing on said horizontal surface, (1) said vessel is located on said horizontal surface, (2) said perimeter recess is touching said vessel at two points, and (3) the gap between the vessel and the tea piece between said two points when measured radially from the vertical axis of the vessel is less than 1 mm.

35. The method as claimed in claim 28, wherein said perimeter comprises part of a circle and said perimeter recess deviates radially within said circle, and wherein after said inversion said vessel can be located against said perimeter recess and intrude within the perimeter of said circle by a distance greater than 1 mm.

36. The method as claimed in claim 28, wherein said ventilation aperture has a plan area of greater than 20 mm$^2$.

37. The method as claimed in claim 28, wherein a stirring implement is located within the ventilation aperture.

38. The method as claimed in claim 37, wherein said stirring implement is one of a tea spoon, a fork, and a slim piece of wood.

39. The method as claimed in claim 37, wherein said stirring implement is used to agitate the tea bag through the ventilation aperture to accelerate the infusion.

40. The method as claimed in claim 33, wherein:
a portion of said perimeter recess is shaped in an arc of a circle wherein a center of said circle is located outside the perimeter of the tea piece;
the vessel comprises an annular cross-section and a vertical axis; and
the method further comprises docking the inverted tea piece against the vessel such that (i) a single contact point is made between the vessel and said perimeter recess or (ii) the perimeter recess touches the vessel at two contact points and a gap between the vessel and the tea piece between the two contact points when measured radially from the vertical axis of the vessel is less than 1 mm and the length between the two points is greater than 10 mm or (iii) a radius of said arc of a circle is equal to a radius of said vessel at a height of contact between the tea piece and vessel.

41. The method as claimed in claim 30, wherein said connector is a string connector, wherein the suspension handle is located outside the space contained by the vessel and the tea piece acting as a lid to the vessel, and wherein the perimeter is configured and sized to prevent the suspension handle slipping into the hot water through ventilation aperture.

42. The method as claimed in claim 41, wherein said ventilation aperture has a maximum dimension of less than 25 mm.

43. The method as claimed in claim 41, wherein said ventilation aperture has a maximum dimension of less than 20 mm.

* * * * *